United States Patent
Yoshioka et al.

(10) Patent No.: US 10,274,394 B2
(45) Date of Patent: Apr. 30, 2019

(54) FLUID PATH INSPECTION DEVICE AND FLUID PATH INSPECTION METHOD

(71) Applicant: TAKASHIN CO., LTD., Hirakawa-shi, Aomori (JP)

(72) Inventors: Jun Yoshioka, Yamagata (JP); Takuji Sasaki, Aomori (JP); Jun Kogawa, Aomori (JP); Masaki Fujita, Aomori (JP); Toshiki Akahira, Aomori (JP)

(73) Assignee: TAKASHIN CO., LTD., Aomori (JP)

( * ) Notice: Subject to any disclaimer, the term of this patent is extended or adjusted under 35 U.S.C. 154(b) by 91 days.

(21) Appl. No.: 15/500,131

(22) PCT Filed: Sep. 15, 2015

(86) PCT No.: PCT/JP2015/004705
§ 371 (c)(1),
(2) Date: Jan. 30, 2017

(87) PCT Pub. No.: WO2016/042760
PCT Pub. Date: Mar. 24, 2016

(65) Prior Publication Data
US 2017/0261396 A1    Sep. 14, 2017

(30) Foreign Application Priority Data
Sep. 18, 2014    (JP) ................. 2014-189770

(51) Int. Cl.
*A61H 9/00* (2006.01)
*G01M 3/26* (2006.01)
*G01M 3/28* (2006.01)

(52) U.S. Cl.
CPC .............. *G01M 3/26* (2013.01); *A61H 9/00* (2013.01); *A61H 9/005* (2013.01); *G01M 3/28* (2013.01);
(Continued)

(58) Field of Classification Search
CPC ............. G01M 3/2807; G01M 3/2815; G01M 3/2846; G01M 3/2853; G01M 3/3209; G01M 3/3263
See application file for complete search history.

(56) References Cited

U.S. PATENT DOCUMENTS 5,890,474 A     4/1999   Schnaibel et al.
6,505,501 B1    1/2003   Murphy et al.
(Continued)

FOREIGN PATENT DOCUMENTS

EP    1731857 A1     12/2006
JP    H03-158732 A   7/1991
(Continued)

OTHER PUBLICATIONS

The extended European Search Report dated Jul. 12, 2017 in the counterpart European patent application.
(Continued)

*Primary Examiner* — Paul M. West
(74) *Attorney, Agent, or Firm* — Metrolexis Law Group, PLLC

(57) ABSTRACT

There are provided a fluid-path tester and a fluid-path testing-method capable of performing classification of abnormal-modes into a problem in a system, a leakage in a dedicated tube, a problem of a failure in a suppression pressure, and the like, an analysis of the abnormal-modes, and the like in a simplified manner. PAPS valves are included, and an abnormality emulator inspecting an abnormal condition in a fluid path of a DUT by emulating characteristics of the fluid-circuit represented by each of a plurality of abnormal-modes having possibilities of occurring in the fluid path of the DUT through pressurization of a fluid pressure using a compressor-under-test and adjustment of the fluid pressure using the PAPS valves.

12 Claims, 33 Drawing Sheets

(52) U.S. Cl.
CPC ........ *G01M 3/2807* (2013.01); *G01M 3/2815* (2013.01); *G01M 3/2846* (2013.01); *G01M 3/2853* (2013.01)

(56) References Cited

U.S. PATENT DOCUMENTS

| | | | |
|---|---|---|---|
| 6,795,780 B1* | 9/2004 | Hyde | F15B 19/00 700/281 |
| 2010/0249679 A1 | 9/2010 | Perry et al. | |
| 2012/0143069 A1 | 6/2012 | Takeoka et al. | |
| 2012/0209153 A1 | 8/2012 | Farrow et al. | |
| 2014/0238110 A1 | 8/2014 | Williams | |

FOREIGN PATENT DOCUMENTS

| | | |
|---|---|---|
| JP | 2001-132659 A | 5/2001 |
| JP | 3192429 B2 | 7/2001 |
| JP | 2002-202232 A | 7/2002 |
| JP | 2005-2915 A | 1/2005 |
| JP | 4049412 B2 | 2/2008 |
| JP | 2014-161737 A | 9/2014 |
| WO | 2012/134247 A2 | 10/2012 |
| WO | 2012/134247 A3 | 10/2012 |

OTHER PUBLICATIONS

The English translation of the international preliminary report on patentability (Chapter I) of PCT/JP2015/004705 mailed by the International Bureau of WIPO dated Mar. 30, 2017 (PCT/IB/338, PCT/IB/373 and PCT/ISA/237).

* cited by examiner

FLUID PATH INSPECTION DEVICE AND FLUID PATH INSPECTION METHOD

TECHNICAL FIELD

The present invention relates to a device inspecting an abnormal condition of a fluid path. More particularly, the present invention relates to a fluid path inspection device (herein after called "a fluid-path tester") required for keeping a fluid path in proper condition, by inspecting complex abnormal conditions, the abnormal conditions may include environment conditions for attaching the fluid path to a human body and the like, in a system such as medical instrument, which will require minute pressure adjustments in the fluid path, particularly, the fluid path being attached to the human body so as to implement the intermittent pneumatic compression (IPC) method, and the present invention further relates to a fluid-path testing-method using the fluid-path tester.

BACKGROUND ART

In the IPC method, sleeves (garments) 301a and 301b, as illustrated in FIGS. 34 and 35 are wound around a lower limb or the bottom of the foot, and, blood flowing in a vein is extruded by using a pressure applied by a pressurizing pump (IPC pump), a vein blood flow rate is increased, and a fibrinolytic action is stimulated. In this IPC method, at the time of starting the operation, it is necessary to check whether connection tubes $4_{a1}$, $4_{a2}$, $4_{a3}$; $4_{b1}$, $4_{b2}$, and $4_{b3}$ are reliably connected, whether there is torsion or folding in the connection tubes $4_{a1}$, $4_{a2}$, $4_{a3}$; $4_{b1}$, $4_{b2}$, and $4_{b3}$, whether there is an air leakage from the connection tubes $4_{a1}$, $4_{a2}$, $4_{a3}$; $4_{b1}$, $4_{b2}$, and $4_{b3}$, whether there is an air leakage in the connector, whether there is an air leakage or a failure in a sleeve, a calf pump, or a foot pump, and the like.

In the earlier technology, an apparatus for monitoring the operation state of a high-pressure fluid-pressurizing pump as recited in patent literature (PTL) 1, another apparatus for inspecting only a defect of a tube alone as recited in PTL 2, and the like are known. However, in a system targeting a low-pressure regime of about 5 to 10 kPa used for medical instrument, a defect in the suppression pressure at the time of winding sleeves 301a and 301b or the like around a human body and the like are complex events accompanying a change of minute levels in the pressure. Accordingly, in the case of a fluid path of the low-pressure regime used for medical instrument, the detection of defects and the investigation into the causes of the defects require a minute determination, which will accompany empirical rules, and are very difficult to perform. Accordingly, when medical instrument having a system structure implemented by the fluid path of the low-pressure regime, which requires detection of change in minute levels in the pressure, is assigned as a device-under-test (DUT), it is difficult to discriminate the failures in the hardware or a system implementing the DUT such as a pressurizing pump, from the leakage or the defect in connection tubes $4_{a1}$, $4_{a2}$, $4_{a3}$; $4_{b1}$, $4_{b2}$, $4_{b3}$ or the like used in the DUT, or from the defect in the attachment of sleeves 301a and 301b used in the DUT, or from the defect in the suppression pressure, in a simplified manner. Therefore, in the earlier technology, there has been no proposal for a fluid-path tester or a fluid-path testing-method capable of discriminating the leakage of a dedicated tube from problems associated with the system including a compressor, in a simplified manner.

CITATION LIST

Patent Literature

PTL 1: JP 2001-132659 A
PTL 2: JP 2002-202232 A

SUMMARY OF INVENTION

Technical Problem

An object of the present invention is to provide a fluid-path tester capable of performing classification of abnormal-modes of a DUT such as a problem in the hardware or a system including a compressor implementing the DUT, a problem in a leakage or a defect in a dedicated tube used for the DUT, a problem in the attachment of a component such as a sleeve used for the DUT or a defect in the suppression pressure, and the like, the analysis of the abnormal-modes, and the like in a simplified manner by using a single miniaturized device, and to provide a fluid-path testing-method using the fluid-path tester.

Solution to Problem

In order to achieve the object described above, a first aspect of the present invention relates to a fluid-path tester configured to inspect failure in a fluid path of a DUT, which includes a compressor-under-test and a dedicated tube. In other words, the fluid-path tester according to the first aspect of the present invention mainly includes: (a) a leak tester including a measurement-compressor, implementing a closed fluid-circuit using a path of the dedicated tube as a part of the fluid path, configured to inspect a leakage in the dedicated tube by applying a pressure into the fluid-circuit using the measurement-compressor, maintaining the pressure in the fluid-circuit for a predetermined time; and (b) an abnormality emulator including a pressure-adjusting proportional-solenoid valve, configured to emulate a plurality of characteristics, each of which corresponds to one of abnormal-modes represented by performance of the fluid-circuit, each of the plurality of abnormal-modes having possibilities of occurring in the fluid path of the DUT, by applying a fluid pressure using the compressor-under-test and by adjusting the fluid pressure using the pressure-adjusting proportional-solenoid valve, thereby inspecting an abnormal condition occurring in the fluid path of the device-under-test.

A second aspect of the present invention relates to a fluid-path testing-method for inspecting failure in a fluid path of a DUT, which include a compressor-under-test and a dedicated tube. In other words, the fluid-path testing-method according to the second aspect of the present invention mainly includes: (a) inspecting a leakage in the dedicated tube by constructing a closed fluid-circuit using a path of the dedicated tube as a part of the fluid path, by applying a pressure into the fluid-circuit, and by maintaining the pressure in the fluid-circuit for a predetermined time; (b) emulating a plurality of characteristics, each of which corresponds to one of abnormal-modes represented by performance of the fluid-circuit, each of the plurality of abnormal-modes having possibilities of occurring in the fluid path of the device-under-test, by using a fluid-path tester; and (c) inspecting an abnormal condition in the fluid path of the DUT, by applying a pressure into an internal pipe of the fluid-path tester connected to the DUT using the compressor-under-test, and by comparing acquired characteristics with the emulated characteristics.

Advantageous Effects of Invention

According to the present invention, a fluid-path tester capable of performing classification of abnormal-modes of a DUT such as a problem in the hardware or a system including a compressor implementing the DUT, a problem in a leakage or a defect in a dedicated tube used for the DUT, a problem in the attachment of a component such as a sleeve used for the DUT or a defect in the suppression pressure, and the like, the analysis of the abnormal-modes, and the like in a simplified manner by using a single miniaturized device and a fluid-path testing-method using the fluid-path tester can be provided.

DESCRIPTION OF EMBODIMENTS

Figure 1:
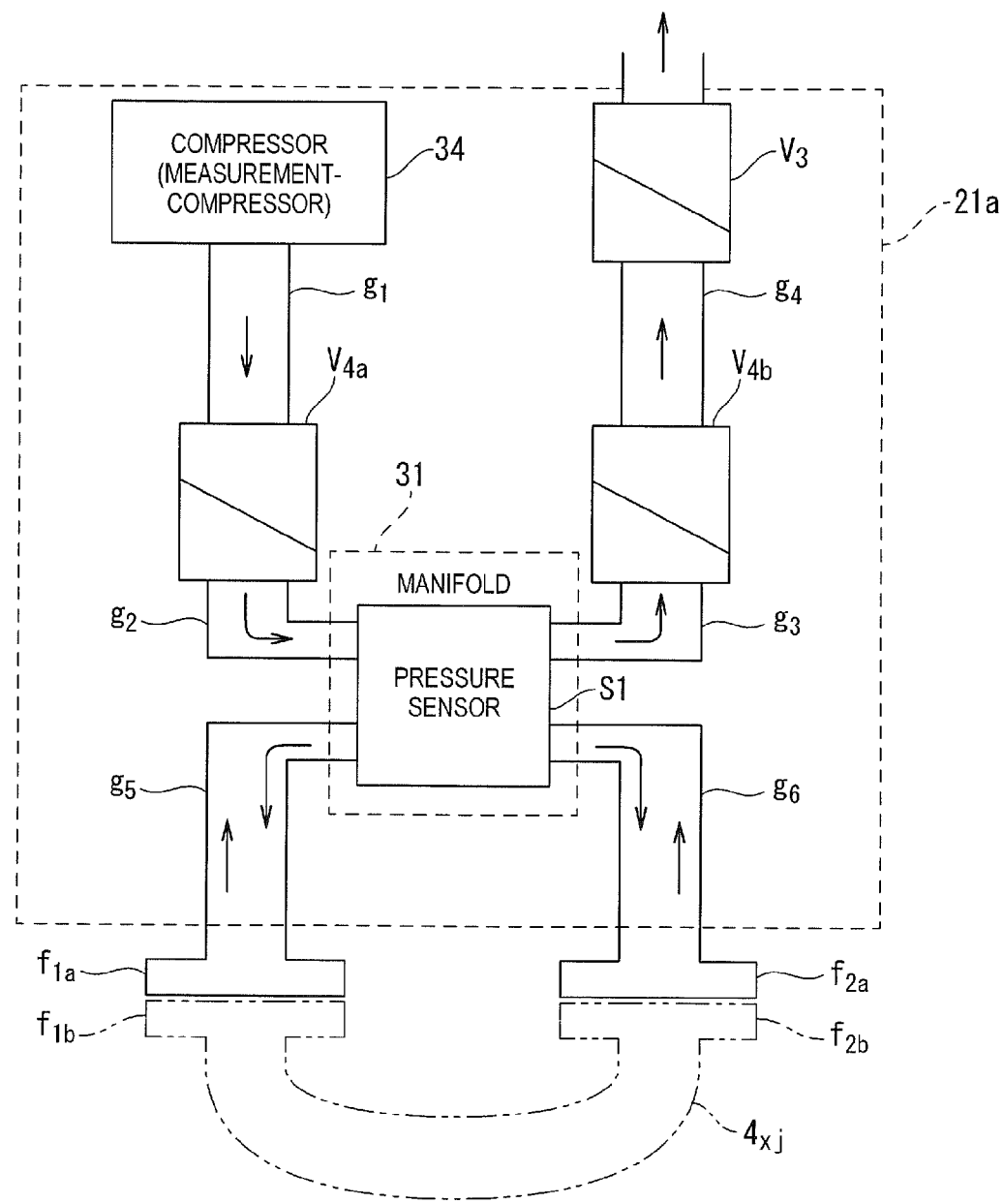
FIG. 1 is a schematic block diagram that illustrates an overview of a major part of a plane arrangement layout of a leak tester implementing a part of a fluid-path tester according to a first embodiment of the present invention.

Next, a first embodiment of the present invention will be described with reference to the Drawings. In description of the Drawings presented below, reference numerals denote like elements. However, the Drawings are schematic, and it should be noted that a relation between a thickness and a planar dimension, a ratio among thicknesses of layers, and the like are different from actual ones. Thus, specific thicknesses and specific dimensions should be determined by referring to description presented below. In addition, it is apparent that portions of which the dimensional relations or ratios are different from each other are included in the Drawings. The first embodiment presented below represents a device and a method for realizing a technical idea of the present invention as examples, and thus, the technical idea of the present invention does not specify the materials, shapes, structures, arrangements, and the like of constituent components to be those presented below. According to the technical idea of the present invention, various changes may be made within a technical scope defined by the claims described in "CLAIMS".

First Embodiment

Figure 2:
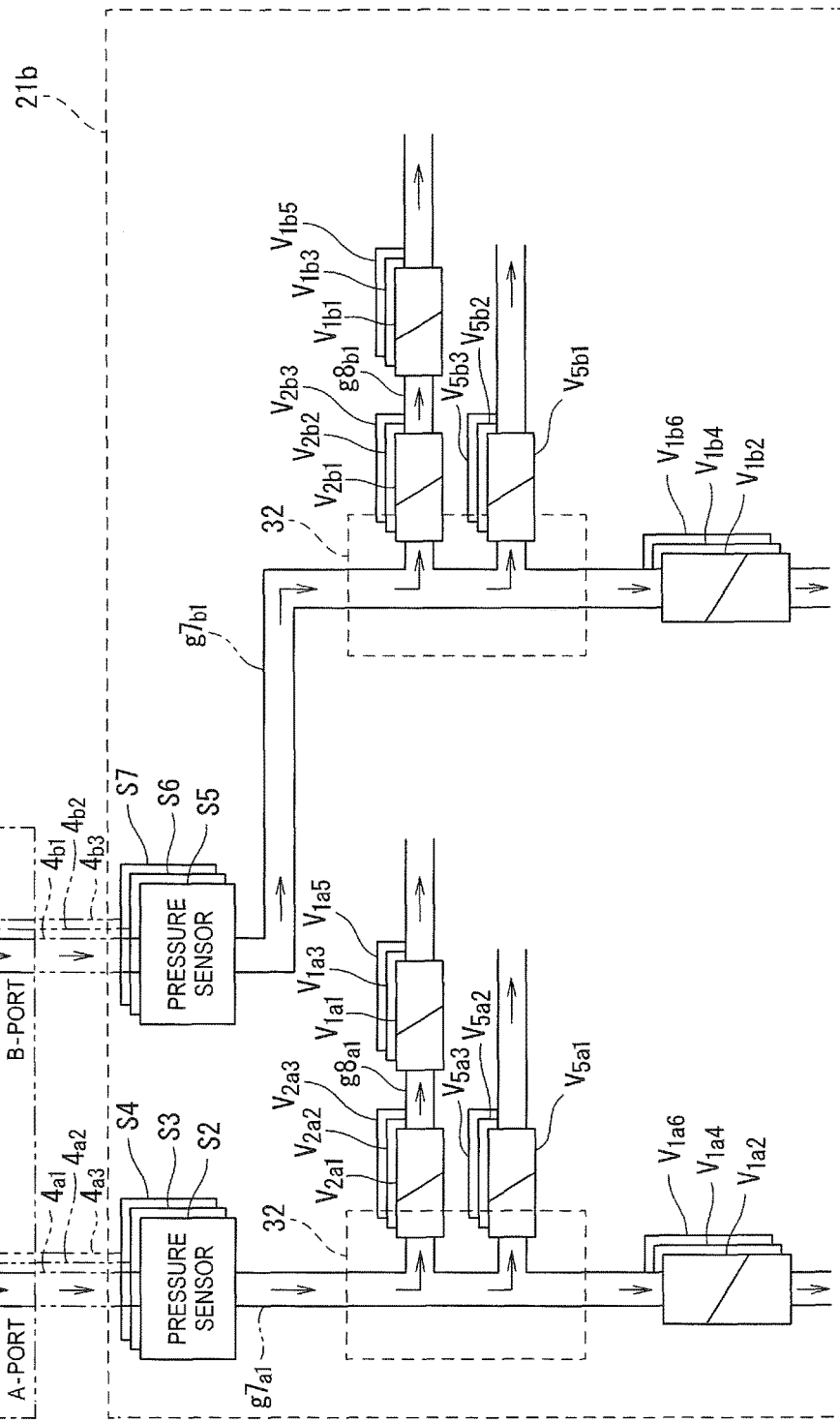
FIG. 2 is a schematic block diagram that illustrates an overview of a major part of a plane arrangement layout of an abnormality emulator implementing the other part of the fluid-path tester according to the first embodiment while a fluid-circuit of three systems is partly illustrated.

A fluid-path tester according to the first embodiment of the present invention inspects a fluid path of a DUT 3 including a compressor-under-test 303 and dedicated tubes ($4_{b1}$, $4_{a2}$, $4_{a3}$, $4_{b1}$, $4_{b2}$, and $4_{b3}$) as illustrated in FIG. 2. In other words, the fluid-path tester according to the first embodiment includes a measurement-compressor 34, which facilitate pressurizing a low-pressure regime of about 30 kPa or less, as illustrated in FIG. 1. Another inspection tube $4_{xj}$ other than the dedicated tubes ($4_{a1}$, $4_{a2}$, $4_{a3}$, $4_{b1}$, $4_{b2}$, and $4_{b3}$) comes out from the fluid-path tester, and, at the time of an error mode/normal mode, the DUT 3 and the fluid-path tester are connected using only the inspection tube $4_{xj}$. On the other hand, at the time of a normal operation of the DUT 3, the DUT 3 and sleeves (garments) are connected using the dedicated tubes ($4_{a1}$, $4_{a2}$, $4_{a3}$, $4_{b1}$, $4_{b2}$, and $4_{b3}$). A leakage inspection is performed by connecting the fluid-path tester and only the inspection tube $4_{xj}$ ($4_{a1}$, $4_{a2}$, $4_{a3}$, $4_{b1}$, $4_{b2}$, and $4_{b3}$). The fluid-path tester of the first embodiment further includes a leak tester 21a that implements a closed fluid-circuit using a path of the inspection tube $4_{xj}$ as a part of the fluid path. The leak tester 21a inspects a leakage of the inspection tube $4_{xj}$ by applying a pressure in a fluid-circuit using the measurement-compressor 34, maintaining the pressure in the fluid-circuit for a predetermined time. And, the fluid-path tester of the first embodiment still further includes an abnormality emulator 21b that includes proportional solenoid-valves ($V_{1a2}$, $V_{1a4}$, $V_{1a6}$, $V_{1b2}$, $V_{1b4}$, and $V_{1b6}$) for pressure adjustment as illustrated in FIG. 2. The abnormality emulator 21b inspects an abnormal condition in the fluid path of the DUT 3 by emulating fluid-circuit characteristics of a plurality of abnormal-modes having possibilities of occurring in the fluid path of the DUT 3 through the pressurization of fluid pressure using the compressor-under-test 303 and through the adjustment of fluid pressure, using the proportional solenoid-valves ($V_{1a2}$, $V_{1a4}$, $V_{1a6}$, $V_{1b2}$, $V_{1b4}$, and $V_{1b6}$) for pressure adjustment.

For example, when the DUT 3 is medical instrument used for the IPC method, by using minute pressure changes as the reference, the presence of the following quadruple abnormal-modes (error modes E1, E2, E3, and E4) can be assumed as abnormalities of the fluid path of the DUT 3.

Figure 34:
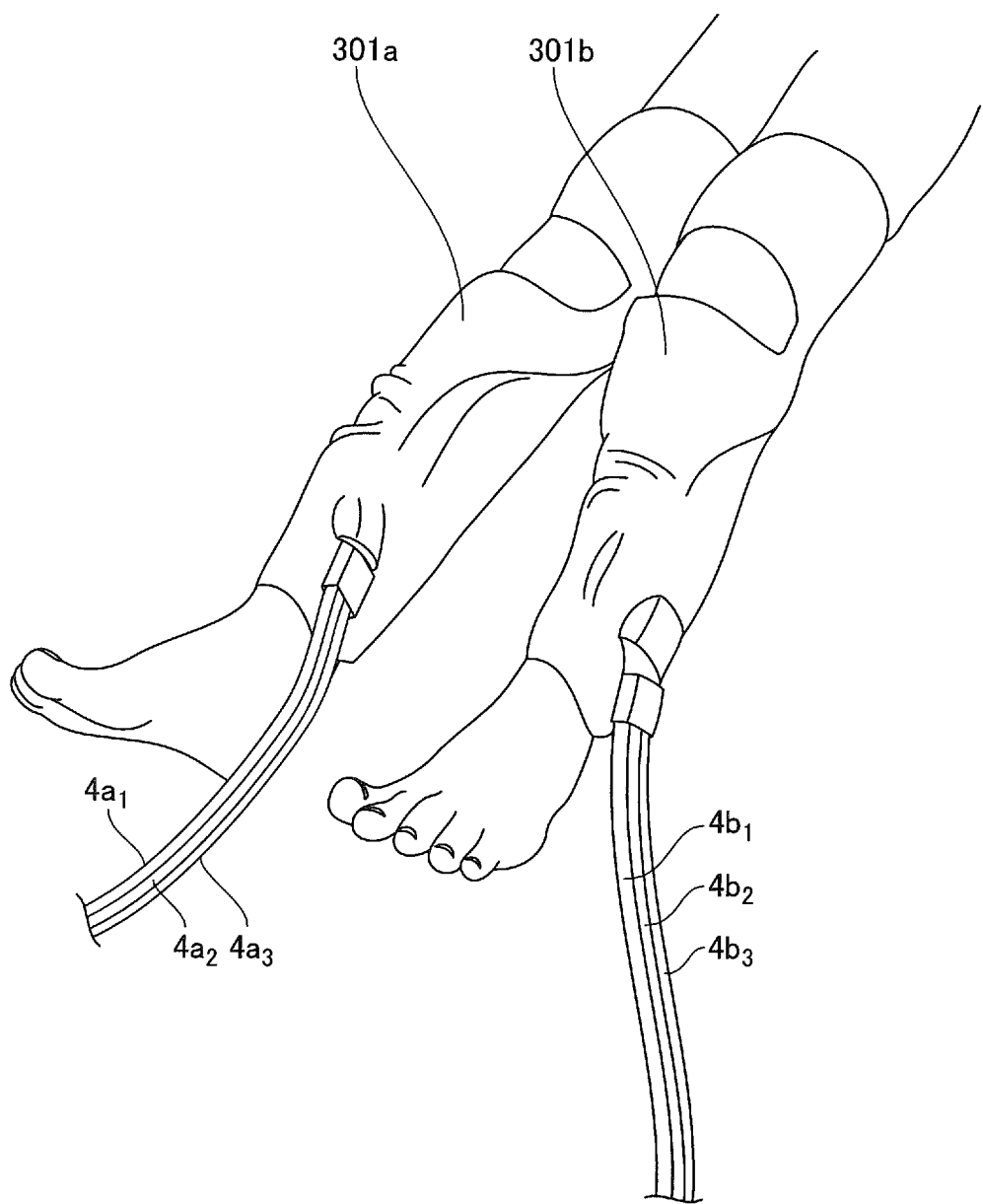
FIG. 34 is a schematic bird's eye view that illustrates an overview of a state in which medical instrument, which is preferable as an applied example of the fluid-path tester according to the first embodiment of the present invention, is attached to a human body.
Figure 35:
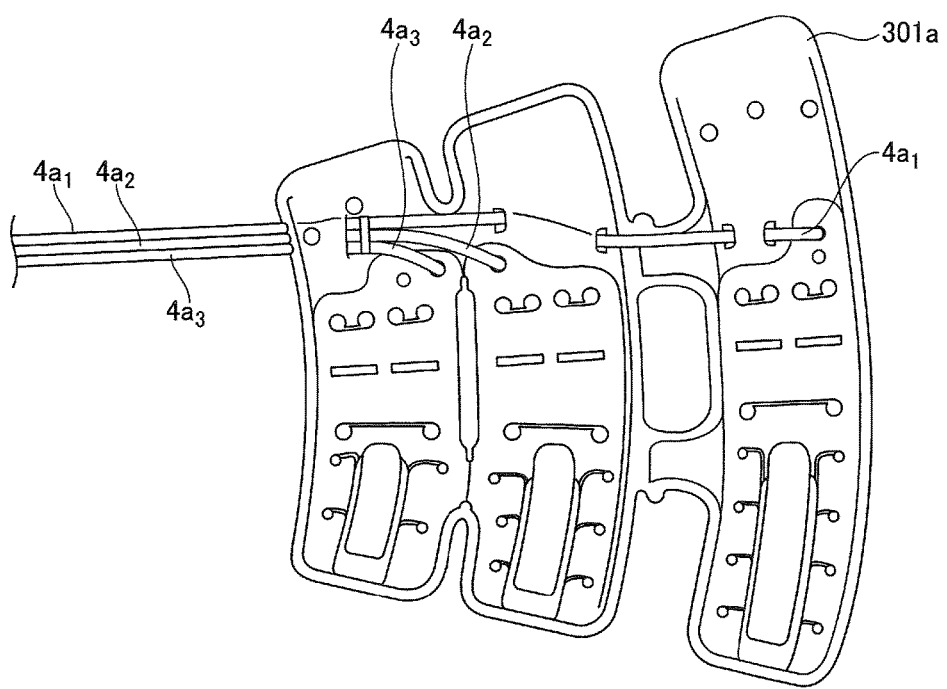
FIG. 35 is a schematic plan view that illustrates an overview of a state in which the medical instrument illustrated in FIG. 34 is expanded before attachment to a human body.

(a) A first abnormal-mode (error mode E1) is a "system-high pressure error" that comes out when the internal pressure of the medical instrument becomes high. A case where sleeves (garments) 301a and 301b as illustrated in FIGS. 34 and 35 are wound around lower limbs or the bottoms of feet will now be described. For example, when the sleeves are wound around the "the bottoms of feet" defined as "first portions", an internal pressure of the medical instrument of 24 kPa or more can be defined as a "system-high pressure error". On the other hand, when the sleeves are wound around the "lower limbs (legs)" defined as "second portions", an internal pressure of the medical instrument of 12 kPa or more can be defined as a "system-high pressure error".

(b) A second abnormal-mode (error mode E2) is a "high pressure error" that comes out when the attached state for the "first portions" and the "second portions" is an over-tightened state at the time of normal use. For example, for the "first portions", when the internal pressure is 18 kPa or more continuously for ten cycles or is 21.3 kPa or more continuously for five cycles, a "high pressure error" can be defined. On the other hand, for the "second portions", when the internal pressure is 6.3 kPa or more continuously for ten cycles or is 8.7 kPa or more continuously for five cycles, a "high pressure error" can be defined.

(c) A third abnormal-mode (error mode E3) is a "low pressure error" that comes out when the attached state for the "first portions" and the "second portions" is over loosened state at the time of normal use. For example, for the "first portions", when the internal pressure is 18.7 kPa or less continuously for ten cycles, a "low pressure error" can be defined. On the other hand, for the "second portions", when the internal pressure is 5.7 kPa or less continuously for ten cycles, a "low pressure error" can be defined.

(d) A fourth abnormal-mode (error mode E4) is a "system-low pressure error" that comes out when the internal pressure is out of a defined pressure range due to a factor other than the "system-high pressure error", the "high pressure error", and the "low pressure error". For example, for the "first portions", when the internal pressure is out of the range of 14.7 to 20 kPa continuously for 12 cycles, a "system-low pressure error" can be defined. On the other hand, for the "second portions", when the internal pressure is out of the range of 4.7 to 7.3 kPa continuously for 12 cycles, a "system-low pressure error" can be defined.

However, such quadruple abnormal-modes (error modes E1, E2, E3, and E4) are examples, and it may be implemented such that two to three abnormal-modes, five abnormal-modes or more, or other abnormal-modes are set depending on the characteristics of the fluid path exhibited by the DUT 3, and the abnormality emulator 21b performs emulation.

A leak tester $21a$ implementing the fluid-path tester according to the first embodiment, as illustrated in FIG. 1, includes: a measurement-compressor 34 that pressurizes a fluid-circuit implemented by a piping system having the path of an inspection tube $4_{xj}$ as a part of the fluid path; a supply-side solenoid valve $V_{4a}$ that is connected to the measurement-compressor 34 through an internal pipe $g_1$; a manifold 31 that builds a pressure sensor S1 connected to the supply-side solenoid valve $V_{4a}$ through the internal pipe $g_2$; an exhaust-side solenoid valve $V_{4b}$ that is connected to the pressure sensor S1 through an internal pipe $g_3$; a proportional solenoid-valve $V_3$ for a leakage inspection that is connected to the exhaust-side solenoid valve $V_{4b}$ through an internal pipe $g_4$; a first-tube joint $f_{1a}$ that is connected to the pressure sensor S1 through an internal pipe $g_5$; and a second-tube joint $f_{2a}$ that is connected to the pressure sensor S1 through an internal pipe $g_6$. The inspection tube $4_{xj}$ (x=a, b; j=1 to 3) having a first attachment joint $f_{1b}$ in one end portion and a second attachment joint $f_{2b}$ in the other end portion is connected to the first-tube joint $f_{1a}$ and the second-tube joint $f_{2a}$. In addition, in FIG. 1, while the first-tube joint $f_{1a}$, the second-tube joint $f_{2a}$, the first attachment joint $f_{1b}$, and the second attachment joint $f_{2b}$ are illustrated as a flange type, it is a schematic representation. Thus, actually, both ends of the inspection tube $4_{xj}$ (x=a, b; j=1 to 3) do not need to be a flange type, but various kinds of connecting joint such as a male-female socket type and the like may be employed.

Meanwhile, the abnormality emulator $21b$ implementing the fluid-path tester according to the first embodiment, as illustrated in FIG. 2, includes a pressure sensor S2 for an A-port first-tube, a pressure sensor S3 for an A-port second-tube, and a pressure sensor S4 for an A-port third-tube that are connected to an A-port of the DUT 3 sequentially through a first-tube $4_{a1}$, a second-tube $4_{a2}$, and a third-tube $4_{a3}$ that are triple dedicated tubes. Similarly, the abnormality emulator $21b$ further includes a pressure sensor S5 for the B-port first-tube, a pressure sensor S6 for the B-port second-tube, and a pressure sensor S7 for the B-port third-tube that are connected to a B-port of the DUT 3 sequentially through the first-tube $4_{b1}$, the second-tube $4_{b2}$, and the third-tube $4_{b3}$ that are the triple dedicated tubes. The inspection tube $4_{xj}$, (x=a, b; j=1 to 3) in FIG. 1 corresponds to one of the A-port first-tube $4_{a1}$, the A-port second-tube $4_{a2}$, the A-port third-tube $4_{a3}$, the B-port first-tube $4_{b1}$, the B-port second-tube $4_{b2}$, and the B-port third-tube $4_{b3}$.

In addition, the abnormality emulator $21b$ includes: a first solenoid-valve $V_{2a1}$ for the A-port first-tube connected to a first branching pipe branching in the horizontal direction from a vertical-direction internal pipe $g7_{a1}$ having one end portion connected to the pressure sensor S2 for the A-port first-tube; a second solenoid-valve $V_{5a1}$ for the A-port first-tube connected to a second branching pipe branching in the horizontal direction from the internal pipe $g7_{a1}$ adjacently to the first branching pipe; a pressure-adjusting proportional-solenoid (PAPS) valve $V_{1a2}$ for the A-port first-tube connected to the other end portion of the internal pipe $g7_{a1}$; and a proportional solenoid-valve $V_{1a1}$ for a buffer for the A-port first-tube connected to the first solenoid-valve $V_{2a1}$ through a horizontal-direction internal pipe $g8_{a1}$. By emulating the fluid-circuit characteristics of a plurality of abnormal-modes having possibilities of occurring in the fluid path designated by the A-port first-tube $4_{a1}$ of the DUT 3 through pressurization of a fluid pressure performed by the compressor-under-test 303 and the adjustment of the PAPS valve $V_{1a2}$ for the A-port first-tube and the proportional solenoid-valve $V_{1a1}$ for the buffer for the A-port first-tube, an abnormal condition of the fluid path of the system of the A-port first-tube $4_{a1}$ of the DUT 3 can be inspected. For example, when the DUT 3 is medical instrument used for the IPC method, since the presence of each of the quadruple abnormal-modes (the error modes E1, E2, E3, and E4) including the "system-high pressure error", the "high pressure error", the "low pressure error", and the "system-low pressure error" described above can be set as an abnormal condition of the fluid path of the DUT 3, by emulating the characteristics of the fluid-circuit that are represented by the quadruple abnormal-modes by applying the fluid pressure performed by the compressor-under-test 303 and the adjustment of the PAPS valve $V_{1a2}$ for the A-port first-tube and the proportional solenoid-valve $V_{1a1}$ for the buffer for the A-port first-tube, an abnormal condition of the fluid path of the system of the A-port first-tube $4_{a1}$ of the DUT 3 can be inspected. Here, the compressor-under-test 303 included in the DUT 3 is a compressor capable of pressurizing a low pressure regime of about 30 kPa or less or the like.

Similarly, the abnormality emulator $21b$ includes: a first solenoid-valve $V_{2a2}$ for the A-port second-tube connected to a first branching pipe (not illustrated in the Drawing) branching in the horizontal direction from a vertical-direction pipe (not illustrated in the Drawing) having one end portion connected to the pressure sensor S3 for the A-port second-tube; a second solenoid-valve $V_{5a2}$ for the A-port second-tube connected to a second branching pipe (not illustrated in the Drawing) branching in the horizontal direction from a vertical-direction pipe adjacently to the first branching pipe; a PAPS valve $V_{1a4}$ for the A-port second-tube connected to the other end portion of the vertical-direction pipe; and a proportional solenoid-valve $V_{1a3}$ for a buffer for the A-port second-tube connected to the first solenoid-valve $V_{2a2}$ through a horizontal-direction pipe (not illustrated in the Drawing). By emulating the characteristics of the fluid-circuit represented by an abnormal-mode occurring in the fluid path designated by the A-port second-tube $4_{a2}$ of the DUT 3 through pressurization of a fluid pressure performed by the compressor-under-test 303 and the adjustment of the PAPS valve $V_{1a4}$ for the A-port second-tube and the proportional solenoid-valve $V_{1a3}$ for the buffer for the A-port second-tube, an abnormal condition of the fluid path of the system of the A-port second-tube $4_{a2}$ of the DUT 3 can be inspected.

In addition, the abnormality emulator $21b$ includes: a first solenoid-valve $V_{2a3}$ for the A-port third-tube connected to a first branching pipe (not illustrated in the Drawing) branching in the horizontal direction from a vertical-direction pipe (not illustrated in the Drawing) having one end portion connected to the pressure sensor S4 for the A-port third-tube; a second solenoid-valve $V_{5a3}$ for the A-port third-tube connected to a second branching pipe (not illustrated in the Drawing) branching in the horizontal direction from a vertical-direction pipe adjacently to the first branching pipe; a PAPS valve $V_{1a6}$ for the A-port third-tube connected to the other end portion of the vertical-direction pipe; and a proportional solenoid-valve $V_{1a5}$ for a buffer for the A-port third-tube connected to the first solenoid-valve $V_{2a3}$ through a horizontal-direction pipe (not illustrated in the Drawing). By emulating the characteristics of the fluid-circuit designated by the A-port third-tube $4_{a3}$ of the DUT 3 through pressurization of a fluid pressure performed by the compressor-under-test 303 and the adjustment of the PAPS valve $V_{1a6}$ for the A-port third-tube and the proportional solenoid-valve $V_{1a5}$ for the buffer for the A-port third-tube, an abnormal condition of the fluid path of the system of the A-port third-tube $4_{a3}$ of the DUT 3 can be inspected.

Furthermore, the abnormality emulator 21b includes: a first solenoid-valve $V_{2b1}$ for the B-port first-tube connected to a first branching pipe branching in the horizontal direction from a vertical-direction internal pipe $g7_{b1}$ having one end portion connected to the pressure sensor S5 for the B-port first-tube; a second solenoid-valve $V_{5b1}$ for the B-port first-tube connected to a second branching pipe branching in the horizontal direction from the internal pipe $g7_{b1}$ adjacently to the first branching pipe; a PAPS valve $V_{1b2}$ for the B-port first-tube connected to the other end portion of the internal pipe $g7_{b1}$; and a proportional solenoid-valve $V_{1b1}$ for a buffer for the B-port first-tube connected to the first solenoid-valve $V_{2b1}$ through a horizontal-direction internal pipe $g8_{b1}$. By emulating the characteristics of the fluid-circuit designated by the B-port first-tube $4_{b1}$ of the DUT 3 through pressurization of a fluid pressure performed by the compressor-under-test 303 and the adjustment of the PAPS valve $V_{1b2}$ for the B-port first-tube and the proportional solenoid-valve $V_{1b1}$ for the buffer for the B-port first-tube, an abnormal condition of the fluid path of the system of the B-port first-tube $4_{b1}$ of the DUT 3 can be inspected.

In addition, the abnormality emulator 21b includes: a first solenoid-valve $V_{2b2}$ for the B-port second-tube, a second solenoid-valve $V_{5b2}$ for the B-port second-tube, and the PAPS valve $V_{1b4}$ for the B-port second-tube connected to the pressure sensor S6 for the B-port second-tube through a pipe (not illustrated in the Drawing) of a π type; and a proportional solenoid-valve $V_{1b3}$ for the buffer for the B-port second-tube connected to the first solenoid-valve $V_{2b2}$ through a horizontal-direction pipe (not illustrated in the Drawing). By emulating the characteristics of the fluid-circuit designated by the B-port second-tube $4_{b2}$ of the DUT 3 through pressurization of a fluid pressure performed by the compressor-under-test 303 and the adjustment of the PAPS valve $V_{1b4}$ for the B-port second-tube and the proportional solenoid-valve $V_{1b3}$ for the buffer for the B-port second-tube, an abnormal condition of the fluid path of the system of the B-port second-tube $4_{b2}$ of the DUT 3 can be inspected.

Furthermore, the abnormality emulator 21b includes: a first solenoid-valve $V_{2b3}$ for the B-port third-tube, a second solenoid-valve $V_{5b3}$ for the B-port third-tube, and the PAPS valve $V_{1b6}$ for the B-port third-tube connected to the pressure sensor S7 for the B-port third-tube through a pipe (not illustrated in the Drawing) of a π type; and a proportional solenoid-valve $V_{1b5}$ for the buffer for the B-port third-tube connected to the first solenoid-valve $V_{2b3}$ through a horizontal-direction pipe (not illustrated in the Drawing). By emulating the characteristics of the fluid-circuit designated by the B-port third-tube $4_{b3}$ of the DUT 3 through pressurization of a fluid pressure performed by the compressor-under-test 303 and the adjustment of the PAPS valve $V_{1b6}$ for the B-port third-tube and the proportional solenoid-valve $V_{1b5}$ for the buffer for the B-port third-tube, an abnormal condition of the fluid path of the system of the B-port third-tube $4_{b3}$ of the DUT 3 can be inspected.

Figure 3:
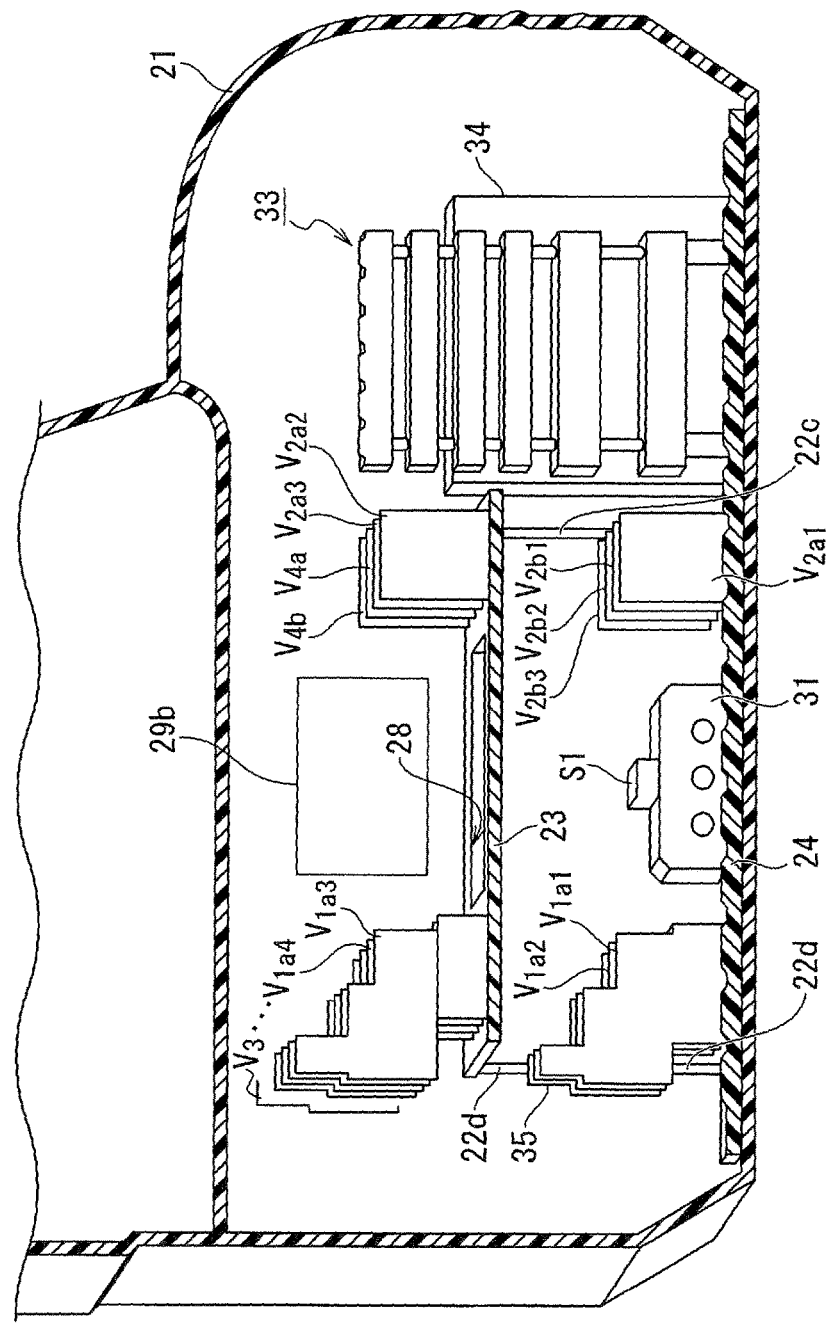
FIG. 3 is a partial cross-sectional perspective view that illustrates an overview of a major part of a lower small room enclosed by a casing of the fluid-path tester according to the first embodiment viewed from the left face side.
Figure 4:
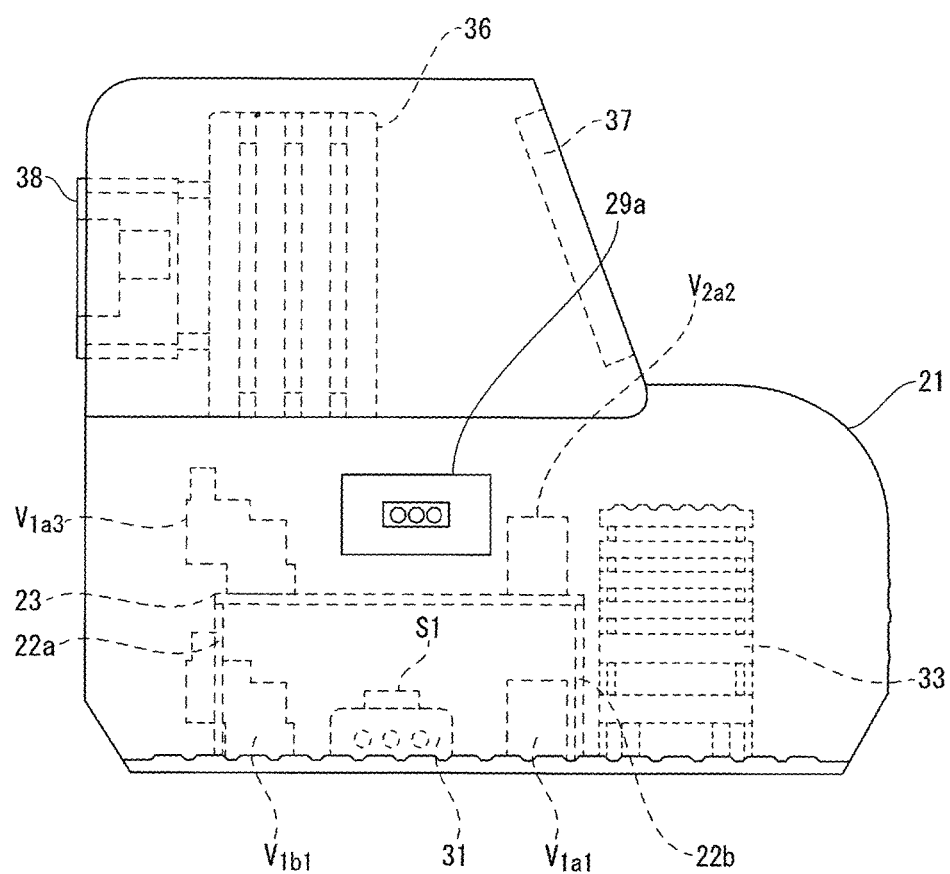
FIG. 4 is a left side view that projects the entire fluid-path tester according to the first embodiment including an upper small room or a lower small room.
Figure 5:
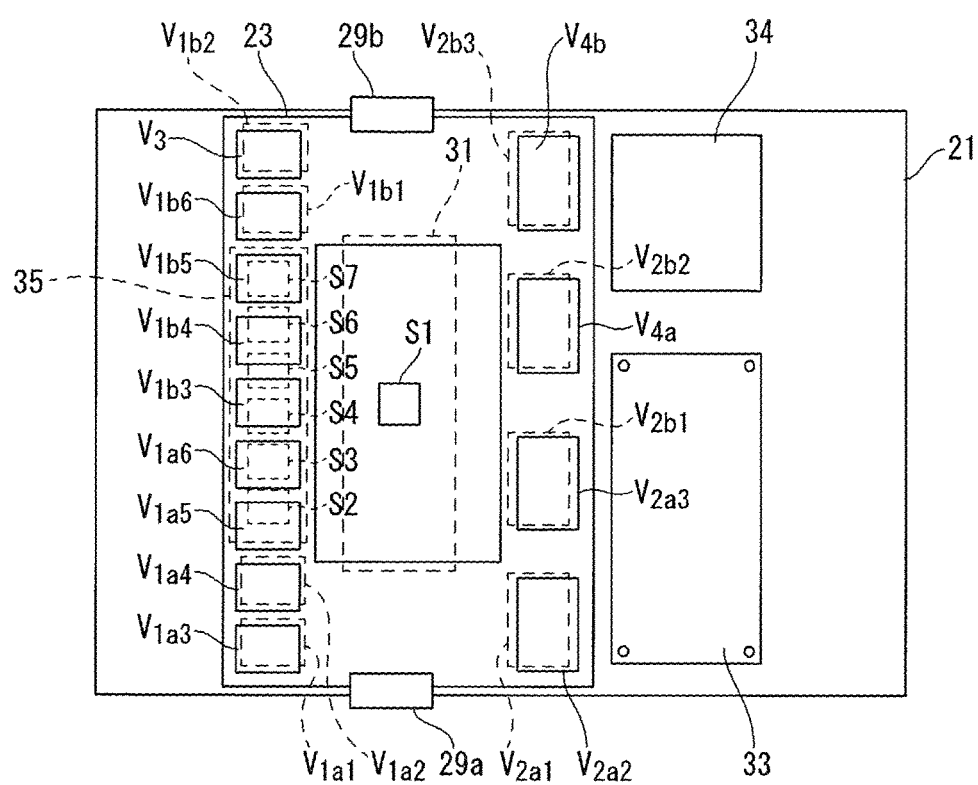
FIG. 5 is a partial perspective plan view focusing on the lower small room enclosed by the casing of the fluid-path tester according to the first embodiment.

While a partial cross-sectional perspective view of the lower small room enclosed by a casing (exterior) 21 of the fluid-path tester according to the first embodiment is illustrated in FIG. 3, and a partial perspective plan view focusing on the lower small room enclosed by the casing 21 is illustrated in FIG. 5, the measurement-compressor 34 is arranged on a first pedestal board (base) 24 at a position located in a back part (an upper portion disposed on the right side in FIG. 5) of the right side illustrated in FIG. 3. While FIG. 4 is a left-side view projecting the entirety including the upper small room and the lower small room enclosed by the casing 21. As illustrated in FIGS. 3 and 4, on a lower stage side (first stage side) of the left side of the measurement-compressor 34, sequentially from the front side, a first solenoid-valve $V_{2a1}$ for the A-port first-tube, a first solenoid-valve $V_{2b1}$ for the B-port first-tube, a first solenoid-valve $V_{2b2}$ for the B-port second-tube, and a first solenoid-valve $V_{2b3}$ for the B-port third-tube are compactly arranged on the first pedestal board 24 toward the back side of the sheet face. On the first pedestal board 24 of the left side of the arrangement of the first solenoid-valve $V_{2a1}$ for the A-port first-tube, the first solenoid-valve $V_{2b1}$ for the B-port first-tube, the first solenoid-valve $V_{2b2}$ for the B-port second-tube, and the first solenoid-valve $V_{2b3}$ for the B-port third-tube, the manifold 31 including the pressure sensor S1 is arranged. In FIGS. 3 and 4, on the first pedestal board 24 of the left side of the manifold 31, sequentially from the front side, the proportional solenoid-valve $V_{1a1}$ for the buffer for the A-port first-tube, the PAPS valve $V_{1a2}$ for the A-port first-tube, the pressure sensor unit 35, the proportional solenoid-valve $V_{1b1}$ for the buffer for the B-port first-tube, and the PAPS valve $V_{1b2}$ for the B-port first-tube are compactly arranged. As illustrated in FIG. 5, as the pressure sensor unit 35, in order from the lower side (the front side in FIGS. 3 and 4), the pressure sensor S2 for the A-port first-tube, the pressure sensor S3 for the A-port second-tube, the pressure sensor S4 for the A-port third-tube, the pressure sensor S5 for the B-port first-tube, the pressure sensor S6 for the B-port second-tube, and the pressure sensor S7 for the B-port third-tube are compactly arranged.

As illustrated in FIGS. 3 and 4, on the manifold 31, a rectangular second pedestal board (base) 23 including a rectangular opening portion 28 has four corners supported by four posts 22a, 22b, 22c, and 22d and is disposed in a hollow state. In an area disposed on the right side of the second pedestal board 23, in order from the front side, the first solenoid-valve $V_{2a2}$ for the A-port second-tube, the first solenoid-valve $V_{2a3}$ for the A-port third-tube, the supply-side solenoid valve $V_{4a}$, and the exhaust-side solenoid valve $V_{4b}$ are compactly arranged as valves of an upper stage side (second stage side). As can be understood from the partial perspective plan view of FIG. 5, the first solenoid-valve $V_{2a2}$ for the A-port second-tube, the first solenoid-valve $V_{2a3}$ for the A-port third-tube, the supply-side solenoid valve $V_{4a}$, and the exhaust-side solenoid valve $V_{4b}$ are respectively arranged on the upper sides of the arrangement positions of the first stage side of the first solenoid-valve $V_{2a1}$ for the A-port first-tube, the first solenoid-valve $V_{2b1}$ for the B-port first-tube, the first solenoid-valve $V_{2b2}$ for the B-port second-tube, and the first solenoid-valve $V_{2b3}$ for the B-port third-tube and establishes a compact structure.

Meanwhile, in an area disposed on the left side of the second pedestal board 23 with the opening portion 28 interposed between the right side and the left side, in order from the front side, the proportional solenoid-valve $V_{1a3}$ for the buffer for the A-port second-tube, the PAPS valve $V_{1a4}$ for the A-port second-tube, the proportional solenoid-valve $V_{1a5}$ for the buffer for the A-port third-tube, the PAPS valve $V_{1a6}$ for the A-port third-tube, the proportional solenoid-valve $V_{1b3}$ for the buffer for the B-port second-tube, the PAPS valve $V_{1b4}$ for the B-port second-tube, the proportional solenoid-valve $V_{1b5}$ for the buffer for the B-port third-tube, the PAPS valve $V_{1b6}$ for the B-port third-tube, and the proportional solenoid-valve $V_3$ for a leakage inspection are arranged as valves disposed on the second stage side and establish a compact structure. As can be understood from the partial perspective plan view of FIG. 5, the proportional solenoid-valve $V_{1a3}$ for the buffer for the A-port second-tube, the PAPS valve $V_{1a4}$ for the A-port second-tube, the proportional solenoid-valve $V_{1a5}$ for the buffer for the A-port third-tube, the PAPS valve $V_{1a6}$ for the A-port third-tube, the proportional solenoid-valve $V_{1b3}$ for the buffer for the B-port second-tube, the PAPS valve $V_{1b4}$ for the B-port second-tube, the proportional solenoid-valve $V_{1b5}$ for the buffer for the B-port third-tube, the PAPS valve $V_{1b6}$ for the B-port third-tube, and the proportional solenoid-valve $V_3$ for a leakage inspection are respectively arranged on the upper sides of the arrangement positions of the first stage side of the proportional solenoid-valve $V_{1a1}$ for the buffer for the A-port first-tube, the PAPS valve $V_{1a2}$ for the A-port first-tube, the pressure sensor S2 for the A-port first-tube, the pressure sensor S3 for the A-port second-tube, the pressure sensor S4 for the A-port third-tube, the pressure sensor S5 for the B-port first-tube, the pressure sensor S6 for the B-port second-tube, the pressure sensor S7 for the B-port third-tube, the proportional solenoid-valve $V_{1b1}$ for the buffer for the B-port first-tube, and the PAPS valve $V_{1b2}$ for the B-port first-tube and establish a compact structure. While not illustrated in the Drawing, a pipe (fluid path) connecting a fluid path of the first stage and a fluid path of the second stage and the like pass through the opening portion 28.

Figure 6A:
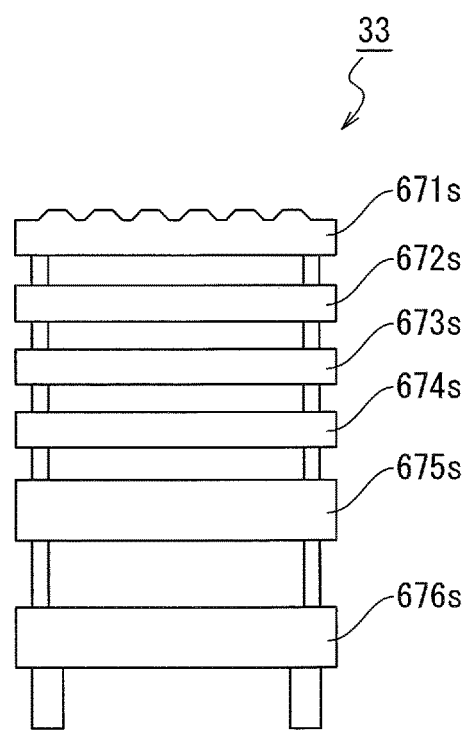
FIG. 6A is a schematic side view that illustrates an overview of a major part of a print board stack arranged in the lower small room of the fluid-path tester according to the first embodiment.

As illustrated in the partial cross-sectional perspective view of FIG. 3 and on the front side (a lower portion of the right side of the partial perspective plan view focusing on the substructure of FIG. 5) of the right side of the left-side view of FIG. 4, a print board stack 33 implemented by hexa-level print boards is arranged on the first pedestal board 24. As illustrated in FIG. 6A, in the print board stack 33, from the lower stage side, a board 676s for a power supply circuit, a board 675s for a first proportional-solenoid-valve drive-circuit, a board 674s for a second proportional-solenoid-valve drive-circuit, a board 673s for a third proportional-solenoid-valve drive-circuit, a board 672s for a compressor drive-circuit, and a board 671s for an solenoid-valve drive-circuit are stacked in the mentioned order through spacers (collars), each of which provides a predetermined space between the boards 671s, 672s, 673s, 674s, 675s and 671s, respectively.

Figure 6B:
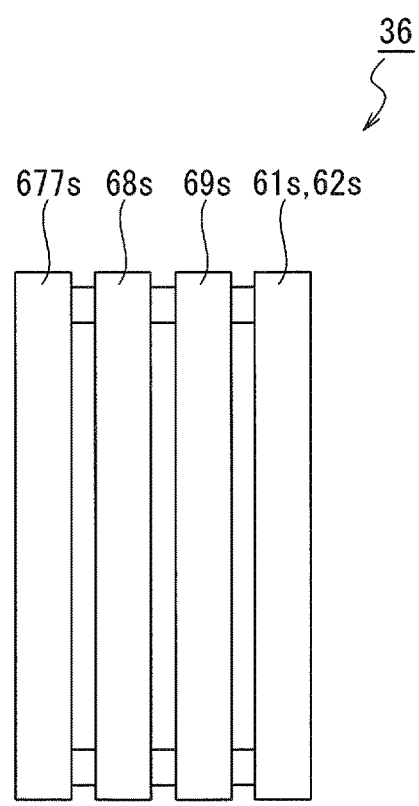
FIG. 6B is a schematic side view that illustrates an overview of a major part of a print board stack arranged in the upper small room of the fluid-path tester according to the first embodiment.

As illustrated in FIG. 4, in the upper small room (upstairs) enclosed by the casing 21, a print board stack 36 implemented by quadruple print boards is arranged. As illustrated in FIG. 6B, in the print board stack 36, in order from the left side, a board 677s for a sensor-signal amplification-circuit, a board 68s for an emulation control-circuit for the B-port, a board 69s for an emulation control-circuit for the A-port, and a board 61s for a touch-panel drive-circuit are stacked through spacers (collars), each of spacers provides a predetermined space between the boards 677s, 68s, 69s and 61s, respectively toward the right side. In the case illustrated in FIG. 6B, on the back side of the sheet face of the board 61s for the touch-panel drive-circuit disposed at the right end, the board 62s for a leak-test controller is separate from the board 69s for the emulation control-circuit for the A-port and is arranged on the right side of board 69s for the emulation control-circuit for the A-port.

A connector holder 38 connecting dedicated tubes of the DUT 3 is disposed to be exposed to an exterior from a left-side space of the upper small room enclosed by the casing 21 illustrated in FIG. 4. Meanwhile, in an exterior portion disposed on the right side of the casing 21 illustrated in FIG. 4, a touch panel 37 is disposed. In addition, as illustrated in FIG. 5, a leak-test tube-connecter (female) 29a and a leak-test tube-connecter (a male) 29b are exposed to an exterior from the center portion of the lower small room enclosed by the casing 21. In the partial cross-sectional perspective view of the lower small room enclosed by the casing 21 illustrated in FIG. 3, the leak-test tube-connecter (male) 29b is illustrated in a center portion of the lower small room. In addition, in the left-side view of FIG. 4, the leak-test tube-connecter (female) 29a of triple holes is illustrated in a center portion of the lower small room. In other words, in FIG. 1, the first-tube joint $f_{1a}$, the second-tube joint $f_{2a}$, and the first attachment joint $f_{1b}$ and the second attachment joint $f_{2b}$ are represented as a single flange type, it is a schematic representation. Actually, triple inspection tubes $4_{xj}$ (x=a, b; j=1 to 3) may be simultaneously connected to the fluid-path tester according to the first embodiment using the leak-test tube-connecter 29a (female) of triple holes and the leak-test tube-connecter (male) 29b as can be understood from the left-side view of FIG. 4.

By employing the physical structure as illustrated in FIGS. 3 to 6, the measurement-compressor 34 is included, and triple dedicated tubes (inspection tubes) $4_{xj}$ are connected to the fluid-path tester according to the first embodiment by using the leak-test tube-connecter (female) 29a and the leak-test tube-connecter (male) 29b. Then, triple fluid-circuits acquired by closing the paths of the triple dedicated tubes (inspection tubes) $4_{xj}$ as parts of triple fluid paths are implemented. The leak tester 21a inspects leakages of the triple inspection tubes $4_{xj}$ by pressurizing the triple fluid-circuits using the measurement-compressor 34 and maintaining the pressure in the fluid-circuits for a predetermined time.

Meanwhile, by using the connector holder 38 disposed in the upper small room of the casing 21, triple dedicated tubes (inspection tubes) $4_{xj}$ can be simultaneously connected, and triple fluid-circuits are established by the connector holder 38. The abnormality emulator 21b includes the PAPS valves ($V_{1a2}$, $V_{1a4}$, $V_{1a6}$, $V_{1b2}$, $V_{1b4}$, and $V_{1b6}$) and thus, can inspect abnormalities in the triple fluid paths of the DUT 3 by emulating the characteristics of fluid-circuits represented by abnormal-modes occurring in the triple fluid paths of the DUT 3 by applying the fluid pressure through the compressor-under-test 303 and the adjustment of the fluid pressures using the PAPS valves ($V_{1a2}$, $V_{1a4}$, $V_{1a6}$, $V_{1b2}$, $V_{1b4}$, and $V_{1b6}$). By employing the physical structure as illustrated in FIGS. 3 to 6, the leak tester 21a and the abnormality emulator 21b are physically housed inside the same casing 21 so as to construct a single miniaturized device.

Figure 7:
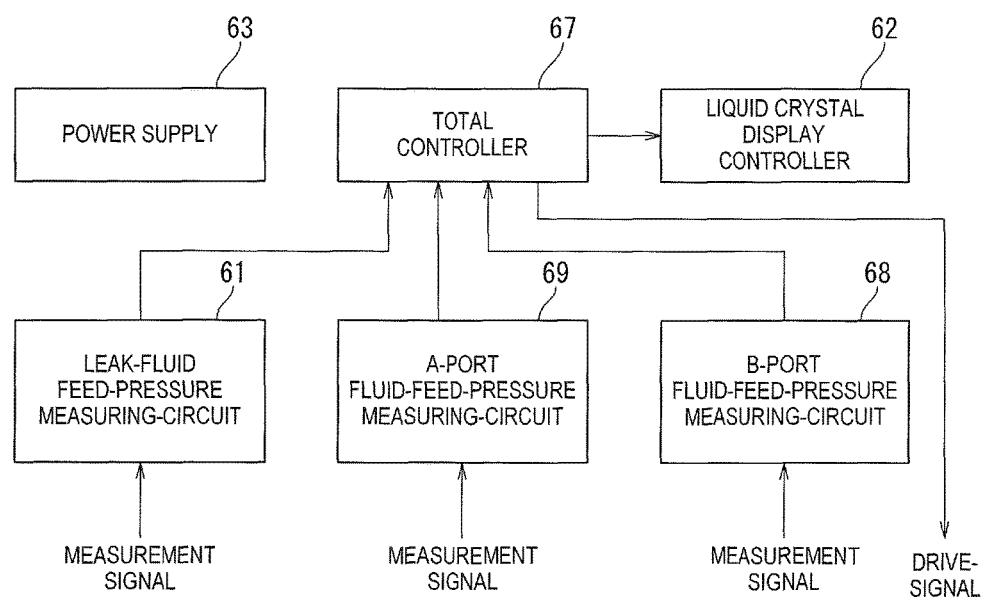
FIG. 7 is a block diagram that illustrates an overview of a major part of the system structure of the fluid-path tester according to the first embodiment.

The entirety of the print board stack 33 and the print board stack 36 that is a physical structure of the fluid-path tester according to the first embodiment establishes a system structure as illustrated in a block diagram illustrated in FIG. 7. In other words, the fluid-path tester according to the first embodiment includes: a leak-fluid feed-pressure (LFFP) measuring-circuit 61 that inspects a leakage of the inspection tube $4_{xj}$ as illustrated in FIG. 7; an A-port fluid-feed-pressure measuring-circuit 69 that emulates a normal operation and an abnormal operation of the A-port side of the DUT 3; a B-port fluid-feed-pressure measuring-circuit 68 that emulates a normal operation and an abnormal operation of the B-port side of the DUT 3; an total controller 67 that controls the entire operations of the LFFP measuring-circuit 61, the A-port fluid-feed-pressure measuring-circuit 69, and the B-port fluid-feed-pressure measuring-circuit 68; and a liquid crystal display (LCD) controller 62 for controlling the operation of a touch panel 37 illustrated in FIG. 4. By the touch panel 37, information required for leakage-test of the inspection tube $4_{xj}$, information required for the emulations of the normal operations and the abnormal operations of the A-port and B-port sides of the DUT 3 and the results of the inspection are displayed. While electrical connection relations are not illustrated, a DC voltage of 12 volts, five volts, or the like is supplied from a power supply 63 illustrated in FIG. 7 to the LFFP measuring-circuit 61, the A-port fluid-feed-pressure measuring-circuit 69, the B-port fluid-feed-pressure measuring-circuit 68, the total controller 67, and the LCD controller 62.

Figure 8:
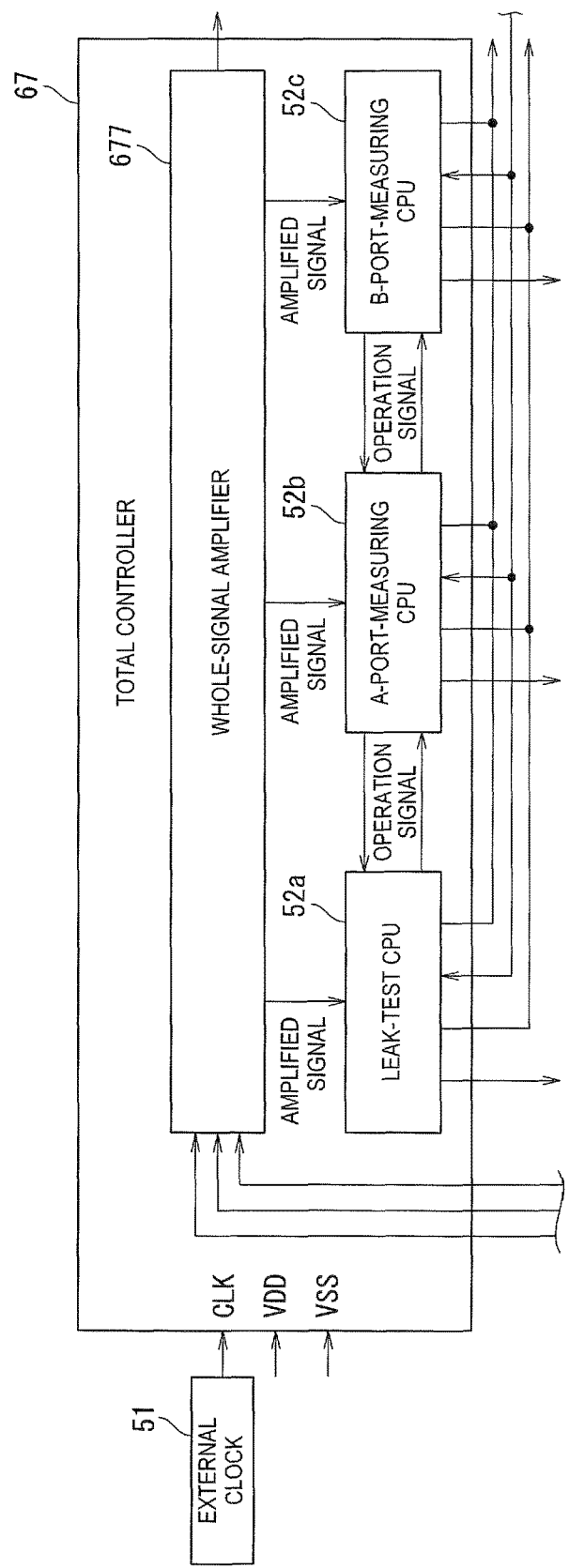
FIG. 8 is a block diagram that illustrates an overview of a major part of an entire control circuit used in the fluid-path tester according to the first embodiment.

As illustrated in FIG. 8, the total controller 67 includes a whole-signal amplifier 677, a leak-test processer (CPU) 52a, an A-port-measuring processer (CPU) 52b, and a B-port-measuring processer (CPU) 52c. The leak-test CPU 52a, the A-port-measuring CPU 52b, and the B-port-measuring CPU 52c operate in accordance with a clock signal supplied from an external clock 51. An amplified signal is supplied from the whole-signal amplifier 677 to each of the leak-test CPU 52a, the A-port-measuring CPU 52b, and the B-port-measuring CPU 52c. In addition, the leak-test CPU 52a and the A-port-measuring CPU 52b exchange operation signals of the leak-test CPU 52a and the A-port-measuring CPU 52b. And, furthermore, the A-port-measuring CPU 52b and the B-port-measuring CPU 52c also exchange operation signals of the A-port-measuring CPU 52b and the B-port-measuring CPU 52c.

Figure 9:
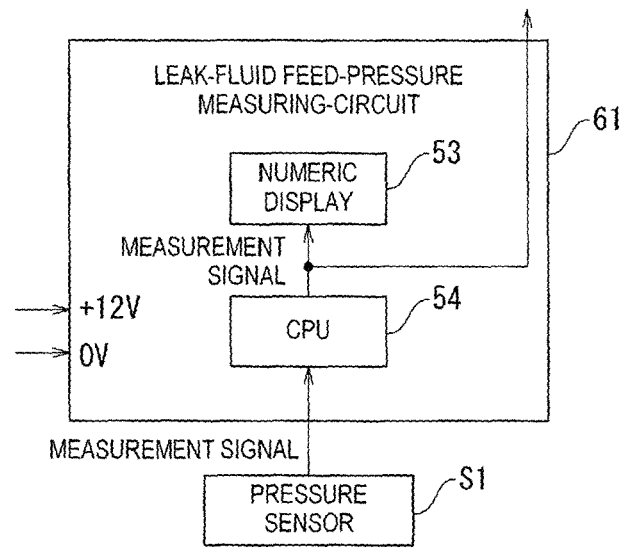
FIG. 9 is a block diagram that illustrates an overview of a major part of a fluid supply pressure measuring circuit for a leakage used in the fluid-path tester according to the first embodiment.
Figure 10:
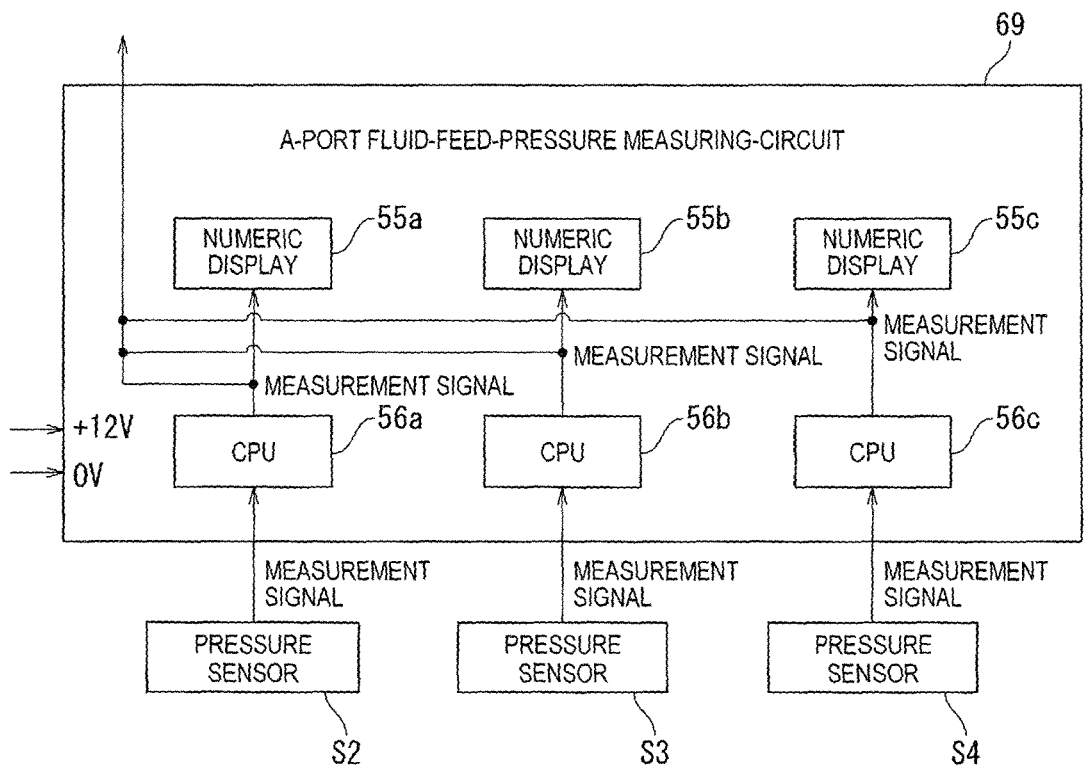
FIG. 10 is a block diagram that illustrates an overview of a major part of an A-port fluid supply pressure measuring circuit used in the fluid-path tester according to the first embodiment.

The LFFP measuring-circuit 61, as illustrated in FIG. 9, includes a processer (CPU) 54 and a numeric display circuit 53. Then, a measurement signal as a processing result of the arithmetic processing performed by the CPU 54 that has received a measurement signal from the pressure sensor S1 is transmitted to the numeric display circuit 53. The A-port fluid-feed-pressure measuring-circuit 69, as illustrated in FIG. 10, includes a first processer (CPU) 56a, a second processer (CPU) 56b, a third processer (CPU) 56c, a first numeric display circuit 55a, a second numeric display circuit 55b, and a third numeric display circuit 55c. A measurement signal as a processing result of the arithmetic processing performed by the first CPU 56a that has received a measurement signal from the pressure sensor S2 is transmitted to the first numeric display circuit 55a, a measurement signal as a processing result of the arithmetic processing performed by the second CPU 56b that has received a measurement signal from the pressure sensor S3 is transmitted to the second numeric display circuit 55b, and a measurement signal as a processing result of the arithmetic processing performed by the third CPU 56c that has received a measurement signal from the pressure sensor S4 is transmitted to the third numeric display circuit 55c.

Figure 11:
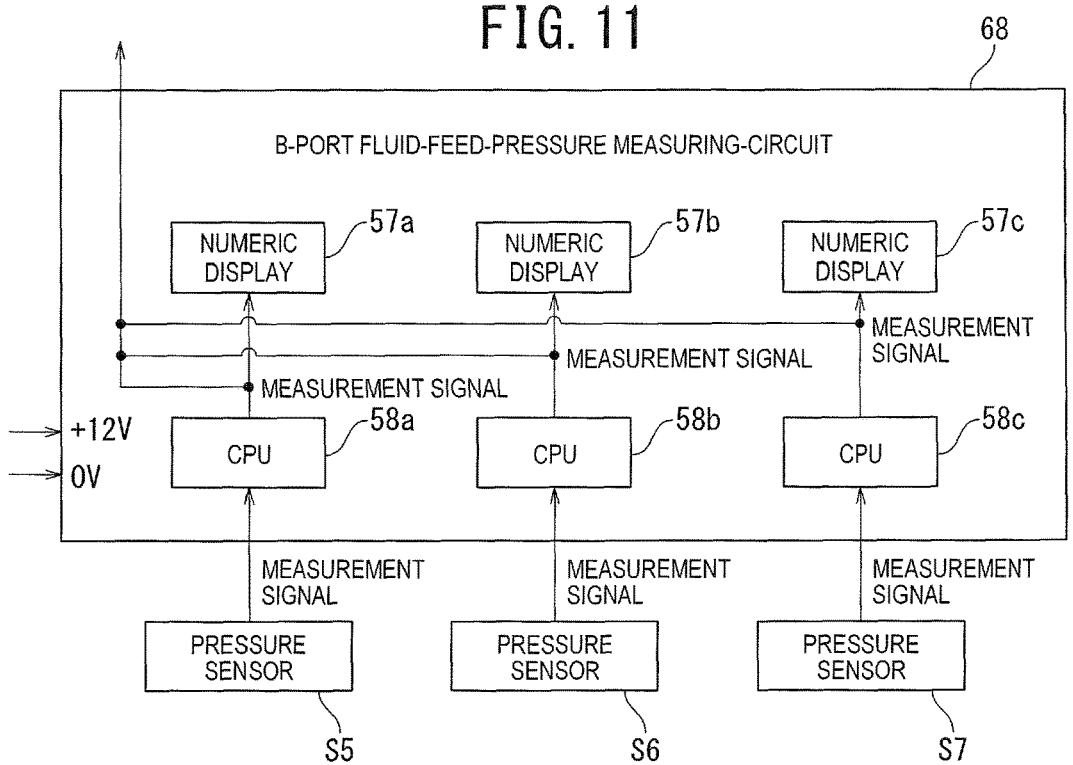
FIG. 11 is a block diagram that illustrates an overview of a major part of a B-port fluid supply pressure measuring circuit used in the fluid-path tester according to the first embodiment.

The B-port fluid-feed-pressure measuring-circuit 68, as illustrated in FIG. 11, includes a first processer (CPU) 58a, a second processer (CPU) 58b, a third processer (CPU) 58c, a first numeric display circuit 57a, a second numeric display circuit 57b, and a third numeric display circuit 57c. A measurement signal as a processing result of the arithmetic processing performed by the first CPU 58a that has received a measurement signal from the pressure sensor S5 is transmitted to the first numeric display circuit 57a, a measurement signal as a processing result of the arithmetic processing performed by the second CPU 58b that has received a measurement signal from the pressure sensor S6 is transmitted to the second numeric display circuit 57b, and a measurement signal as a processing result of the arithmetic processing performed by the third CPU 58c that has received a measurement signal from the pressure sensor S7 is transmitted to the third numeric display circuit 57c.

Figure 12:
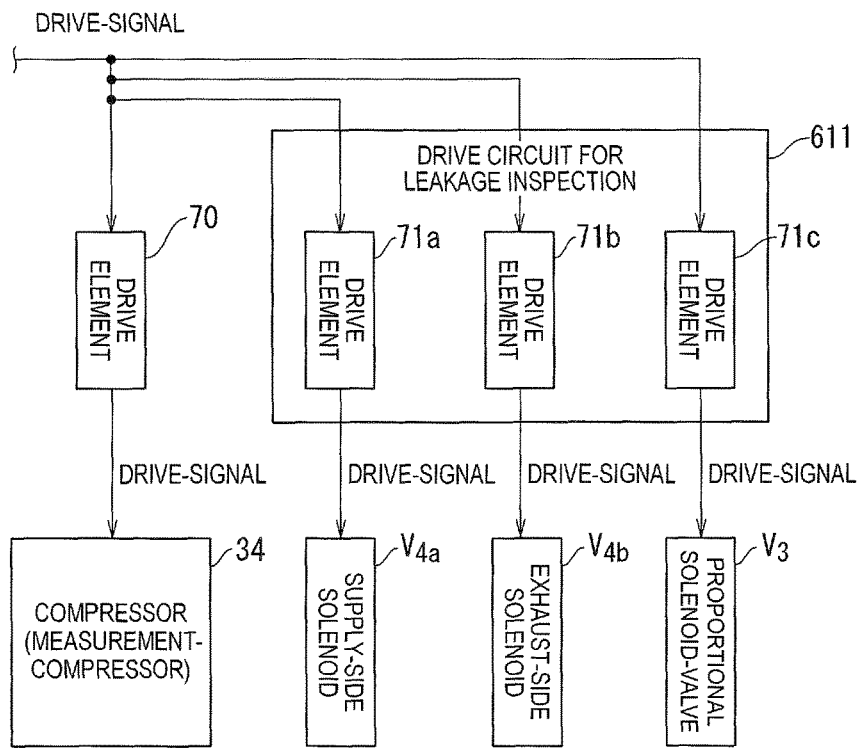
FIG. 12 is a block diagram that illustrates a relation between a drive circuit for leakage inspection used in the fluid-path tester according to the first embodiment and elements driven by the drive circuit used for leakage inspection.

A drive-signal transmitted from the leak-test CPU 52a illustrated in FIG. 8, as illustrated in FIG. 12, is delivered to a drive element 70, and the drive element 70 drives the measurement-compressor 34. In addition, the drive-signal transmitted from the leak-test CPU 52a as illustrated in FIG. 12, is delivered to a drive element 71a, and the drive element 71a drives the supply-side solenoid valve $V_{4a}$, the drive-signal transmitted from the leak-test CPU 52a is delivered to a drive element 71b, and the drive element 71b drives the exhaust-side solenoid valve $V_{4b}$, and the drive-signal transmitted from the leak-test CPU 52a is delivered to a drive element 71c, and the drive element 71c drives the proportional solenoid-valve $V_3$ for a leakage inspection. As illustrated in FIG. 12, the drive circuit 611 for a leakage inspection is implemented by the drive element 71a, the drive element 71b, and the drive element 71c.

Figure 13:
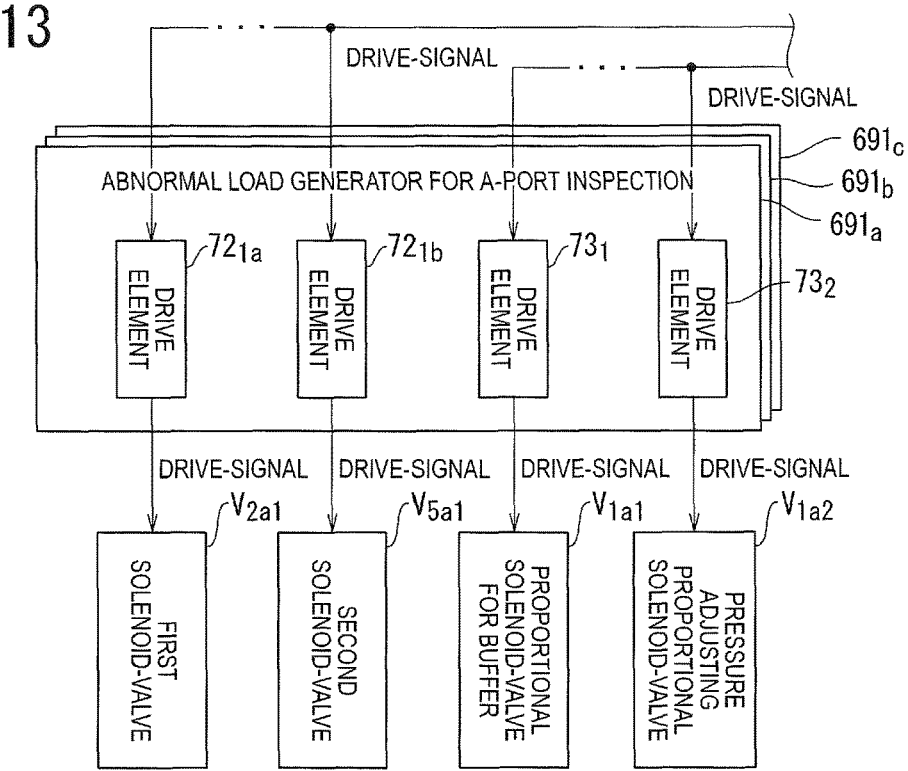
FIG. 13 is a block diagram that illustrates a relation between an abnormal-load generator for A-port inspection used in the fluid-path tester according to the first embodiment and elements driven by the abnormal-load generator for A-port inspection.

A drive-signal transmitted from the A-port-measuring CPU 52b illustrated FIG. 8 is delivered to the drive element 721a illustrated in FIG. 13, and the drive element $72_{1a}$ operates the first solenoid-valve $V_{2a1}$ for the A-port first-tube. Similarly, a drive-signal transmitted from the A-port-measuring CPU 52b is delivered to the drive element $72_{1b}$, and the drive element $72_{1b}$ operates the second solenoid-valve $V_{5a1}$ for the A-port first-tube. In addition, the drive-signal transmitted from the A-port-measuring CPU 52b is delivered to a drive element $73_1$, and the drive element $73_1$ operates the proportional solenoid-valve $V_{1a1}$ for the buffer for the A-port first-tube, and the drive-signal transmitted from the A-port-measuring CPU 52b is delivered to a drive element $73_2$, and the drive element $73_2$ operates the PAPS valve $V_{1a2}$ for the A-port first-tube. As illustrated in FIG. 13, an abnormal-load generator $691_a$ for inspecting the A-port for the first-tube is implemented by quadruple drive elements including the drive element $72_{1a}$, the drive element $72_{1b}$, the drive element $73_1$, and the drive element $73_2$.

In FIG. 13, while the first solenoid-valve $V_{2a2}$ for the A-port second-tube, the second solenoid-valve $V_{5a2}$ for the A-port second-tube, the proportional solenoid-valve $V_{1a3}$ for the buffer for the A-port second-tube, and the PAPS valve $V_{1a4}$ for the A-port second-tube are not illustrated, from the A-port-measuring CPU 52b illustrated in FIG. 8, drive-signals are fed to an abnormal-load generator $691_b$ for inspecting the A-port for the second-tube that is implemented by quadruple drive elements operating the first solenoid-valve $V_{2a2}$ for the A-port second-tube, the second solenoid-valve $V_{5a2}$ for the A-port second-tube, the proportional solenoid-valve $V_{1a3}$ for the buffer for the A-port second-tube, and the PAPS valve $V_{1a4}$ for the A-port second-tube that are illustrated in FIG. 2.

Similarly, in FIG. 13, while the first solenoid-valve $V_{2a3}$ for the A-port third-tube, the second solenoid-valve $V_{5a3}$ for the A-port third-tube, the proportional solenoid-valve $V_{1a5}$ for the buffer for the A-port third-tube, and the PAPS valve $V_{1a6}$ for the A-port third-tube are not illustrated, from the A-port-measuring CPU 52b illustrated in FIG. 8, drive-signals are fed to an abnormal-load generator $691_c$ for inspecting the A-port for the third-tube that is implemented by quadruple drive elements operating the first solenoid-valve $V_{2a3}$ for the A-port third-tube, the second solenoid-valve $V_{5a3}$ for the A-port third-tube, the proportional solenoid-valve $V_{1a5}$ for the buffer for the A-port third-tube, and the PAPS valve $V_{1a6}$ for the A-port third-tube that are illustrated in FIG. 2.

Figure 14:
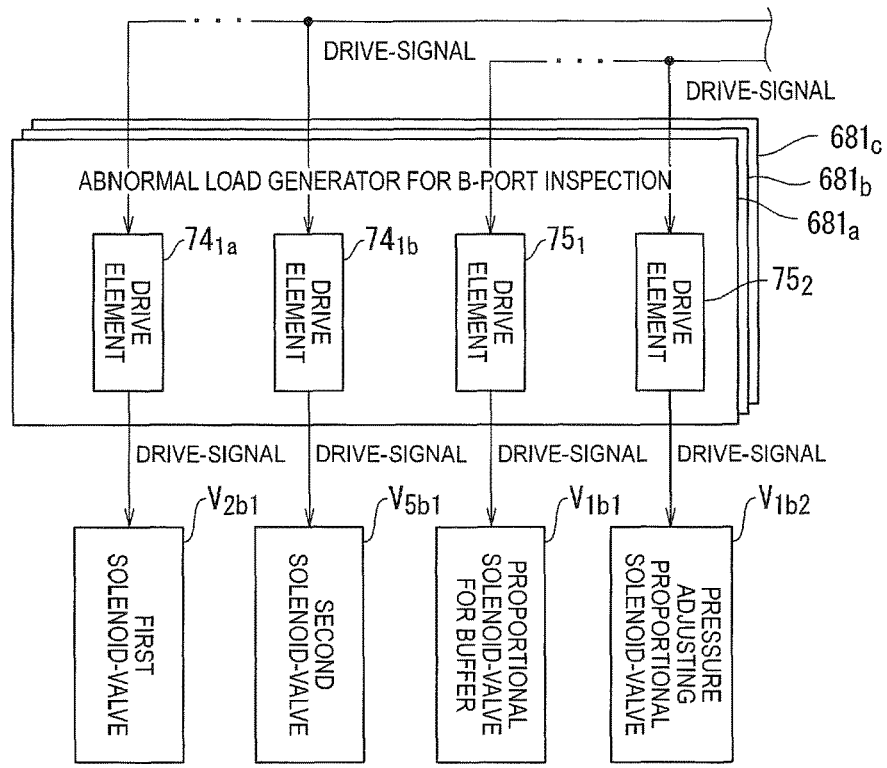
FIG. 14 is a block diagram that illustrates a relation between an abnormal-load generator for B-port inspection used in the fluid-path tester according to the first embodiment and elements driven by the abnormal-load generator for B-port inspection.

A drive-signal transmitted from the B-port-measuring CPU 52c illustrated in FIG. 8 is delivered to a drive element $74_{1a}$ illustrated in FIG. 14, and the drive element $74_{1a}$ drives the first solenoid-valve $V_{2b1}$ for the B-port first-tube. Similarly, the drive-signal transmitted from the B-port-measuring CPU 52c illustrated in FIG. 8 is delivered to a drive element $74_{1b}$, and the drive element $74_{1b}$ drives the second solenoid-valve $V_{5b1}$ for the B-port first-tube. In addition, the drive-signal transmitted from the B-port-measuring CPU 52c is delivered to a drive element $75_1$, and the drive element $75_1$ drives the proportional solenoid-valve $V_{1b1}$ for the buffer for the B-port first-tube, and the drive-signal transmitted from the B-port-measuring CPU 52c is delivered to a drive element $75_2$, and the drive element $75_2$ drives the PAPS valve $V_{1b2}$ for the B-port first-tube. As illustrated in FIG. 14, an abnormal-load generator $681_a$ for inspecting the B-port for the first-tube is implemented by quadruple drive elements including the drive element $74_{1a}$, the drive element $74_{1b}$, the drive element $75_1$, and the drive element $75_2$.

In FIG. 14, while the first solenoid-valve $V_{2b2}$ for the B-port second-tube, the second solenoid-valve $V_{5b2}$ for the B-port second-tube, the proportional solenoid-valve $V_{1b3}$ for the buffer for the B-port second-tube, and the PAPS valve $V_{1b4}$ for the B-port second-tube are not illustrated, from the B-port-measuring CPU 52c illustrated in FIG. 8, drive-signals are fed to an abnormal-load generator $681_b$ for inspecting the B-port for the second-tube that is implemented by quadruple drive elements operating the first solenoid-valve $V_{2b2}$ for the B-port second-tube, the second solenoid-valve $V_{5b2}$ for the B-port second-tube, the proportional solenoid-valve $V_{1b3}$ for the buffer for the B-port second-tube, and the PAPS valve $V_{1b4}$ for the B-port second-tube that are illustrated in FIG. 2.

Similarly, in FIG. 14, while the first solenoid-valve $V_{2b3}$ for the B-port third-tube, the second solenoid-valve $V_{5b3}$ for the B-port third-tube, the proportional solenoid-valve $V_{1b5}$ for the buffer for the B-port third-tube, and the PAPS valve $V_{1b6}$ for the B-port third-tube are not illustrated, from the B-port-measuring CPU 52c illustrated in FIG. 8, drive-signals are fed to an abnormal-load generator $681_c$ for inspecting the B-port for the third-tube that is implemented by quadruple drive elements operating the first solenoid-valve $V_{2b3}$ for the B-port third-tube, the second solenoid-valve $V_{5b3}$ for the B-port third-tube, the proportional solenoid-valve $V_{1b5}$ for the buffer for the B-port third-tube, and the PAPS valve $V_{1b6}$ for the B-port third-tube that are illustrated in FIG. 2.

Figure 15:
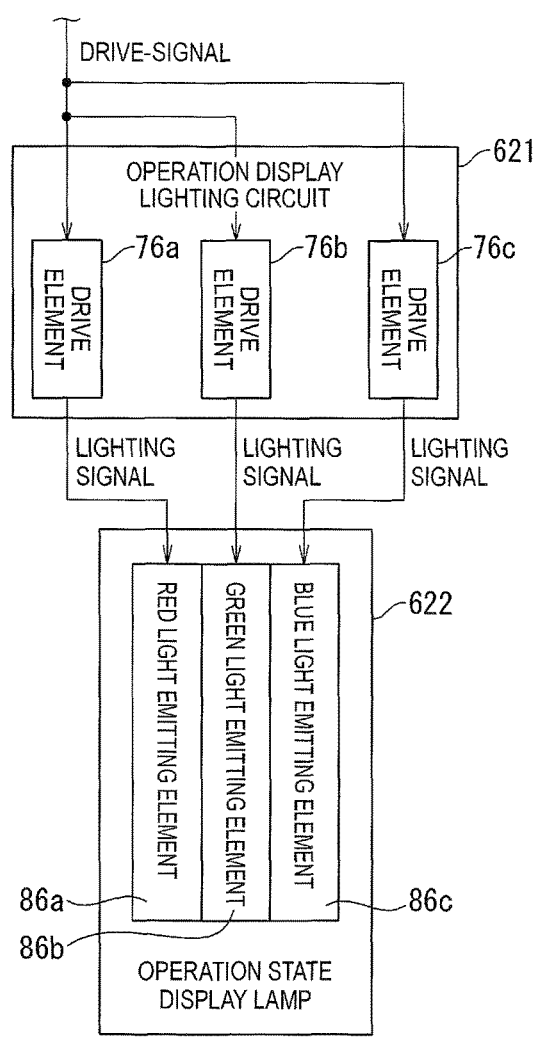
FIG. 15 is a block diagram that illustrates a relation between an operation-display lighting (ODL) circuit used in the fluid-path tester according to the first embodiment and elements driven by the ODL circuit.

From each of the leak-test CPU 52a the A-port-measuring CPU 52b, and the B-port-measuring CPU 52c, a drive-signal is delivered to an operation display lighting (ODL) circuit 621 including a drive element 76a, a drive element 76b, and a drive element 76c illustrated in FIG. 15, and the drive element 76a transmits a lighting signal to a red light emitting element 86a, whereby the red light emitting element 86a is lighted. Similarly, the drive element 76b transmits a lighting signal to a green light emitting element 86b, whereby the green light emitting element 86b is lighted. In addition, the drive element 76c transmits a lighting signal to a blue light emitting element 86c, whereby the blue light emitting element 86c is lighted. An operation state display lamp 622, as illustrated in FIG. 15, is implemented by the red light emitting element 86a, the green light emitting element 86b, and the blue light emitting element 86c.

Finding a malfunction or a failure of the DUT 3 is an inverse-problem analysis. For example, in computer tomography, based on only an output result, the internal structure that is not visible is determined by the inverse-problem analysis. By the fluid-path tester according to the first embodiment of the present invention, an inverse-problem analysis of discriminate a problem in the system ascribable to the compressor-under-test 303 implementing the DUT 3, from a problem of a leakage in the inspection tube $4_{xj}$ (x=a, b; j=1 to 3) that is a dedicated tube used for the DUT 3, from a problem in the suppression pressure for the "first portion" or the "second portion" of the sleeves 301a and 301b used for the DUT 3, or the like is established in a simple and a short-time operation, using a single miniaturized device, by classifying into a plurality of abnormal-modes (the error modes E1, E2, E3, and E4), using the fluid-path tester which emulates the malfunctions or failures of the DUT 3. And, also for a system having a fluid path of a low pressure regime of about 30 kPa or less, a malfunction or a failure in the DUT 3 can be found in a simple manner.

(Operation 1 of Fluid Path Inspection Device: In Re Error Mode)

With reference to a flowchart illustrated in FIGS. 16 to 24, the processing flow of a fluid-path testing-method according to the first embodiment of the present invention in re "error mode (abnormal-mode)" will be described. In description presented with reference to the following flowchart of FIGS. 16 to 24, while the description will be presented on the premise of quadruple abnormal-modes (error modes E1, E2, E3, and E4) including the "system high-pressure error", the "high pressure error", the "low pressure error", and the "system low-pressure error" when the DUT 3 is medical instrument used for the IPC method, such quadruple abnormal-modes are examples, and double or triple abnormal-modes, quintuple or more abnormal-modes, or different abnormal-modes may be set based on the characteristics of the fluid path exhibited by the DUT 3. In other words, the operation of the fluid-path tester using quadruple abnormal-modes is an example for a simple description, and it is apparent that the operation can be established by other various abnormal-modes, orders, sequences, selections, operation methods, and the like including the modified example as long as they are within the scope of the claims.

Figure 19:
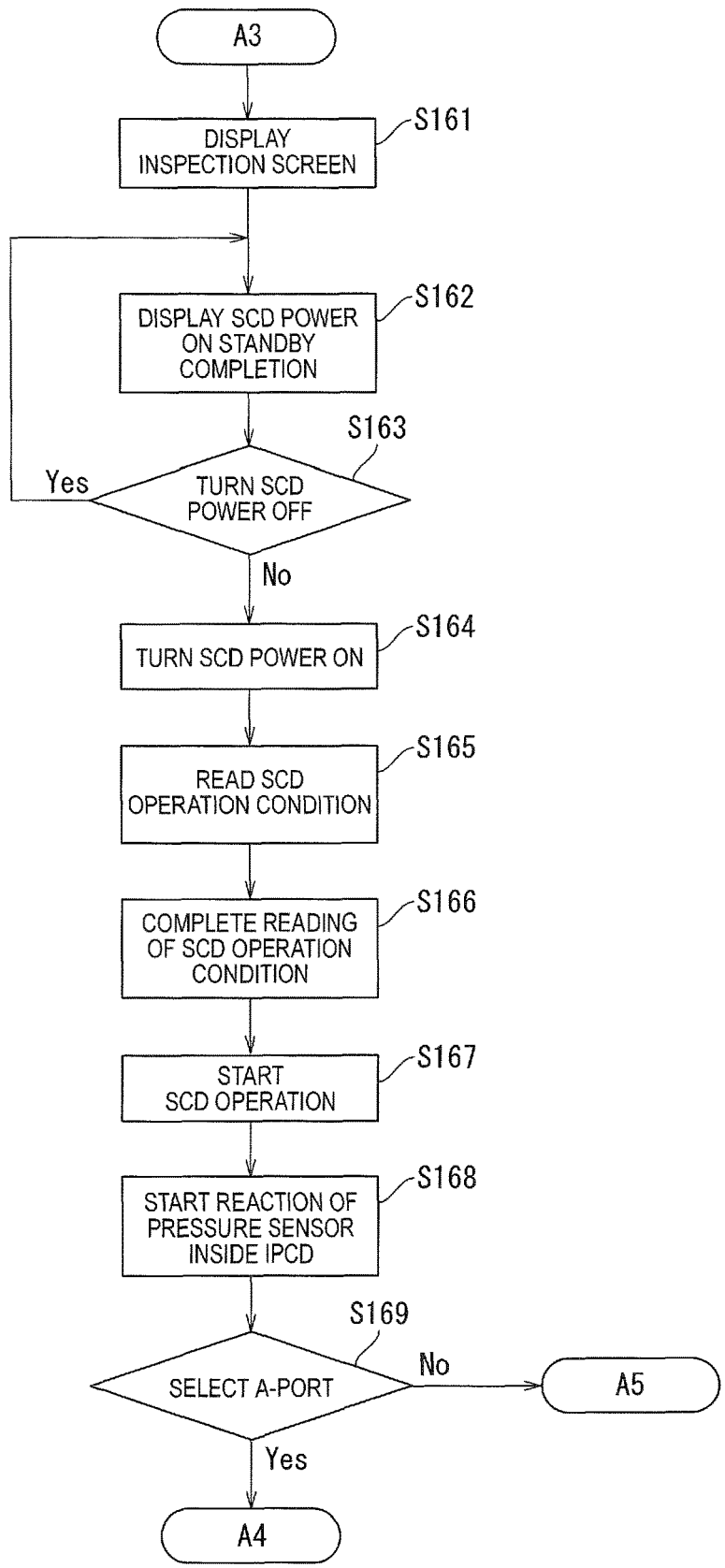
FIG. 19 is a flowchart (4) that illustrates an operation of the fluid-path tester according to the first embodiment in an "error mode"
Figure 22:
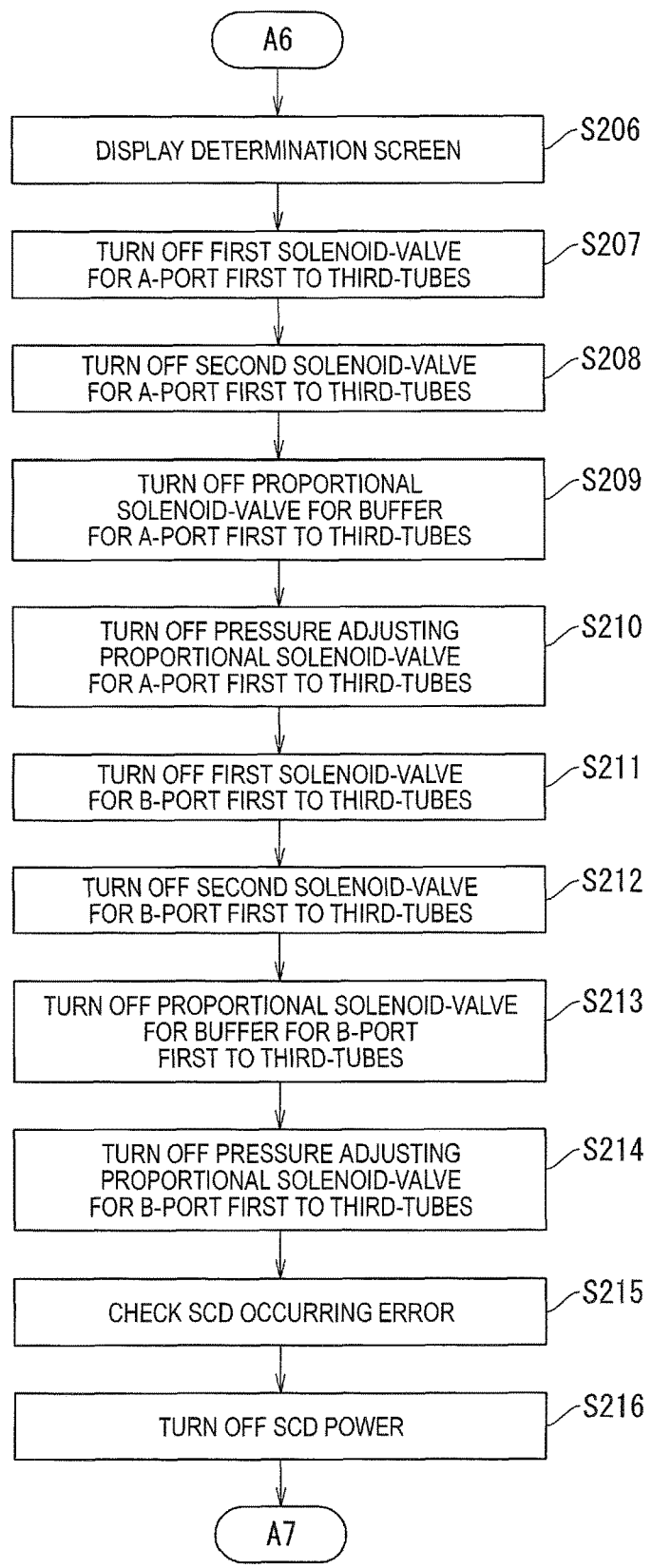
FIG. 22 is a flowchart (7) that illustrates an operation of the fluid-path tester according to the first embodiment in an "error mode"

In the flowchart illustrated in FIGS. 19 and 22, according to the restriction of the size of a frame on the Drawing, while the "DUT" is referred to an "SCD" that is an example of the DUT 3, and the "fluid-path tester" is referred to an "IPCD", the nomenclature are mere denotations for the convenience of description, and the "SCD" or the "IPCD" does not have a specific meaning. In addition, the DUT 3 inspected by the fluid-path tester according to the first embodiment of the present invention is not limited to the SCD, and the "fluid-path tester" is not limited to the IPCD.

(a) First, as illustrated in FIG. 2, a first-tube $4_{a1}$, a second-tube $4_{a2}$, and a third-tube $4_{a3}$ that are triple dedicated tubes are connected to the A-port of the DUT 3, and a first-tube $4_{b1}$, a second-tube $4_{b2}$, and a third-tube $4_{b3}$ that are triple dedicated tubes are connected to the B-port, whereby the DUT 3 and the fluid-path tester according to the first embodiment are connected to each other. Then, in step S101 illustrated in FIG. 16, "error mode" is selected using the touch panel 37 illustrated in FIG. 4 as an input unit, and the procedure proceeds to the selection of a port of step S102. In step S102, when the port has been selected (Yes), solenoid-valves for the B-port are closed, and the procedure proceeds to the setting of the A-port of step S103 and the process further proceeds to step S105. On the other hand, when no port has been selected (No) in step S102, the solenoid-valves for the A-port are closed, and the procedure proceeds to the setting of the B-port of step S104 and further proceeds to step S105. In other words, the flow of the flowchart is determined such that the assignment of parameters can be selected for each one port, by using the process recited in steps S103 and S104, and the procedure proceeds to step S105.

Figure 16:
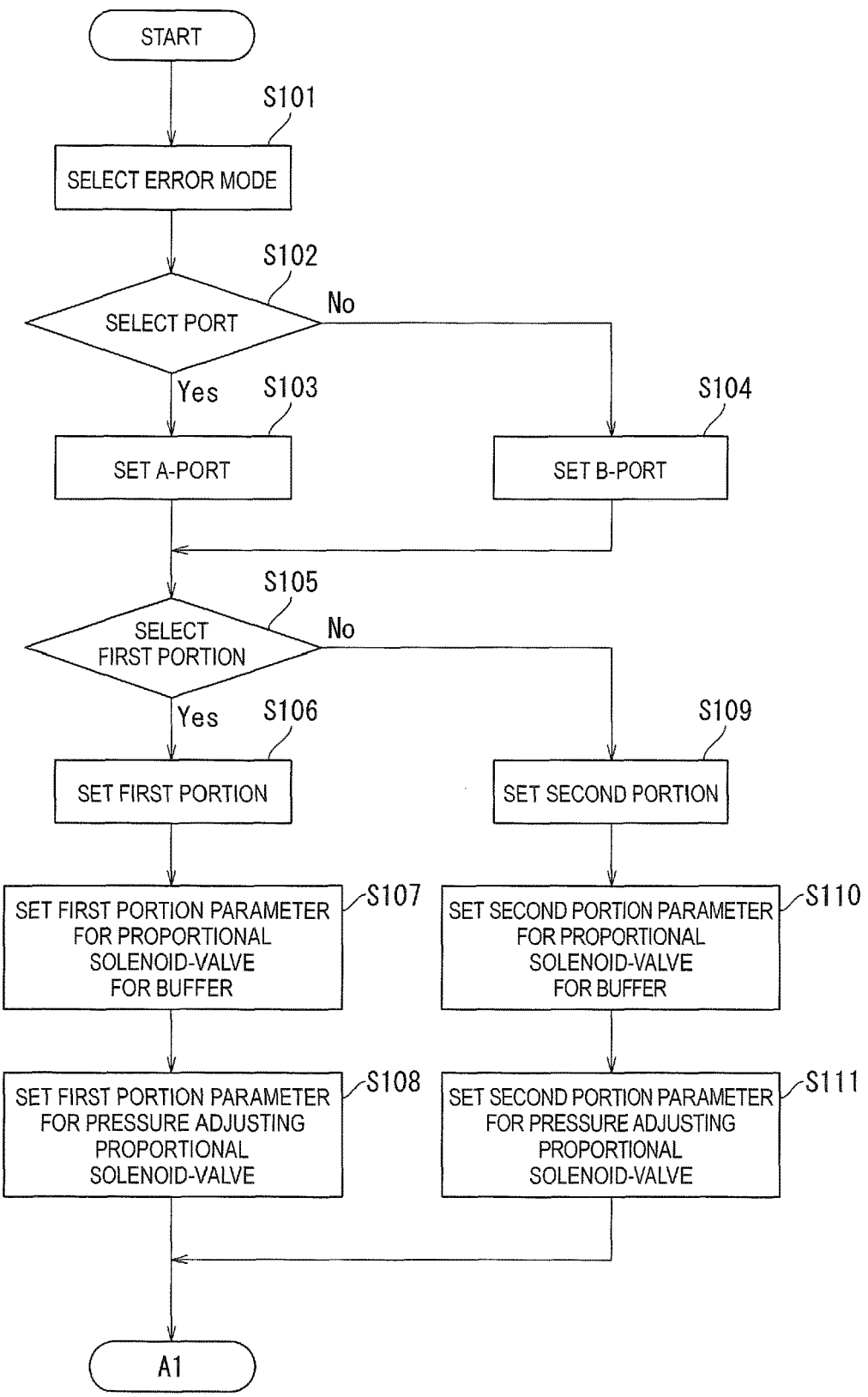
FIG. 16 is a flowchart (1) that illustrates an operation of the fluid-path tester according to the first embodiment in an "error mode (abnormal-mode)"

(b) In step S105 illustrated in FIG. 16, when the first portion is selected using the touch panel 37 illustrated in FIG. 4 as an input unit, "the setting of the first portion" is declared in step S106, and the procedure proceeds to step S107. In a case where the DUT 3 is medical instrument used for the IPC, the sleeves (garments) 301a and 301b as illustrated in FIGS. 34 and 35 are wound around lower limbs or the bottoms of feet. Accordingly, for example, a condition of winding the sleeves around the "the bottoms of feet" as "first portions" can be set, and a condition of winding the sleeves around the "lower limbs" as "second portions" can be set. In description presented below, for the convenience of description, while the "first portions" are defined as the "the bottoms of feet", and the "second portions" are defined as the "lower limbs (legs)", they are simple selections. Thus, the "first portions" may be set as the "lower limbs (legs)", and the "second portions" may be set as the "the bottoms of feet", and other parts may be used. In step S107, the proportional solenoid-valve $V_{1a1}$ for the buffer for the A-port first-tube, the proportional solenoid-valve $V_{1a3}$ for the buffer for the A-port second-tube, the proportional solenoid-valve $V_{1a5}$ for the buffer for the A-port third-tube are set to a condition required for setting a suppression pressure of the "first portions" on the touch panel 37, and the flow proceeds to step S108. In step S108, the PAPS valve $V_{1a2}$ for the A-port first-tube, the PAPS valve $V_{1a4}$ for the A-port second-tube, and the PAPS valve $V_{1a6}$ for the A-port third-tube are set to a condition required for setting a suppression pressure of the "first portions" on the touch panel 37, and the flow proceeds to step S112 illustrated in FIG. 17. In a case where the second portion is selected in step S105 illustrated in FIG. 16, the "setting of the second portion" is declared in step S109, and the flow proceeds to step S110. In step S110, the proportional solenoid-valve $V_{1a1}$ for the buffer for the A-port first-tube, the proportional solenoid-valve $V_{1a3}$ for the buffer for the A-port second-tube, and the proportional solenoid-valve $V_{1a5}$ for the buffer for the A-port third-tube are set to a condition required for setting the suppression pressure of the "second portions" on the touch panel 37, and the flow proceeds to step S111. In step S111, the PAPS valve $V_{1a2}$ for the A-port first-tube, the PAPS valve $V_{1a4}$ for the A-port second-tube, and the PAPS valve $V_{1a6}$ for the A-port third-tube are set to a condition required for setting the suppression pressure of the "second portions" on the touch panel 37, and the flow proceeds to step S112 illustrated in FIG. 17.

Figure 17:
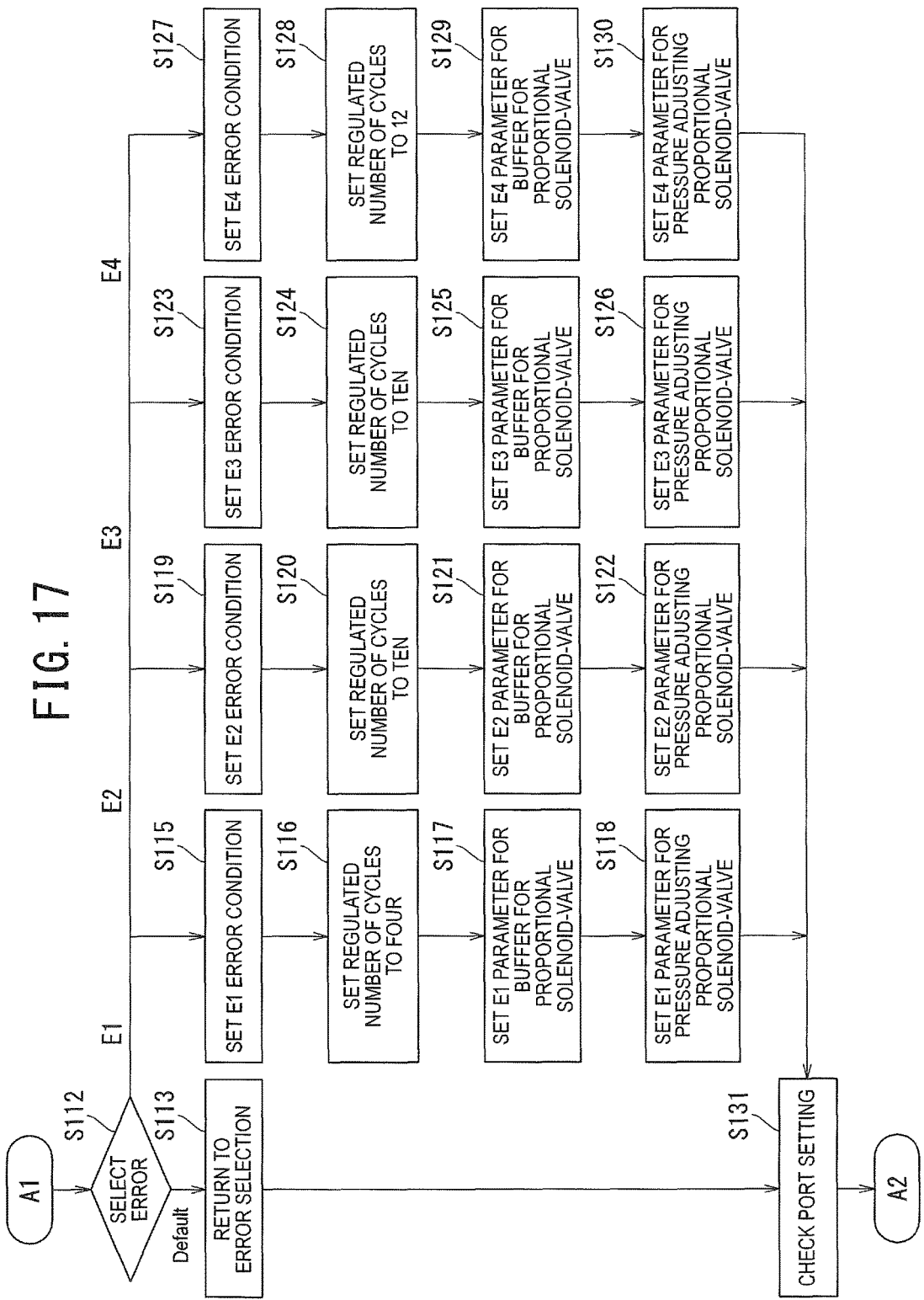
FIG. 17 is a flowchart (2) that illustrates an operation of the fluid-path tester according to the first embodiment in an "error mode"

(c) In a default condition of step S112 illustrated in FIG. 17, as step S113, the flow is returned to the selection of an error mode of step S101 illustrated in FIG. 16. Meanwhile, since quadruple error modes E1, E2, E3, and E4 can be selected using the touch panel 37 illustrated in FIG. 4 as an input unit, when a first abnormal-mode (the error mode E1) is selected, in step S115, the selection of the first abnormal-mode is declared, and the flow proceeds to step S116. In step S116, for example, the number of regulated cycles is set to four, and the flow proceeds to step S117. In step S117, the proportional solenoid-valve $V_{1a1}$ for the buffer for the A-port first-tube, the proportional solenoid-valve $V_{1a3}$ for the buffer for the A-port second-tube, and the proportional solenoid-valve $V_{1a5}$ for the buffer for the A-port third-tube are set to a parameter of the first abnormal-mode, and the flow proceeds to step S118. In step S118, the PAPS valve $V_{1a2}$ for the A-port first-tube, the PAPS valve $V_{1a4}$ for the A-port second-tube, and the PAPS valve $V_{1a6}$ for the A-port third-tube are set to a parameter of the first abnormal-mode, and the flow proceeds to step S131. In a case where a second abnormal-mode (the error mode E2) is selected using the touch panel 37 as the input unit, in step S119, the selection of the second abnormal-mode is declared, and, in step S120, for example, the number of regulated cycles is set to ten, and the flow proceeds to step S121. In step S121, the proportional solenoid-valve $V_{1a1}$ for the buffer for the A-port first-tube, the proportional solenoid-valve $V_{1a3}$ for the buffer for the A-port second-tube, and the proportional solenoid-valve $V_{1a5}$ for the buffer for the A-port third-tube are set to a parameter of the second abnormal-mode, and the flow proceeds to step S122. In step S122, the PAPS valve $V_{1a2}$ for the A-port first-tube, the PAPS valve $V_{1a4}$ for the A-port second-tube, and the PAPS valve $V_{1a6}$ for the A-port third-tube are set to a parameter of the second abnormal-mode, and the flow proceeds to step S131. When a third abnormal-mode (the error mode E3) is selected, in step S123, the selection of the third abnormal-mode is declared, and, in step S124, for example, the number of regulated cycles is set to ten, and the flow proceeds to step S125. In step S125, the proportional solenoid-valve $V_{1a1}$ for the buffer for the A-port first-tube, the proportional solenoid-valve $V_{1a3}$ for the buffer for the A-port second-tube, and the proportional solenoid-valve $V_{1a5}$ for the buffer for the A-port third-tube are set to a parameter of the third abnormal-mode, and the flow proceeds to step S126. In step S126, the PAPS valve $V_{1a2}$ for the A-port first-tube, the PAPS valve $V_{1a4}$ for the A-port second-tube, and the PAPS valve $V_{1a6}$ for the A-port third-tube are set to a parameter of the third abnormal-mode, and the flow proceeds to step S131. When a fourth abnormal-mode (the error mode E4) is selected, in step S127, the selection of the fourth abnormal-mode is declared, and, in step S128, for example, the number of regulated cycles is set to 12, and the flow proceeds to step S129. In step S129, the proportional solenoid-valve $V_{1a1}$ for the buffer for the A-port first-tube, the proportional solenoid-valve $V_{1a3}$ for the buffer for the A-port second-tube, and the proportional solenoid-valve $V_{1a5}$ for the buffer for the A-port third-tube are set to a parameter of the fourth abnormal-mode, and the flow proceeds to step S130. In step S130, the PAPS valve $V_{1a2}$ for the A-port first-tube, the PAPS valve $V_{1a4}$ for the A-port second-tube, and the PAPS valve $V_{1a6}$ for the A-port third-tube are set to a parameter of the fourth abnormal-mode, and the flow proceeds to step S131. When the port setting is checked in step S131, the flow proceeds to step S132 illustrated in FIG. 18A.

Figure 18A:
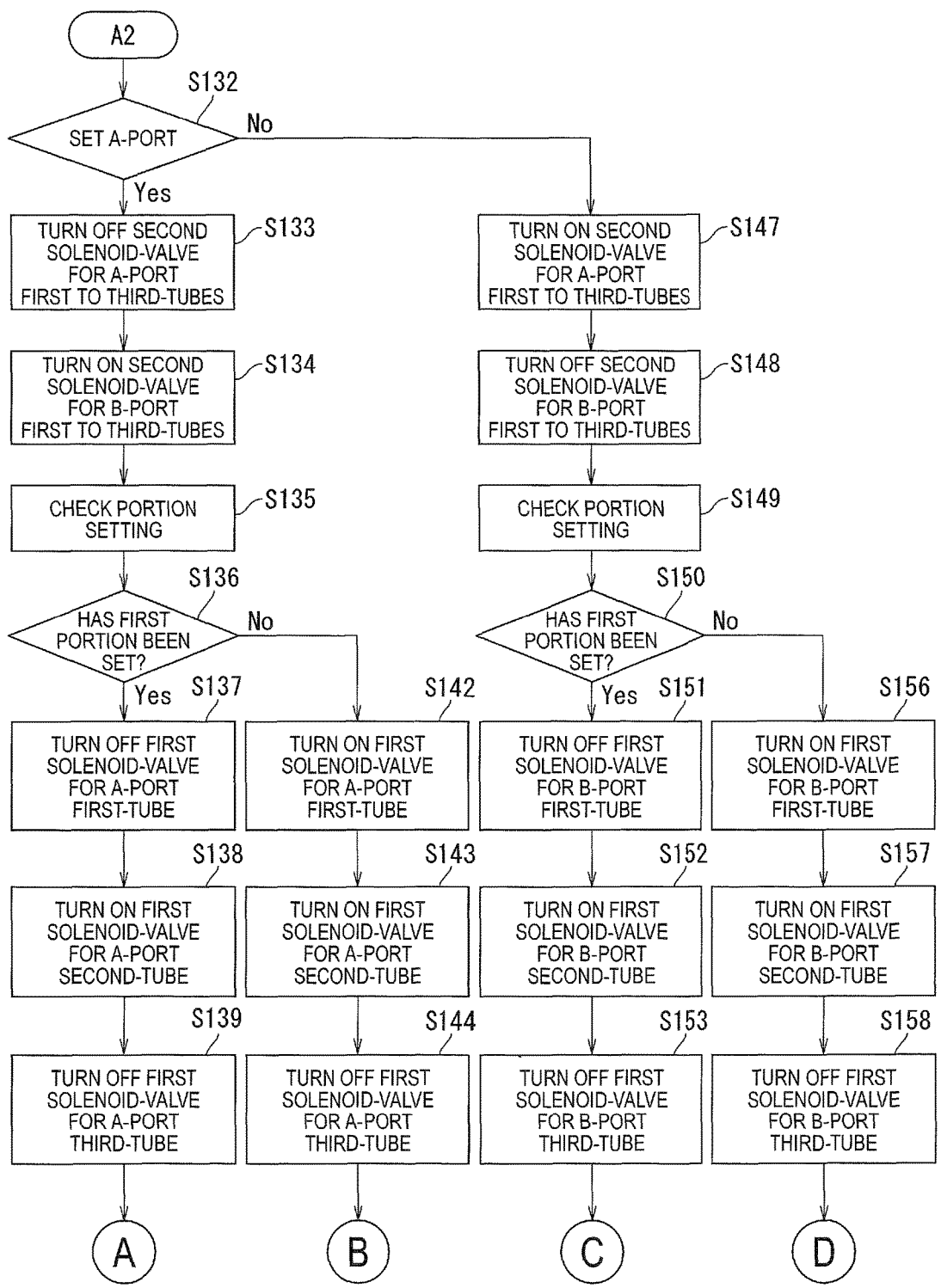
FIGS. 18A and 18B are flowcharts (3) that illustrate an operation of the fluid-path tester according to the first embodiment in an "error mode"
Figure 18B:
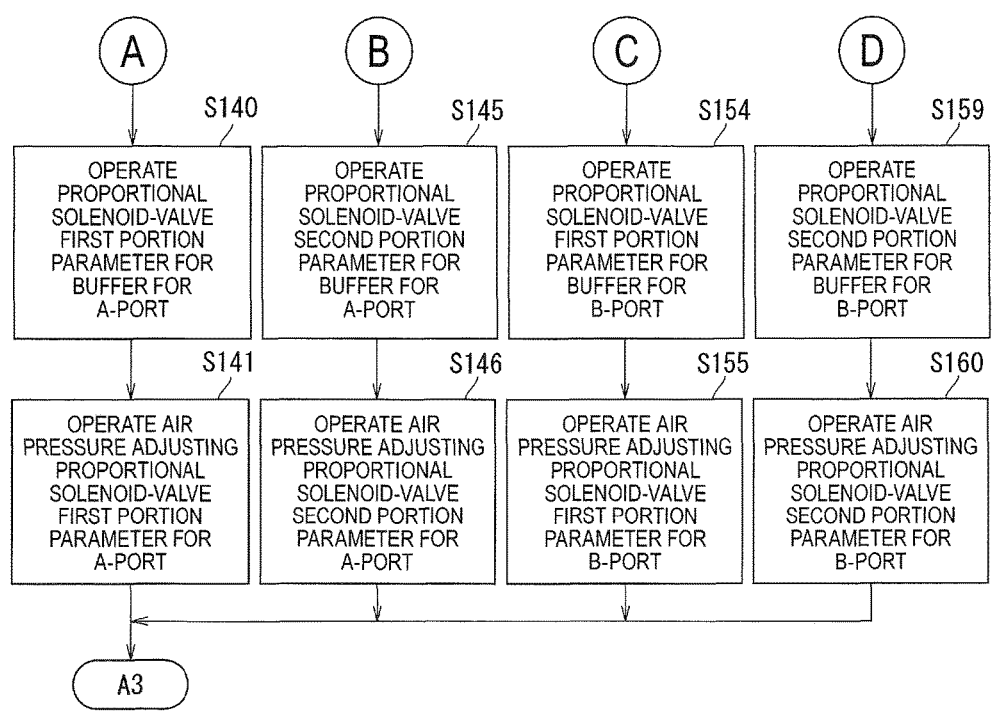

(d) In step S132 illustrated in FIG. 18A, it is checked whether or not the display of the touch panel 37 is set to the "A-port". In a case where the setting of the A-port is checked in step S132, the flow proceeds to step S133. In step S133, the second solenoid-valve $V_{5a1}$ for the A-port first-tube, the second solenoid-valve $V_{5a2}$ for the A-port second-tube, and the second solenoid-valve $V_{5a3}$ for the A-port third-tube are closed, and the flow proceeds to step S134. In step S134, the second solenoid-valve $V_{5b1}$ for the B-port first-tube, the second solenoid-valve $V_{5b2}$ for the B-port second-tube, and the second solenoid-valve $V_{5b3}$ for the B-port third-tube are opened, and the flow proceeds to step S135. Then, in step S135, "portion checking" is declared, and it is checked whether the display of the touch panel 37 is set to the "first portions" in step S136. In a case where the setting of the first portions is checked in step S136, the flow proceeds to step S137, the first solenoid-valve $V_{2a1}$ for the A-port first-tube is closed, and the flow proceeds to step S138. Then, the first solenoid-valve $V_{2a2}$ for the A-port second-tube is opened in step S138, and the flow proceeds to step S139. In addition, the first solenoid-valve $V_{2a3}$ for the A-port third-tube is closed in step S139, and the flow proceeds to step S140. In step S140, the proportional solenoid-valve $V_{1a1}$ for the buffer for the A-port first-tube, the proportional solenoid-valve $V_{1a3}$ for the buffer for the A-port second-tube, and the proportional solenoid-valve $V_{1a5}$ for the buffer for the A-port third-tube are operated using the parameter of the first portions, and the flow proceeds to step S141. In step S141, the PAPS valve $V_{1a2}$ for the A-port first-tube, the PAPS valve $V_{1a4}$ for the A-port second-tube, and the PAPS valve $V_{1a6}$ for the A-port third-tube are operated using the parameter of the first portions, and the flow proceeds to step S161 illustrated in FIG. 19. On the other hand, when the setting of the first portions is not checked in step S136, the flow proceeds to step S142, the first solenoid-valve $V_{2a1}$ for the A-port first-tube is opened, and the flow proceeds to step S143. Then, the first solenoid-valve $V_{2a2}$ for the A-port second-tube is opened in step S143, and the flow proceeds to step S144. In step S144, the first solenoid-valve $V_{2a3}$ for the A-port third-tube is closed, and the flow proceeds to step S145. In step S145, the proportional solenoid-valve $V_{1a1}$ for the buffer for the A-port first-tube, the proportional solenoid-valve $V_{1a3}$ for the buffer for the A-port second-tube, and the proportional solenoid-valve $V_{1a5}$ for the buffer for the A-port third-tube are operated using the parameter of the second portions, and the flow proceeds to step S146. In step S146, the PAPS valve $V_{1a2}$ for the A-port first-tube, the PAPS valve $V_{1a4}$ for the A-port second-tube, and the PAPS valve $V_{1a6}$ for the A-port third-tube are operated using the parameter of the second portions, and the flow proceeds to step S161 illustrated in FIG. 19.

(e) In a case where the setting of the A-port is not checked in step S132 illustrated in FIG. 18A, the flow proceeds to step S147. In step S147, the second solenoid-valve $V_{5a1}$ for the A-port first-tube, the second solenoid-valve $V_{5a2}$ for the A-port second-tube, and the second solenoid-valve $V_{5a3}$ for the A-port third-tube are opened, and the flow proceeds to step S148. In step S148, the second solenoid-valve $V_{5b1}$ for the B-port first-tube, the second solenoid-valve $V_{5b2}$ for the B-port second-tube, and the second solenoid-valve $V_{5b3}$ for the B-port third-tube are closed, and the flow proceeds to step S149. Then, in step S149, "portion checking" is declared, and it is checked whether the display of the touch panel 37 is set to the "first portions" in step S150. In a case where the setting of the first portions is checked in step S150, the flow proceeds to step S151, the first solenoid-valve $V_{2b1}$ for the B-port first-tube is closed, and the flow proceeds to step S152. Then, the first solenoid-valve $V_{2b2}$ for the B-port second-tube is opened in step S152, and the flow proceeds to step S153. In addition, the first solenoid-valve $V_{2b3}$ for the B-port third-tube is closed in step S153, and the flow proceeds to step S154. In step S154, the proportional solenoid-valve $V_{1b1}$ for the buffer for the B-port first-tube, the proportional solenoid-valve $V_{1b3}$ for the buffer for the B-port second-tube, and the proportional solenoid-valve $V_{1b5}$ for the buffer for the B-port third-tube are operated using the parameter of the first portions, and the flow proceeds to step S155. In step S155, the PAPS valve $V_{1b2}$ for the B-port first-tube, the PAPS valve $V_{1b4}$ for the B-port second-tube, and the PAPS valve $V_{1b6}$ for the B-port third-tube are operated using the parameter of the first portions, and the flow proceeds to step S161 illustrated in FIG. 19. On the other hand, when the setting of the first portions is not checked in step S150, the flow proceeds to step S156, the first solenoid-valve $V_{2b1}$ for the B-port first-tube is opened, and the flow proceeds to step S157. Then, the first solenoid-valve $V_{2b2}$ for the B-port second-tube is opened in step S157, and the flow proceeds to step S158. In step S158, the first solenoid-valve $V_{2b3}$ for the B-port third-tube is closed, and the flow proceeds to step S159. In step S159, the proportional solenoid-valve $V_{1b1}$ for the buffer for the B-port first-tube, the proportional solenoid-valve $V_{1b3}$ for the buffer for the B-port second-tube, and the proportional solenoid-valve $V_{1b5}$ for the buffer for the B-port third-tube are operated using the parameter of the second portions, and the flow proceeds to step S160. In step S160, the PAPS valve $V_{1b2}$ for the B-port first-tube, the PAPS valve $V_{1b4}$ for the B-port second-tube, and the PAPS valve $V_{1b6}$ for the B-port third-tube are operated using the parameter of the second portions, and the flow proceeds to step S161 illustrated in FIG. 19.

(f) In step S161 illustrated in FIG. 19, an inspection screen is displayed on the touch panel 37, and the flow proceeds to step S162. In step S162, "standby completion" due to the power-on process of the DUT 3 is displayed on the touch panel 37, and the flow proceeds to step S163. In step S163, the state of the power supply of the DUT 3 is checked on the display to be "power-off state". In the case of "power-off state" is displayed (not power-on waiting), the flow is returned to step S162, and the process waits for display of "standby completion (power-on waiting)" of the DUT 3 on the touch panel 37. If it is checked that the state of the power supply of the DUT 3 is in the "power-on waiting state" in step S163, the procedure proceeds to S164, power is applied to the DUT 3, and the compressor-under-test (compressor) 303 of the DUT 3 is started up. Then, in step S165, the operation condition of the DUT 3 is read out, and the flow proceeds to step S166. In step S166, the operation condition set by the fluid-path tester of the first embodiment, the operation condition is set in the flows of FIGS. 16 to 18B, is read out as "an operation condition of the DUT side". In step S166, when the reading out of the operation condition of the DUT 3 side is completed in step S166, the operation condition is displayed on the touch panel 37, and the flow proceeds to step S167. In step S167, when the DUT 3 is operated, a fluid pressure is supplied to the fluid-path tester of the first embodiment from the A-port of the DUT 3 through the first-tube $4_{a1}$, the second-tube $4_{a2}$, and the third-tube $4_{a3}$ that are dedicated tubes and from the B-port through the first-tube $4_{b1}$, the second-tube $4_{b2}$, and the third-tube $4_{b3}$ that are dedicated tubes. In step S167, when the fluid pressure is supplied to the dedicated tubes from the compressor-under-test 303 of the DUT 3 by operating the DUT 3, in step S168, the reactions of the pressure sensor S2 for the A-port first-tube, the pressure sensor S3 for the A-port second-tube, the pressure sensor S4 for the A-port third-tube, the pressure sensor S5 for the B-port first-tube, the pressure sensor S6 for the B-port second-tube, and the pressure sensor S7 for the B-port third-tube built in the fluid-path tester of the first embodiment are started. In step S168, when the reaction of each pressure sensor is started, operation timing is acquired. Then, in step S169, it is checked whether display of the "selection port A" is performed for the touch panel 37. In step S169, when the display of the "selection port A" is checked, the flow proceeds to step S170 illustrated in FIG. 20 and, when the display of the "selection port A" is not checked, the flow proceeds to step S188 illustrated in FIG. 21.

Figure 20:
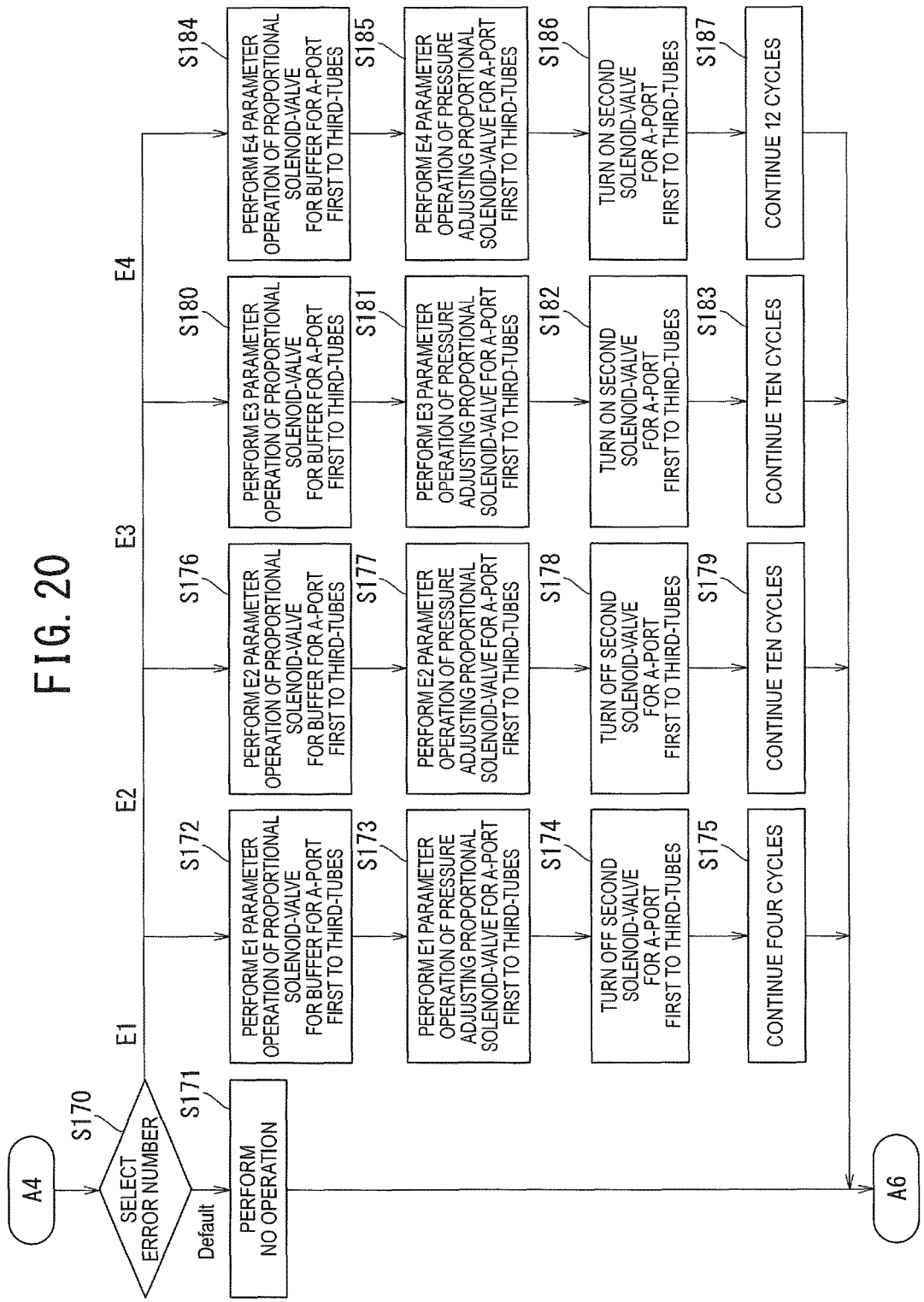
FIG. 20 is a flowchart (5) that illustrates an operation of the fluid-path tester according to the first embodiment in an "error mode"

(g) In a default condition of step S170 illustrated in FIG. 20, there is no operation to be performed in step S171, and the flow proceeds to step S206 illustrated in FIG. 22. On the other hand, since the quadruple error modes E1, E2, E3, and E4 can be selected using the touch panel 37 as an input unit, when the first abnormal-mode (the error mode E1) is selected in step S170, in step S172, the parameter is changed such that the parameter of the proportional solenoid-valve $V_{1a1}$ for the buffer for the A-port first-tube, the proportional solenoid-valve $V_{1a3}$ for the buffer for the A-port second-tube, and the proportional solenoid-valve $V_{1a5}$ for the buffer for the A-port third-tube is an error-condition reproduction-parameter of the first abnormal-mode, and the flow proceeds to step S173. In step S173, the parameter is changed such that the parameter of the PAPS valve $V_{1a2}$ for the A-port first-tube, the PAPS valve $V_{1a4}$ for the A-port second-tube, and the PAPS valve $V_{1a6}$ for the A-port third-tube is an error-condition reproduction-parameter of the first abnormal-mode, and the flow proceeds to step S174. In step S174, the second solenoid-valve $V_{5a1}$ for the A-port first-tube, the second solenoid-valve $V_{5a2}$ for the A-port second-tube, and the second solenoid-valve $V_{5a3}$ for the A-port third-tube are closed, and the flow proceeds to step S175. Then, after four cycles are continued in step S175, the flow proceeds to step S206 illustrated in FIG. 22. In a case where the second abnormal-mode (the error mode E2) is selected in step S170, in step S176, the parameter is changed such that the parameter of the proportional solenoid-valve $V_{1a1}$ for the buffer for the A-port first-tube, the proportional solenoid-valve $V_{1a3}$ for the buffer for the A-port second-tube, and the proportional solenoid-valve $V_{1a5}$ for the buffer for the A-port third-tube is an error-condition reproduction-parameter of the second abnormal-mode, and the flow proceeds to step S177. In step S177, the parameter is changed such that the parameter of the PAPS valve $V_{1a2}$ for the A-port first-tube, the PAPS valve $V_{1a4}$ for the A-port second-tube, and the PAPS valve $V_{1a6}$ for the A-port third-tube is an error-condition reproduction-parameter of the second abnormal-mode, and the flow proceeds to step S178. In step S178, the second solenoid-valve $V_{5a1}$ for the A-port first-tube, the second solenoid-valve $V_{5a2}$ for the A-port second-tube, and the second solenoid-valve $V_{5a3}$ for the A-port third-tube are closed, and the flow proceeds to step S179. Then, after ten cycles are continued in step S179, the flow proceeds to step S206 illustrated in FIG. 22. In a case where the third abnormal-mode (the error mode E3) is selected in step S170, in step S180, the parameter is changed such that the parameter of the proportional solenoid-valve $V_{1a1}$ for the buffer for the A-port first-tube, the proportional solenoid-valve $V_{1a3}$ for the buffer for the A-port second-tube, and the proportional solenoid-valve $V_{1a5}$ for the buffer for the A-port third-tube is an error-condition reproduction-parameter of the third abnormal-mode, and the flow proceeds to step S181. In step S181, the parameter is changed such that the parameter of the PAPS valve $V_{1a2}$ for the A-port first-tube, the PAPS valve $V_{1a4}$ for the A-port second-tube, and the PAPS valve $V_{1a6}$ for the A-port third-tube is an error-condition reproduction-parameter of the third abnormal-mode, and the flow proceeds to step S182. In step S182, the second solenoid-valve $V_{5a1}$ for the A-port first-tube, the second solenoid-valve $V_{5a2}$ for the A-port second-tube, and the second solenoid-valve $V_{5a3}$ for the A-port third-tube are opened, and the flow proceeds to step S183 (in the fluid-path tester of the first embodiment, the third abnormal-mode is the "low pressure error", and thus, in step S182, the second solenoid-valve $V_{5a1}$ for the A-port first-tube, the second solenoid-valve $V_{5a2}$ for the A-port second-tube, and the second solenoid-valve $V_{5a3}$ for the A-port third-tube are also opened). Then, after ten cycles are continued in step S183, the flow proceeds to step S206 illustrated in FIG. 22. When the fourth abnormal-mode (the error mode E4) is selected in step S170, in step S184, the parameter is changed such that the parameter of the proportional solenoid-valve $V_{1a1}$ for the buffer for the A-port first-tube, the proportional solenoid-valve $V_{1a3}$ for the buffer for the A-port second-tube, and the proportional solenoid-valve $V_{1a5}$ for the buffer for the A-port third-tube is an error-condition reproduction-parameter of the fourth abnormal-mode, and the flow proceeds to step S185. In step S185, the parameter is changed such that the parameter of the PAPS valve $V_{1a2}$ for the A-port first-tube, the PAPS valve $V_{1a4}$ for the A-port second-tube, and the PAPS valve $V_{1a6}$ for the A-port third-tube is an error-condition reproduction-parameter of the fourth abnormal-mode, and the flow proceeds to step S186. In step S186, the second solenoid-valve $V_{5a1}$ for the A-port first-tube, the second solenoid-valve $V_{5a2}$ for the A-port second-tube, and the second solenoid-valve $V_{5a3}$ for the A-port third-tube are opened, and the flow proceeds to step S187 (in the fluid-path tester of the first embodiment, the fourth abnormal-mode is the "low pressure error", and thus, in step S186, the second solenoid-valve $V_{5a1}$ for the A-port first-tube, the second solenoid-valve $V_{5a2}$ for the A-port second-tube, and the second solenoid-valve $V_{5a3}$ for the A-port third-tube are also opened). Then, after 12 cycles are continued in step S187, the flow proceeds to step S206 illustrated in FIG. 22.

Figure 21:
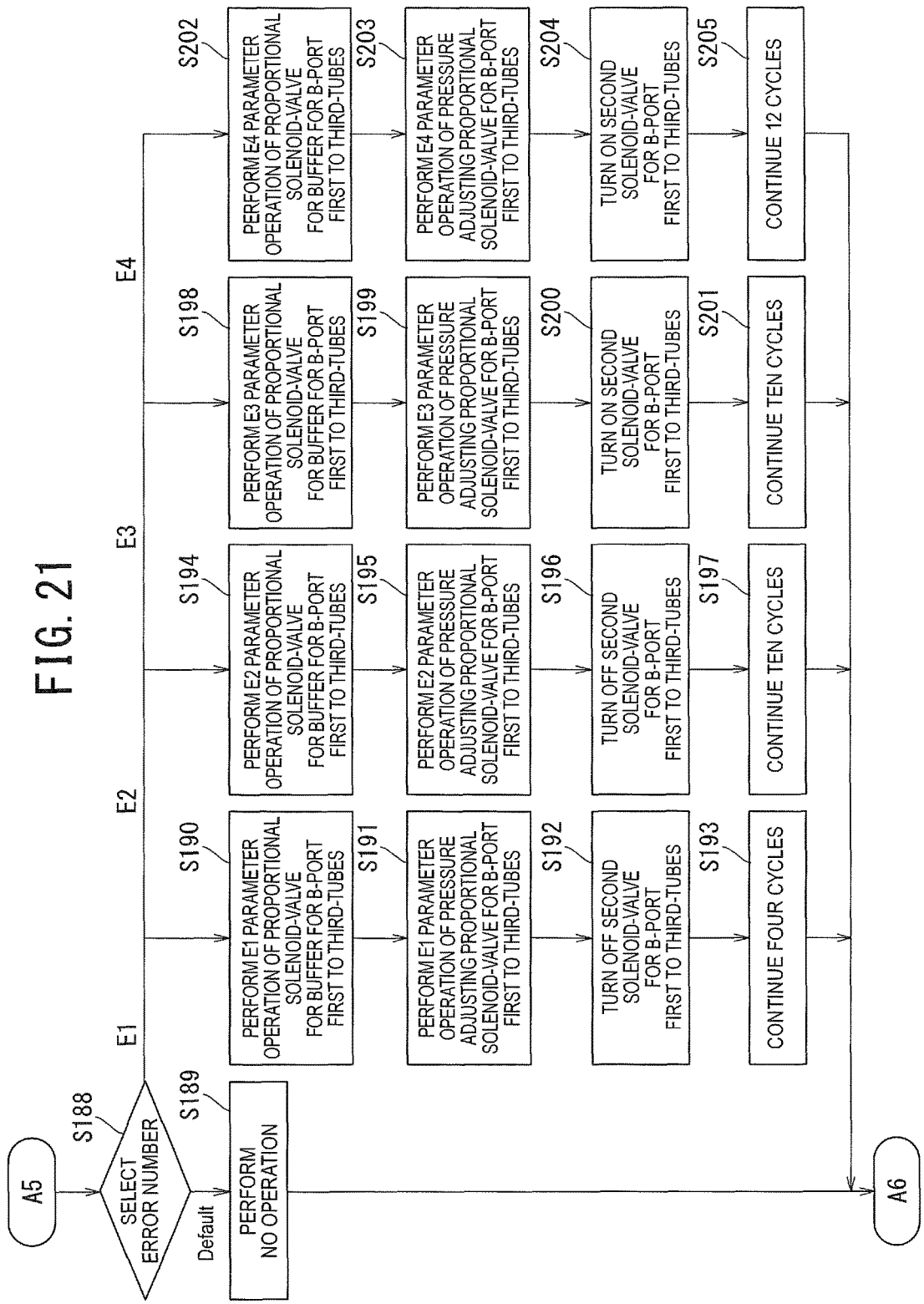
FIG. 21 is a flowchart (6) that illustrates an operation of the fluid-path tester according to the first embodiment in an "error mode"

(h) In a default condition of step S188 illustrated in FIG. 21, there is no operation to be performed in step S189, and the flow proceeds to step S206 illustrated in FIG. 22. On the other hand, since the quadruple error modes E1, E2, E3, and E4 can be selected using the touch panel 37 as an input unit, when the first abnormal-mode (the error mode E1) is selected in step S188, in step S190, the parameter is changed such that the parameter of the proportional solenoid-valve $V_{1b1}$ for the buffer for the B-port first-tube, the proportional solenoid-valve $V_{1b3}$ for the buffer for the B-port second-tube, and the proportional solenoid-valve $V_{1b5}$ for the buffer for the B-port third-tube is an error-condition reproduction-parameter of the first abnormal-mode, and the flow proceeds to step S191. In step S191, the parameter is changed such that the parameter of the PAPS valve $V_{1b2}$ for the B-port first-tube, the PAPS valve $V_{1b4}$ for the B-port second-tube, and the PAPS valve $V_{1b6}$ for the B-port third-tube is an error-condition reproduction-parameter of the first abnormal-mode, and the flow proceeds to step S192. In step S192, the second solenoid-valve $V_{5b1}$ for the B-port first-tube, the second solenoid-valve $V_{5b2}$ for the B-port second-tube, and the second solenoid-valve $V_{5b3}$ for the B-port third-tube are closed, and the flow proceeds to step S193. Then, after four cycles are continued in step S193, the flow proceeds to step S206 illustrated in FIG. 22. When the second abnormal-mode (the error mode E2) is selected in step S188, in step S194, the parameter is changed such that the parameter of the proportional solenoid-valve $V_{1b1}$ for the buffer for the B-port first-tube, the proportional solenoid-valve $V_{1b3}$ for the buffer for the B-port second-tube, and the proportional solenoid-valve $V_{1b5}$ for the buffer for the B-port third-tube is an error-condition reproduction-parameter of the second abnormal-mode, and the flow proceeds to step S195. In step S195, the parameter is changed such that the parameter of the PAPS valve $V_{1b2}$ for the B-port first-tube, the PAPS valve $V_{1b4}$ for the B-port second-tube, and the PAPS valve $V_{1b6}$ for the B-port third-tube is an error-condition reproduction-parameter of the second abnormal-mode, and the flow proceeds to step S196. In step S196, the second solenoid-valve $V_{5b1}$ for the B-port first-tube, the second solenoid-valve $V_{5b2}$ for the B-port second-tube, and the second solenoid-valve $V_{5b3}$ for the B-port third-tube are closed, and the flow proceeds to step S197. Then, after ten cycles are continued in step S197, the flow proceeds to step S206 illustrated in FIG. 22. When the third abnormal-mode (the error mode E3) is selected in step S188, in step S198, the parameter is changed such that the parameter of the proportional solenoid-valve $V_{1b1}$ for the buffer for the B-port first-tube, the proportional solenoid-valve $V_{1b3}$ for the buffer for the B-port second-tube, and the proportional solenoid-valve $V_{1b5}$ for the buffer for the B-port third-tube is an error-condition reproduction-parameter of the third abnormal-mode, and the flow proceeds to step S199. In step S199, the parameter is changed such that the parameter of the PAPS valve $V_{1b2}$ for the B-port first-tube, the PAPS valve $V_{1b4}$ for the B-port second-tube, and the PAPS valve $V_{1b6}$ for the B-port third-tube is an error-condition reproduction-parameter of the third abnormal-mode, and the flow proceeds to step S200. In step S200, the second solenoid-valve $V_{5b1}$ for the B-port first-tube, the second solenoid-valve $V_{5b2}$ for the B-port second-tube, and the second solenoid-valve $V_{5b3}$ for the B-port third-tube are opened, and the flow proceeds to step S201 (in the fluid-path tester of the first embodiment, the third abnormal-mode is the "low pressure error", and thus, in step S200, the second solenoid-valve $V_{5b1}$ for the B-port first-tube, the second solenoid-valve $V_{5b2}$ for the B-port second-tube, and the second solenoid-valve $V_{5b3}$ for the B-port third-tube are also opened). Then, after ten cycles are continued in step S201, the flow proceeds to step S206 illustrated in FIG. 22. When the fourth abnormal-mode (the error mode E4) is selected in step S188, in step S202, the parameter is changed such that the parameter of the proportional solenoid-valve $V_{1b1}$ for the buffer for the B-port first-tube, the proportional solenoid-valve $V_{1b3}$ for the buffer for the B-port second-tube, and the proportional solenoid-valve $V_{1b5}$ for the buffer for the B-port third-tube is an error-condition reproduction-parameter of the fourth abnormal-mode, and the flow proceeds to step S203. In step S203, the parameter is changed such that the parameter of the PAPS valve $V_{1b2}$ for the B-port first-tube, the PAPS valve $V_{1b4}$ for the B-port second-tube, and the PAPS valve $V_{1b6}$ for the B-port third-tube is an error-condition reproduction-parameter of the fourth abnormal-mode, and the flow proceeds to step S204. In step S204, the second solenoid-valve $V_{5b1}$ for the B-port first-tube, the second solenoid-valve $V_{5b2}$ for the B-port second-tube, and the second solenoid-valve $V_{5b3}$ for the B-port third-tube are opened, and the flow proceeds to step S205 (in the fluid-path tester of the first embodiment, the fourth abnormal-mode is the "low pressure error", and thus, in step S204, the second solenoid-valve $V_{5b1}$ for the B-port first-tube, the second solenoid-valve $V_{5b2}$ for the B-port second-tube, and the second solenoid-valve $V_{5b3}$ for the B-port third-tube are also opened). Then, after 12 cycles are continued in step S205, the flow proceeds to step S206 illustrated in FIG. 22.

(i) In step S206 illustrated in FIG. 22, a "determination screen" is displayed on the touch panel 37. When the setting of the A-port is checked in step S206, the flow proceeds to step S207. In step S207, the first solenoid-valve $V_{2a1}$ for the A-port first-tube, the first solenoid-valve $V_{2a2}$ for the A-port second-tube, and the first solenoid-valve $V_{2a3}$ for the A-port third-tube are closed, and the flow proceeds to step S208. In step S208, the second solenoid-valve $V_{5a1}$ for the A-port first-tube, the second solenoid-valve $V_{5a2}$ for the A-port second-tube, and the second solenoid-valve $V_{5a3}$ for the A-port third-tube are closed, and the flow proceeds to step S209. In step S209, the proportional solenoid-valve $V_{1a1}$ for the buffer for the A-port first-tube, the proportional solenoid-valve $V_{1a3}$ for the buffer for the A-port second-tube, and the proportional solenoid-valve $V_{1a5}$ for the buffer for the A-port third-tube are closed, and the flow proceeds to step S210. In step S210, the PAPS valve $V_{1a2}$ for the A-port first-tube, the PAPS valve $V_{1a4}$ for the A-port second-tube, and the PAPS valve $V_{1a6}$ for the A-port third-tube are closed, and the flow proceeds to step S211. In step S211, the first solenoid-valve $V_{2b1}$ for the B-port first-tube, the first solenoid-valve $V_{2b2}$ for the B-port second-tube, and the first solenoid-valve $V_{2b3}$ for the B-port third-tube are closed, and the flow proceeds to step S212. In step S212, the second solenoid-valve $V_{5b1}$ for the B-port first-tube, the second solenoid-valve $V_{5b2}$ for the B-port second-tube, and the second solenoid-valve $V_{5b3}$ for the B-port third-tube are closed, and the flow proceeds to step S213. In step S213, the proportional solenoid-valve $V_{1a1}$ for the buffer for the B-port first-tube, the proportional solenoid-valve $V_{1a3}$ for the buffer for the B-port second-tube, and the proportional solenoid-valve $V_{1a5}$ for the buffer for the B-port third-tube are closed, and the flow proceeds to step S214. In step S214, the PAPS valve $V_{1a2}$ for the B-port first-tube, the PAPS valve $V_{1a4}$ for the B-port second-tube, and the PAPS valve $V_{1a6}$ for the B-port third-tube are closed, and the flow proceeds to step S215. In step S215, the status of an error-occurrence in the DUT 3 side is visually checked. In step S215, when the error-occurrence in the DUT 3 side can be checked, in step S216, the power of the DUT 3 is turned off, and the flow proceeds to step S217 illustrated in FIG. 23.

Figure 23:
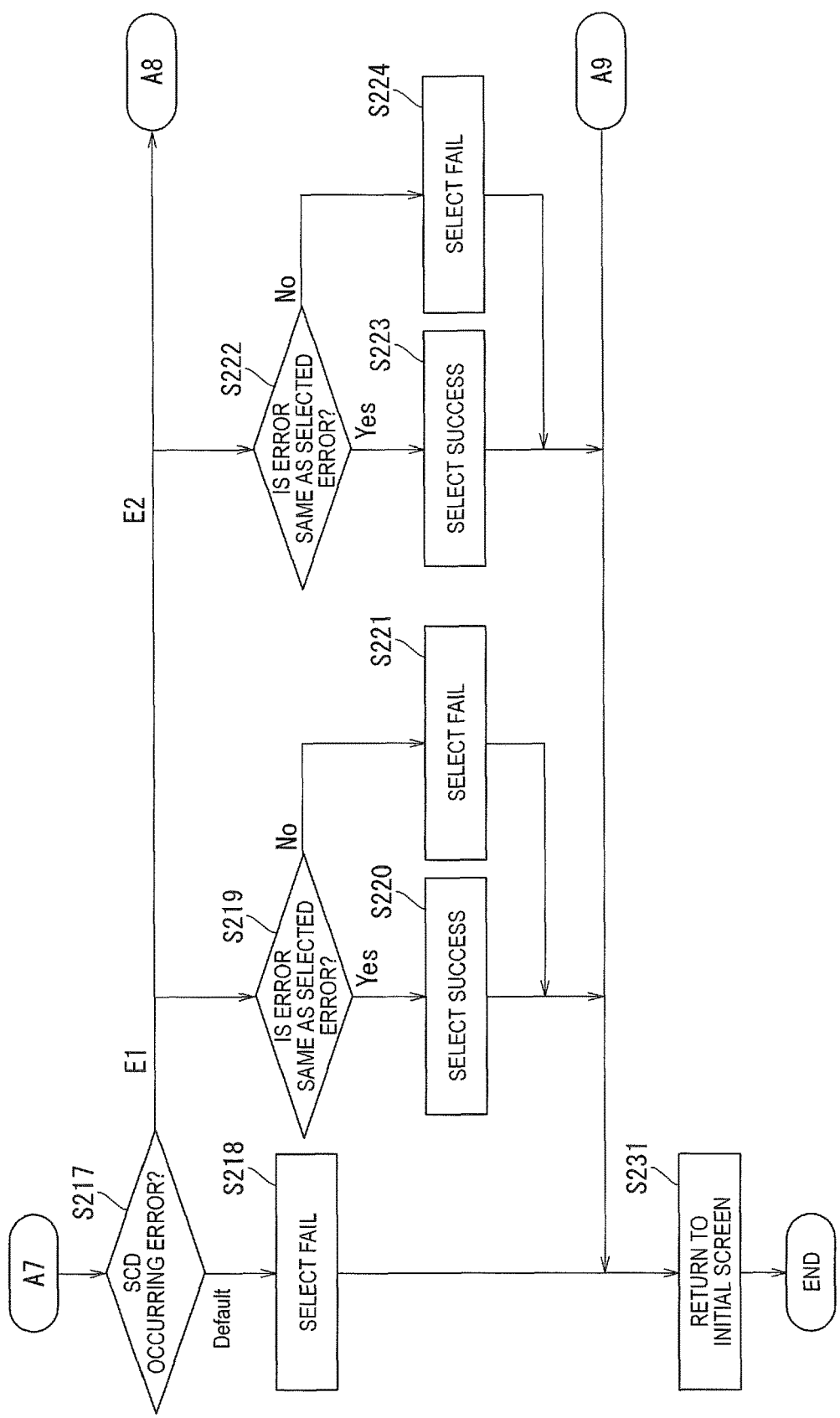
FIG. 23 is a flowchart (8) that illustrates an operation of the fluid-path tester according to the first embodiment in an "error mode"
Figure 24:
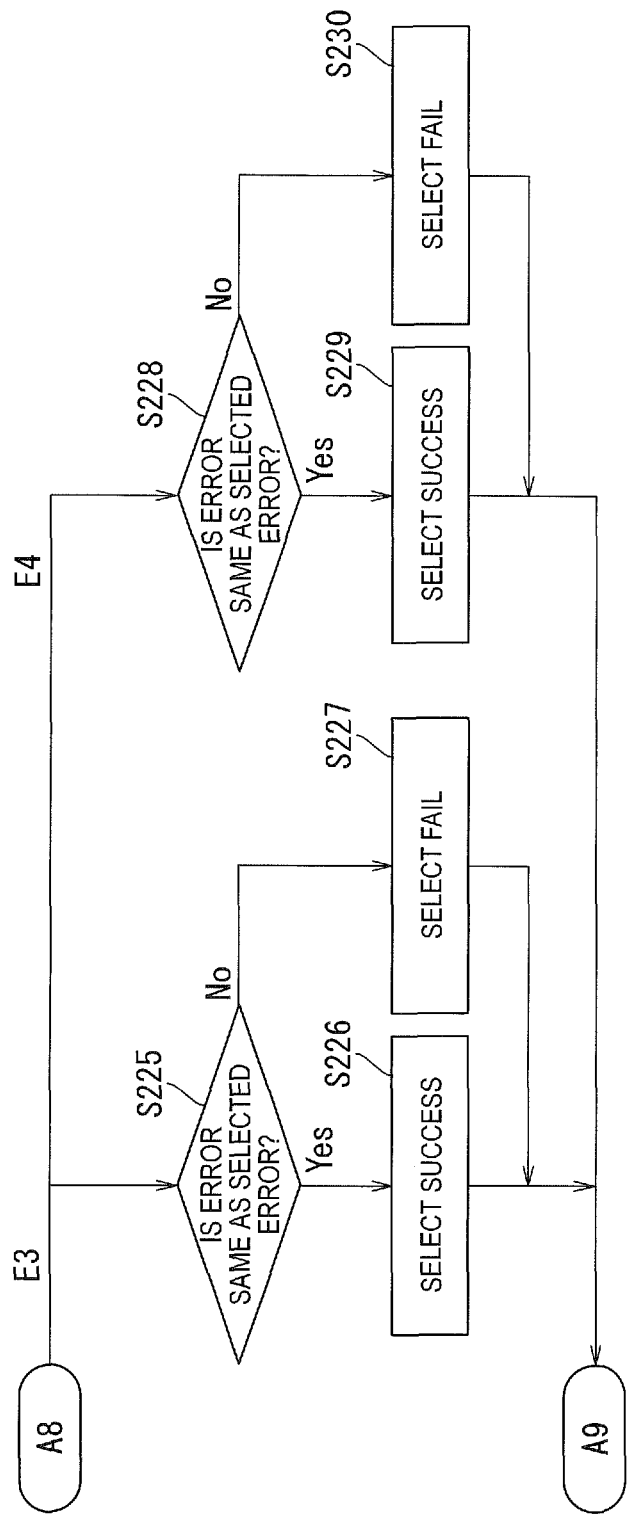
FIG. 24 is a flowchart (9) that illustrates an operation of the fluid-path tester according to the first embodiment in an "error mode"

(j) In a default condition of step S217 illustrated in FIG. 23, "fail" is selected in step S218, and the flow is returned to the initial screen of step S231 and ends. On the other hand, since the quadruple error modes E1, E2, E3, and E4 can be selected using the screen of the touch panel 37 illustrated in FIG. 4, in step S217, when the error-occurrence is selected to be the first abnormal-mode (error mode E1) on the screen, in step S219, it is determined whether the error selected by the fluid-path tester of the first embodiment is reproducible on the DUT 3 side. In step S219, the first error selected by the fluid-path tester of the first embodiment is determined to be reproducible on the DUT 3 side, in step S220, a "success" on the screen of the touch panel 37 is pressed, and the flow is returned to the initial screen of step S231 and ends. In step S219, when the error on the DUT 3 side is known to be an error other than the first error selected by the fluid-path tester of the first embodiment or when the selected first error is determined not to be reproducible on the DUT 3 side, in step S221, "fail" on the screen of the touch panel 37 is pressed, and the flow is returned to the initial screen of step S231 and ends. In step S217, when the error-occurrence is selected to be the second abnormal-mode (error mode E2) on the screen, in step S222, it is determined whether the error selected by the fluid-path tester of the first embodiment is reproducible on the DUT 3 side. In step S222, when the second error selected by the fluid-path tester of the first embodiment is determined to be reproducible on the DUT 3 side, in step S223, "success" on the screen of the touch panel 37 is pressed, and the flow is returned to the initial screen of step S231 and ends. In step S222, when the error on the DUT 3 side is known to be an error other than the second error selected by the fluid-path tester of the first embodiment or when the selected second error is determined not to be reproducible on the DUT 3 side, in step S224, "fail" on the screen of the touch panel 37 is pressed, and the flow is returned to the initial screen of step S231 and ends. In step S217, when the error-occurrence is selected to be the third abnormal-mode (error mode E3) on the screen, in step S225 illustrated in FIG. 24, it is determined whether the error selected by the fluid-path tester of the first embodiment is reproducible on the DUT 3 side. In step S225, when the third error selected by the fluid-path tester of the first embodiment is determined to be reproducible on the DUT 3 side, in step S226, "success" on the screen of the touch panel 37 is pressed, and the flow is returned to the initial screen of step S231 illustrated in FIG. 23 and ends. In step S225, when the error on the DUT 3 side is known to be an error other than the third error selected by the fluid-path tester of the first embodiment or when the selected third error is determined not to be reproducible on the DUT 3 side, in step S227, "fail" on the screen of the touch panel 37 is pressed, and the flow is returned to the initial screen of step S231 and ends. In step S217, when the error-occurrence is selected to be the fourth abnormal-mode (error mode E4) on the screen, in step S228 illustrated in FIG. 24, it is determined whether the error selected by the fluid-path tester of the first embodiment is reproducible on the DUT 3 side. In step S228, when the fourth error selected by the fluid-path tester of the first embodiment is determined to be reproducible on the DUT 3 side, in step S229, "success" on the screen of the touch panel 37 is pressed, and the flow is returned to the initial screen of step S231 illustrated in FIG. 23 and ends. In step S228, when the error on the DUT 3 side is known to be an error other than the fourth error selected by the fluid-path tester of the first embodiment or when the selected fourth error is determined not to be reproducible on the DUT 3 side, in step S230, "fail" on the screen of the touch panel 37 is pressed, and the flow is returned to the initial screen of step S231 and ends.

According to the fluid-path testing-method of the first embodiment, by the sequence of the flowchart illustrated in FIGS. 16 to 24, the characteristics of the fluid-circuit of the quadruple abnormal-modes (the error modes E1 to E4) having possibilities of occurring in the fluid path of the DUT 3 are emulated by using the fluid-path tester, the fluid-path tester connected to the DUT 3 is pressurized by the compressor-under-test 303, and the acquired characteristics are compared with the emulated characteristics, whereby an abnormal condition in the fluid path of the DUT 3 can be inspected.

(Operation 2 of Fluid Path Inspection Device: In Re Normal Mode)

With reference to a flowchart illustrated in FIGS. 25 to 28, the processing flow of the fluid-path testing-method of the first embodiment of the present invention in re a "normal mode" will be described. The operation of the fluid-path tester that is performed in the case of the normal mode is an example, for a simple description, and it is apparent that the operation can be established by other various orders, sequences, selections, operation methods, and the like including this modified example as long as they are within the scope of the claims. In addition, in the flowchart illustrated in FIG. 27, according to the restriction of the size of a frame on the Drawing, while the "DUT" is referred as an "SCD" that is an example of the DUT 3, and the "fluid-path tester" is referred as an "IPCD" for description using simplified representations, the nomenclature are mere denotations for the convenience of description, and the "SCD" or the "IPCD" does not have a specific meaning.

(a) First, as illustrated in FIG. 2, a first-tube $4_{a1}$, a second-tube $4_{a2}$, and a third-tube $4_{a3}$ that are triple dedicated tubes are connected to the A-port of a DUT 3, and a first-tube $4_{b1}$, a second-tube $4_{b2}$, and a third-tube $4_{b3}$ that are triple dedicated tubes are connected to the B-port, whereby the DUT 3 and the fluid-path tester of the first embodiment are connected to each other. Then, in step S301 illustrated in FIG. 25, "normal mode" is selected using the touch panel 37 illustrated in FIG. 4 as an input unit, and the A-port is selected in step S302. When the A-port is selected in step S302, the flow proceeds to step S303. In step S303, first portions or second portions are selected using the touch panel 37 illustrated in FIG. 4 as an input unit. As presented in the description of the "error mode", for the convenience of the description, in description presented below, for the convenience of description, while the "first portions" are defined as the "the bottoms of feet", and the "second portions" are defined as the "lower limbs (legs)", they are simple selections. Thus, the "first portions" may be set as the "lower limbs (legs)", and the "second portions" may be set as the "the bottoms of feet", and other parts may be used.

Figure 25:
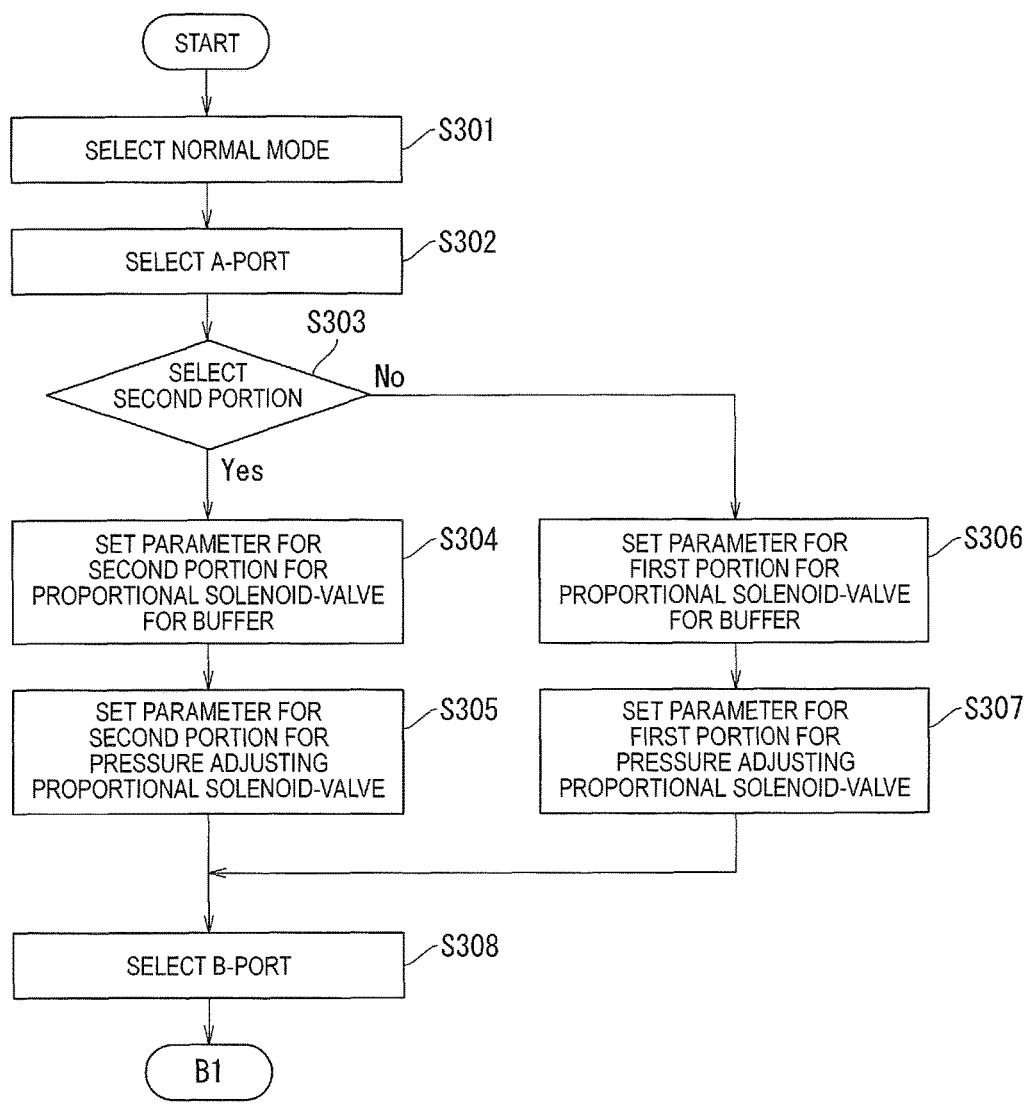
FIG. 25 is a flowchart (1) that illustrates an operation of the fluid-path tester according to the first embodiment in a "normal mode (normality mode)"

(b) When the second portions are selected in step S303 illustrated in FIG. 25, the flow proceeds to step S304. In step S304, the proportional solenoid-valve $V_{1a1}$ for the buffer for the A-port first-tube, the proportional solenoid-valve $V_{1a3}$ for the buffer for the A-port second-tube, and the proportional solenoid-valve $V_{1a5}$ for the buffer for the A-port third-tube are set to a condition required for setting the normal suppression pressure of the "second portions" on the touch panel 37, and the flow proceeds to step S305. In step S305, the PAPS valve $V_{1a2}$ for the A-port first-tube, the PAPS valve $V_{1a4}$ for the A-port second-tube, and the PAPS valve $V_{1a6}$ for the A-port third-tube are set to a condition required for setting the normal suppression pressure of the "second portions" on the touch panel 37, and the flow proceeds to step S308. In step S303 illustrated in FIG. 25, when the first portions are selected, the flow proceeds to step S306. In step S306, the proportional solenoid-valve $V_{1a1}$ for the buffer for the A-port first-tube, the proportional solenoid-valve $V_{1a3}$ for the buffer for the A-port second-tube, and the proportional solenoid-valve $V_{1a5}$ for the buffer for the A-port third-tube are set to a condition required for setting the normal suppression pressure of the "first portions" on the touch panel 37, and the flow proceeds to step S307. In step S307, the PAPS valve $V_{1a2}$ for the A-port first-tube, the PAPS valve $V_{1a4}$ for the A-port second-tube, and the PAPS valve $V_{1a6}$ for the A-port third-tube are set to a condition required for setting the normal suppression pressure of the "first portions" on the touch panel 37, and the flow proceeds to step S308.

Figure 26:
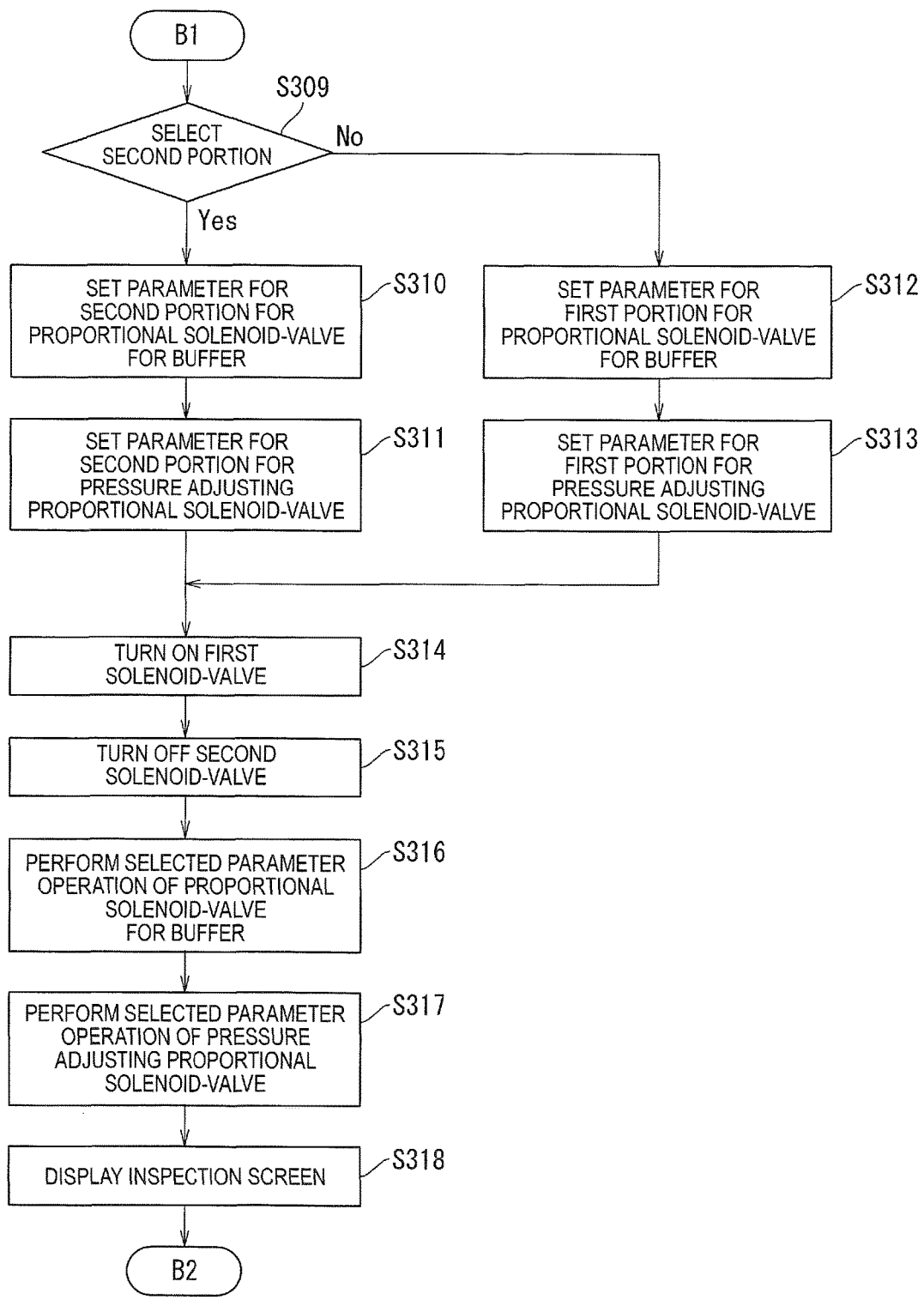
FIG. 26 is a flowchart (2) that illustrates an operation of the fluid-path tester according to the first embodiment in a "normal mode"
Figure 27:
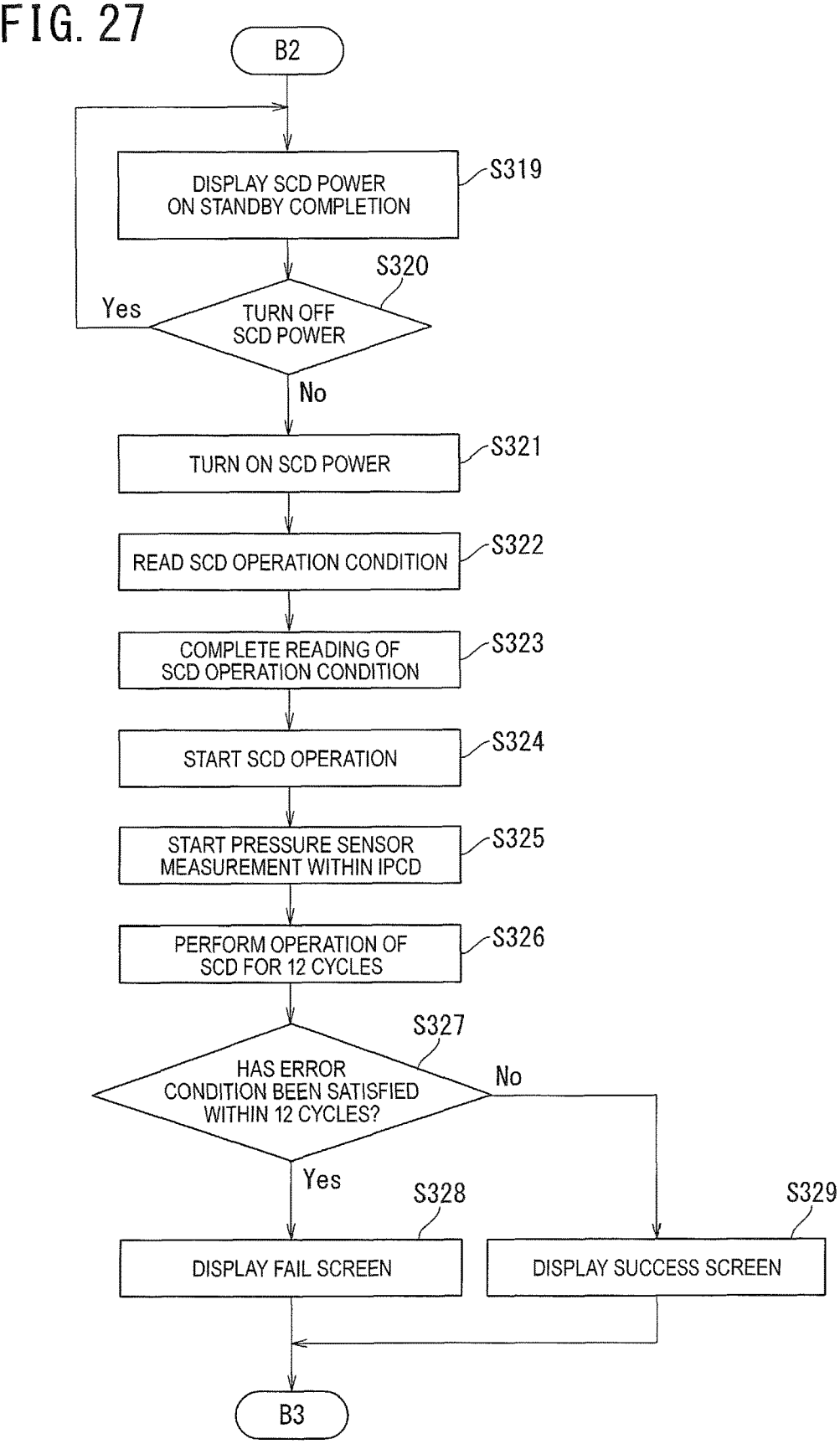
FIG. 27 is a flowchart (3) that illustrates an operation of the fluid-path tester according to the first embodiment in a "normal mode"

(c) When the B-port is selected in step S308, the flow proceeds to step S309 illustrated in FIG. 26. In step S309, the first portions or the second portions are selected using the touch panel 37 as an input unit. In step S309, when second portions are selected, the flow proceeds to step S310. In step S310, the proportional solenoid-valve $V_{1b1}$ for the buffer for the B-port first-tube, the proportional solenoid-valve $V_{1b3}$ for the buffer for the B-port second-tube, and the proportional solenoid-valve $V_{1b5}$ for the buffer for the B-port third-tube are set to a condition required for setting the normal suppression pressure of the "second portions" on the touch panel 37, and the flow proceeds to step S311. In step S311, the PAPS valve $V_{1b2}$ for the B-port first-tube, the PAPS valve $V_{1b4}$ for the B-port second-tube, and the PAPS valve $V_{1b6}$ for the B-port third-tube are set to a condition required for setting the normal suppression pressure of the "second portions" on the touch panel 37, and the flow proceeds to step S314. In step S309, when the first portions are selected, the flow proceeds to step S312. In step S312, the proportional solenoid-valve $V_{1b1}$ for the buffer for the B-port first-tube, the proportional solenoid-valve $V_{1b3}$ for the buffer for the B-port second-tube, and the proportional solenoid-valve $V_{1b5}$ for the buffer for the B-port third-tube are set to a condition required for setting the normal suppression pressure of the "first portions" on the touch panel 37, and the flow proceeds to step S313. In step S313, the PAPS valve $V_{1b2}$ for the B-port first-tube, the PAPS valve $V_{1b4}$ for the B-port second-tube, and the PAPS valve $V_{1b6}$ for the B-port third-tube are set to a condition required for setting the normal suppression pressure of the "first portions" on the touch panel 37, and the flow proceeds to step S314.

(d) In step S314, the first solenoid-valve $V_{2b1}$ for the B-port first-tube, the first solenoid-valve $V_{2b2}$ for the B-port second-tube, and the first solenoid-valve $V_{2b3}$ for the B-port third-tube are opened, and thereafter, the flow proceeds to step S315. In step S315, the second solenoid-valve $V_{5b1}$ for the B-port first-tube, the second solenoid-valve $V_{5b2}$ for the B-port second-tube, and the second solenoid-valve $V_{5b3}$ for the B-port third-tube are closed, and the flow proceeds to step S316. In step S316, the proportional solenoid-valve $V_{1a1}$ for the buffer for the B-port first-tube, the proportional solenoid-valve $V_{1a3}$ for the buffer for the B-port second-tube, and the proportional solenoid-valve $V_{1a5}$ for the buffer for the B-port third-tube are operated using a parameter set as a normal operation condition, and the flow proceeds to step S317. In step S317, the PAPS valve $V_{1a2}$ for the B-port first-tube, the PAPS valve $V_{1a4}$ for the B-port second-tube, and the PAPS valve $V_{1a6}$ for the B-port third-tube are operated using a parameter set as a normal operation condition, and the flow proceeds to step S318. In step S318, an inspection screen is displayed on the touch panel 37, and the flow proceeds to step S319 illustrated in FIG. 27. In addition, in step S314, the first solenoid-valve $V_{2a1}$ for the A-port first-tube, the first solenoid-valve $V_{2a2}$ for the A-port second-tube, and the first solenoid-valve $V_{2a3}$ for the A-port third-tube are similarly opened, and the flow proceeds to step S315. In step S315, the second solenoid-valve $V_{5a1}$ for the A-port first-tube, the second solenoid-valve $V_{5a2}$ for the A-port second-tube, and the second solenoid-valve $V_{5a3}$ for the A-port third-tube are similarly closed, and the flow proceeds to step S316. In step S316, the proportional solenoid-valve $V_{1a1}$ for the buffer for the A-port first-tube, the proportional solenoid-valve $V_{1a3}$ for the buffer for the A-port second-tube, and the proportional solenoid-valve $V_{1a5}$ for the buffer for the A-port third-tube are similarly operated using a parameter set as a normal operation condition, and the flow proceeds to step S317. In step S317, the PAPS valve $V_{1a2}$ for the A-port first-tube, the PAPS valve $V_{1a4}$ for the A-port second-tube, and the PAPS valve $V_{1a6}$ for the A-port third-tube are similarly operated using a parameter set as a normal operation condition, and the flow proceeds to step S318. In step S318, an inspection screen is displayed on the touch panel 37, and the flow proceeds to step S319 illustrated in FIG. 27.

(e) In step S319, "standby completion" of power-on of the DUT 3 is displayed on the touch panel 37, and the flow proceeds to step S320. In step S320, the display of the power-supply state of the DUT 3 is checked to be power-off. In the case of power-off display (not power-on waiting), the flow is returned to step S319, and the process waits for display of "standby completion (power-on waiting)" of the DUT 3 on the touch panel 37. If it is checked that the power of the DUT 3 is in the "power-on waiting state" in step S320, the procedure proceeds to S321, power is applied to the DUT 3, and the compressor-under-test 303 of the DUT 3 is started up. Then, in step S322, the operation condition of the DUT 3 is read out, and the flow proceeds to step S323. In step S322, the operation condition set by the fluid-path tester of the first embodiment in the flows of FIGS. 25 to 26 is read out as "an operation condition of the DUT side". In step S323, when the reading out of the operation condition of the DUT 3 side is completed in step S323, the operation condition is displayed on the touch panel 37, and the flow proceeds to step S324. In step S324, when the DUT 3 is operated, a fluid pressure is supplied from the compressor-under-test 303 of the DUT 3 to the fluid-path tester of the first embodiment from the A-port of the DUT 3 through the first-tube $4_{a1}$, the second-tube $4_{a2}$, and the third-tube $4_{a3}$ that are dedicated tubes and from the B-port through the first-tube $4_{b1}$, the second-tube $4_{b2}$, and the third-tube $4_{b3}$ that are dedicated tubes. In step S324, when the fluid pressure is supplied to the dedicated tubes by operating the DUT 3, in step S325, the reactions of the pressure sensor S2 for the A-port first-tube, the pressure sensor S3 for the A-port second-tube, the pressure sensor S4 for the A-port third-tube, the pressure sensor S5 for the B-port first-tube, the pressure sensor S6 for the B-port second-tube, and the pressure sensor S7 for the B-port third-tube built in the fluid-path tester of the first embodiment are started, and numerical values of the fluid pressures are displayed. When the reaction of each pressure sensor is started in step S325, operation timing is acquired, and the operation is performed for 12 cycles in step S326.

(f) In step S326, the proportional solenoid-valve $V_{1a1}$ for the buffer for the A-port first-tube, the proportional solenoid-valve $V_{1a3}$ for the buffer for the A-port second-tube, the proportional solenoid-valve $V_{1a5}$ for the buffer for the A-port third-tube, the proportional solenoid-valve $V_{1b1}$ for the buffer for the B-port first-tube, the proportional solenoid-valve $V_{1b3}$ for the buffer for the B-port second-tube, and the proportional solenoid-valve $V_{1b5}$ for the buffer for the B-port third-tube are open so as to exhaust the air in an entirely-open state. And the PAPS valve $V_{1a2}$ for the A-port first-tube, the PAPS valve $V_{1a4}$ for the A-port second-tube, the PAPS valve $V_{1a6}$ for the A-port third-tube, the PAPS valve $V_{1b2}$ for the B-port first-tube, the PAPS valve $V_{1b4}$ for the B-port second-tube, and the PAPS valve $V_{1b6}$ for the B-port third-tube are open so as to exhaust the air in the entirely-open state. Then, in step S326, the second solenoid-valve $V_{5a1}$ for the A-port first-tube, the second solenoid-valve $V_{5a2}$ for the A-port second-tube, the second solenoid-valve $V_{5a3}$ for the A-port third-tube, the second solenoid-valve $V_{5b1}$ for the B-port first-tube, the second solenoid-valve $V_{5b2}$ for the B-port second-tube, and the second solenoid-valve $V_{5b3}$ for the B-port third-tube exhaust the air in the entirely-open state and are operated for 12 cycles. When the operation for 12 cycles is performed in step S326, the flow proceeds to step S327. Based on numerical values for the pressure sensor S2 for the A-port first-tube, the pressure sensor S3 for the A-port second-tube, the pressure sensor S4 for the A-port third-tube, the pressure sensor S5 for the B-port first-tube, the pressure sensor S6 for the B-port second-tube, and the pressure sensor S7 for the B-port third-tube displayed on the touch panel 37, when the operation of 12 cycles is determined to satisfy an error condition of one of the first to fourth errors, after a screen of "fail" is displayed on the touch panel 37 in step S328, the power of the DUT 3 is turned off, the compressor-under-test 303 of the DUT 3 is stopped, and the flow proceeds to step S330 illustrated in FIG. 28. In step S327, when the operation of 12 cycles is determined not to satisfy any one of error conditions of the first to fourth errors, after a screen of "success" is displayed on the touch panel 37 in step S329, the power of the DUT 3 is turned off, and the flow proceeds to step S330 illustrated in FIG. 28.

Figure 28:
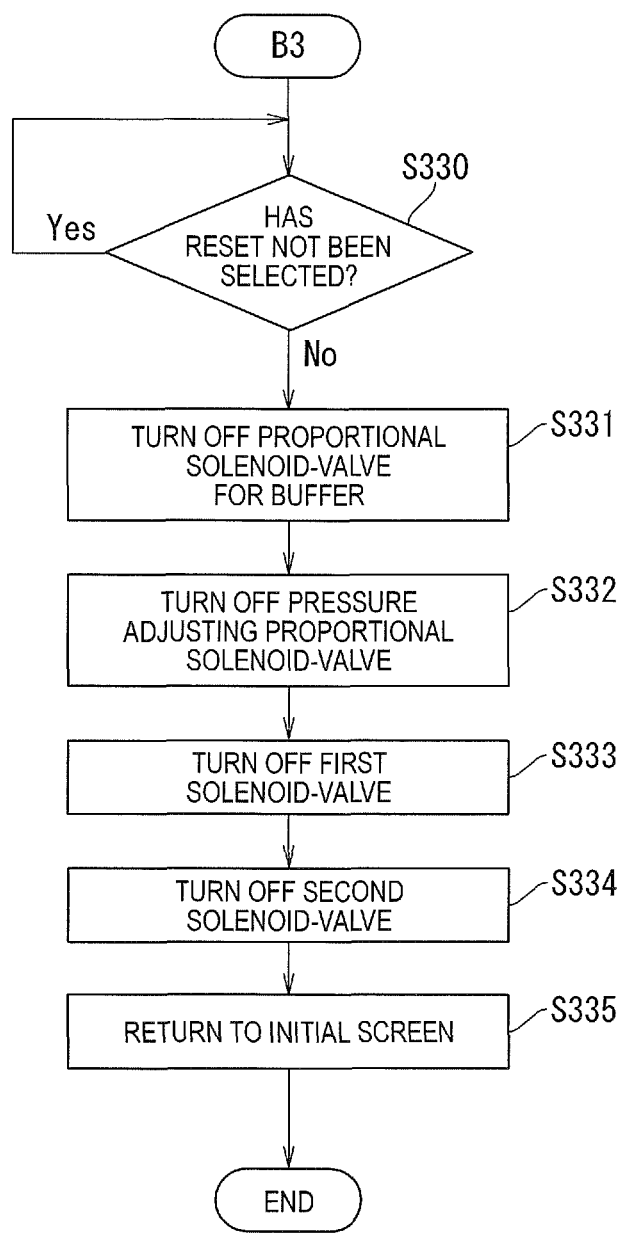
FIG. 28 is a flowchart (4) that illustrates an operation of the fluid-path tester according to the first embodiment in a "normal mode"
Figure 29:
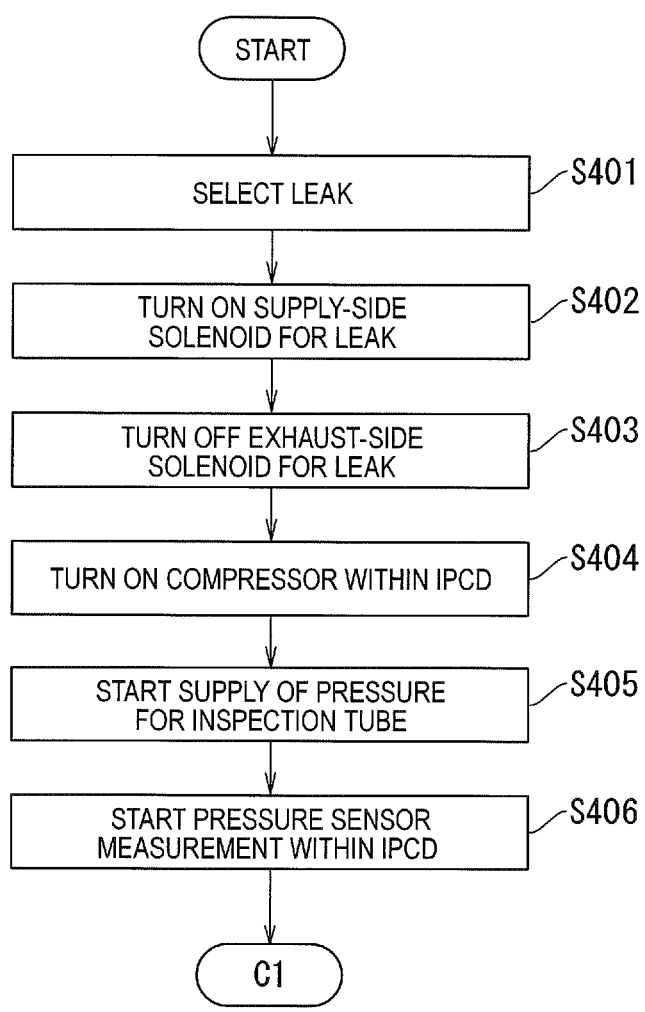
FIG. 29 is a flowchart (1) that illustrates an operation of the fluid-path tester according to the first embodiment in the case of leakage inspection.

(g) In step S330 illustrated in FIG. 28, "reset" on the determination screen of the touch panel 37 is selected (when "reset" on the determination screen has not been selected in step S330, the flow is returned to step S330, and "reset" is selected). Thereafter, the flow proceeds to step S331. In step S331, all the proportional solenoid-valve $V_{1a1}$ for the buffer for the A-port first-tube, the proportional solenoid-valve $V_{1a3}$ for the buffer for the A-port second-tube, the proportional solenoid-valve $V_{1a5}$ for the buffer for the A-port third-tube, the proportional solenoid-valve $V_{1b1}$ for the buffer for the B-port first-tube, the proportional solenoid-valve $V_{1b3}$ for the buffer for the B-port second-tube, and the proportional solenoid-valve $V_{1b5}$ for the buffer for the B-port third-tube are closed, and the flow proceeds to step S332. In step S332, all the PAPS valve $V_{1a2}$ for the A-port first-tube, the PAPS valve $V_{1a4}$ for the A-port second-tube, the PAPS valve $V_{1a6}$ for the A-port third-tube, the PAPS valve $V_{1b2}$ for the B-port first-tube, the PAPS valve $V_{1b4}$ for the the B-port second-tube, and the PAPS valve $V_{1b6}$ for the B-port third-tube are closed, and the flow proceeds to step S333. In step S333, all the first solenoid-valve $V_{2a1}$ for the A-port first-tube, the first solenoid-valve $V_{2a2}$ for the A-port second-tube, the first solenoid-valve $V_{2a3}$ for the A-port third-tube, the first solenoid-valve $V_{2b1}$ for the B-port first-tube, the first solenoid-valve $V_{2b2}$ for the B-port second-tube, and the first solenoid-valve $V_{2b3}$ for the B-port third-tube are closed, and the flow proceeds to step S334. Then, in step S334, all the second solenoid-valve $V_{5a1}$ for the A-port first-tube, the second solenoid-valve $V_{5a2}$ for the A-port second-tube, the second solenoid-valve $V_{5a3}$ for the A-port third-tube, the second solenoid-valve $V_{5b1}$ for the B-port first-tube, the second solenoid-valve $V_{5b2}$ for the B-port second-tube, and the second solenoid-valve $V_{5b3}$ for the B-port third-tube are closed, and the flow proceeds to step S335. In step S335, the flow is returned to the initial screen and ends.

(Operation 3 of Fluid Path Inspection Device: In Re Leak Inspection)

With reference to a flowchart illustrated in FIGS. 29 to 33, the processing flow of the fluid-path testing-method of the first embodiment of the present invention when "leakage inspection" is selected will be described. The operation of the fluid-path tester that is performed is an example, for a simple description, and it is apparent that the operation can be established by other various orders, sequences, selections, operation methods, and the like including this modified example as long as they are within the scope of the claims. In addition, in a flowchart illustrated in FIGS. 29 to 31, according to the restriction of the size of a frame on the Drawing, while the "DUT" is referred as an "SCD" that is an example of the DUT 3, and the "fluid-path tester" is referred as an "IPCD" for description using simplified representations, the nomenclature are mere denotations for the convenience of description, and the "SCD" or the "IPCD" does not have a specific meaning.

(a) First, as illustrated in FIG. 1, the first attachment joint $f_{1b}$ of the inspection tube $4_{xj}$ is combined with the first-tube joint $f_{1a}$ of the fluid-path tester of the first embodiment, and the second attachment joint $f_{2b}$ of the inspection tube $4_{xj}$ is combined with the second-tube joint $f_{2a}$, whereby the inspection tube $4_{xj}$ is connected to the fluid-path tester of the first embodiment. Then, in step S401 illustrated in FIG. 29, "leak" is selected on the screen of the touch panel 37 illustrated in FIG. 4, and the leak tester 21a is started up. Then, in step S402, the supply-side solenoid valve $V_{4a}$ is opened, and a fluid-circuit (fluid path) implemented by the inspection tube $4_{xj}$ as a part of the fluid-circuit (fluid path) is opened. In step S402, when the supply-side solenoid valve $V_{4a}$ is opened, the flow proceeds to step S403. In step S403, the exhaust-side solenoid valve $V_{4b}$ is closed, and a fluid-circuit (fluid path) implemented by the inspection tube $4_{xj}$ as a part of the fluid-circuit (fluid path) is closed. When the exhaust-side solenoid valve $V_{4b}$ is closed in step S403, the flow proceeds to step S404, in step S404, the measurement-compressor 34 included in the fluid-path tester of the first embodiment is started up, and, in step S405, the air is supplied to the inspection tube $4_{xj}$ through the manifold 31 of the fluid-path tester of the first embodiment. In step S405, when the supply of air to the inspection tube $4_{xj}$ is started, in step S406, the measurement of the fluid pressure in the inspection tube $4_{xj}$ is started by using the pressure sensor S1 built in the manifold 31 of the fluid-path tester of the first embodiment, and the flow proceeds to step S407 illustrated in FIG. 30.

Figure 30:
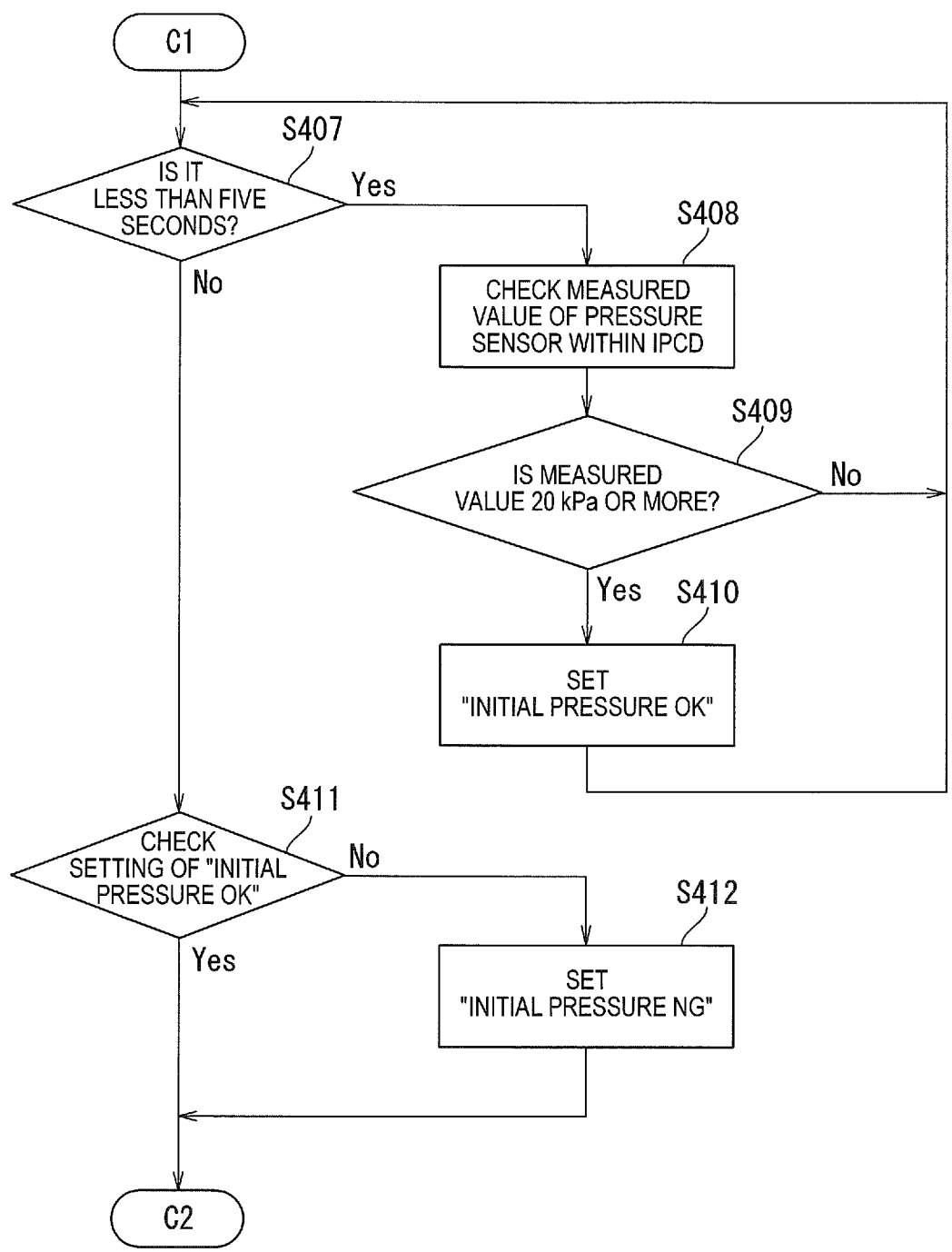
FIG. 30 is a flowchart (2) that illustrates an operation of the fluid-path tester according to the first embodiment in the case of leakage inspection.

(b) When it is less than five seconds after the start of the measurement of the fluid pressure in step S407 illustrated in FIG. 30, a measured value of the fluid pressure in the inspection tube $4_{xj}$ that is displayed by the pressure sensor S1 is checked on the touch panel 37 in step S408. When the measured value of the fluid pressure in the inspection tube $4_{xj}$ that is displayed by the pressure sensor S1 is 20 kPa or more in step S409, in step S410, "initial pressure OK" is set, and the flow is returned to step S407. When the measured value of the fluid pressure in the inspection tube $4_{xj}$ that is displayed by the pressure sensor S1 is less than 20 kPa in step S409, the flow is returned to step S407. On the other hand, when five seconds or more elapse after the start of the measurement of the fluid pressure in step S407, the flow proceeds to step S411, and it is checked whether "initial pressure OK" is set in step S411. When the setting of "initial pressure OK" is checked in step S411, the flow proceeds to step S413 illustrated in FIG. 31. On the other hand, when the setting of "initial pressure OK" cannot be checked in step S411, in step S412, after "initial pressure NG" is set, the flow proceeds to step S413 illustrated in FIG. 31.

Figure 31:
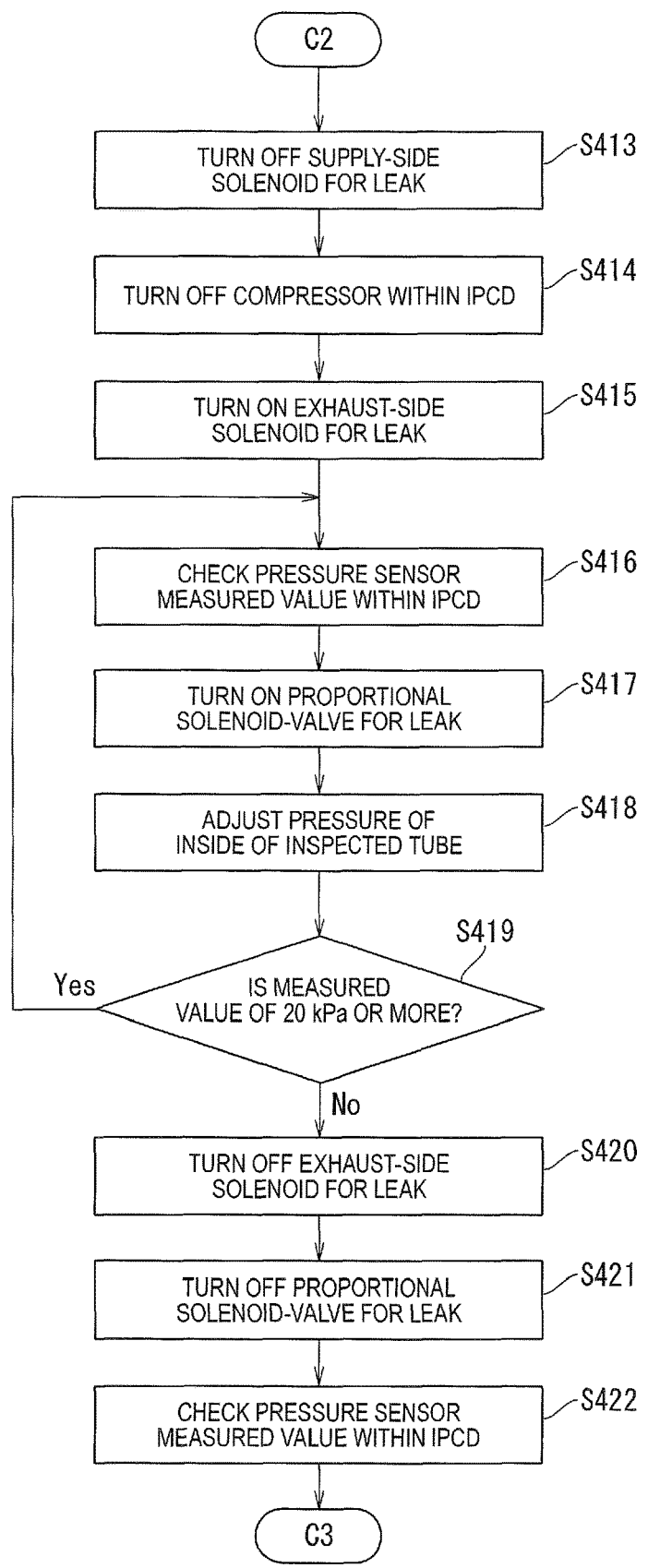
FIG. 31 is a flowchart (3) that illustrates an operation of the fluid-path tester according to the first embodiment in the case of leakage inspection.

(c) In step S413 illustrated in FIG. 31, by closing the supply-side solenoid valve $V_{4a}$, the fluid-circuit implemented by the inspection tube $4_{xj}$ as a part of the fluid-circuit is closed, the flow proceeds to step S414, and the measurement-compressor 34 is stopped. After the supply of the air is stopped, the flow proceeds to step S415, the exhaust-side solenoid valve $V_{4b}$ is opened, and the fluid-circuit implemented by the inspection tube $4_{xj}$ as a part of the fluid-circuit is opened. Thereafter, the flow proceeds to step S416, a measured value of the fluid pressure in the inspection tube $4_{xj}$ that is displayed by the pressure sensor S1 is checked on the touch panel 37, and the flow proceeds to step S417. In step S417, the proportional solenoid-valve $V_3$ for a leakage inspection illustrated in FIG. 1 is opened, and the adjustment of the pressure in the inspection tube $4_{xj}$ is started in step S418, and the flow proceeds to step S419. When the measured value of the fluid pressure in the inspection tube $4_{xj}$ that is displayed by the pressure sensor S1 is 20 kPa or more in step S419, the flow is returned to step S416. If it is checked that the measured value of the fluid pressure in the inspection tube $4_{xj}$ that is displayed by the pressure sensor S1 is adjusted to a leak-test pressure of less than 20 kPa in step S419, the flow proceeds to step S420, the exhaust-side solenoid valve $V_{4b}$ is closed, and the fluid-circuit implemented by the inspection tube $4_{xj}$ as a part of the fluid-circuit is caused to be in a closed state. Furthermore, the flow proceeds to step S421, and the proportional solenoid-valve $V_3$ for a leakage inspection is closed. In step S421, the proportional solenoid-valve $V_3$ for a leakage inspection is closed, and, after the fluid-circuit implemented by the inspection tube $4_{xj}$ as a part of the fluid-circuit is caused to be in the closed state, the flow proceeds to step S422, the measured value of the fluid pressure in the inspection tube $4_{xj}$ that is displayed by the pressure sensor S1 is checked on the touch panel 37, and the flow proceeds to step S423 illustrated in FIG. 32.

Figure 32:
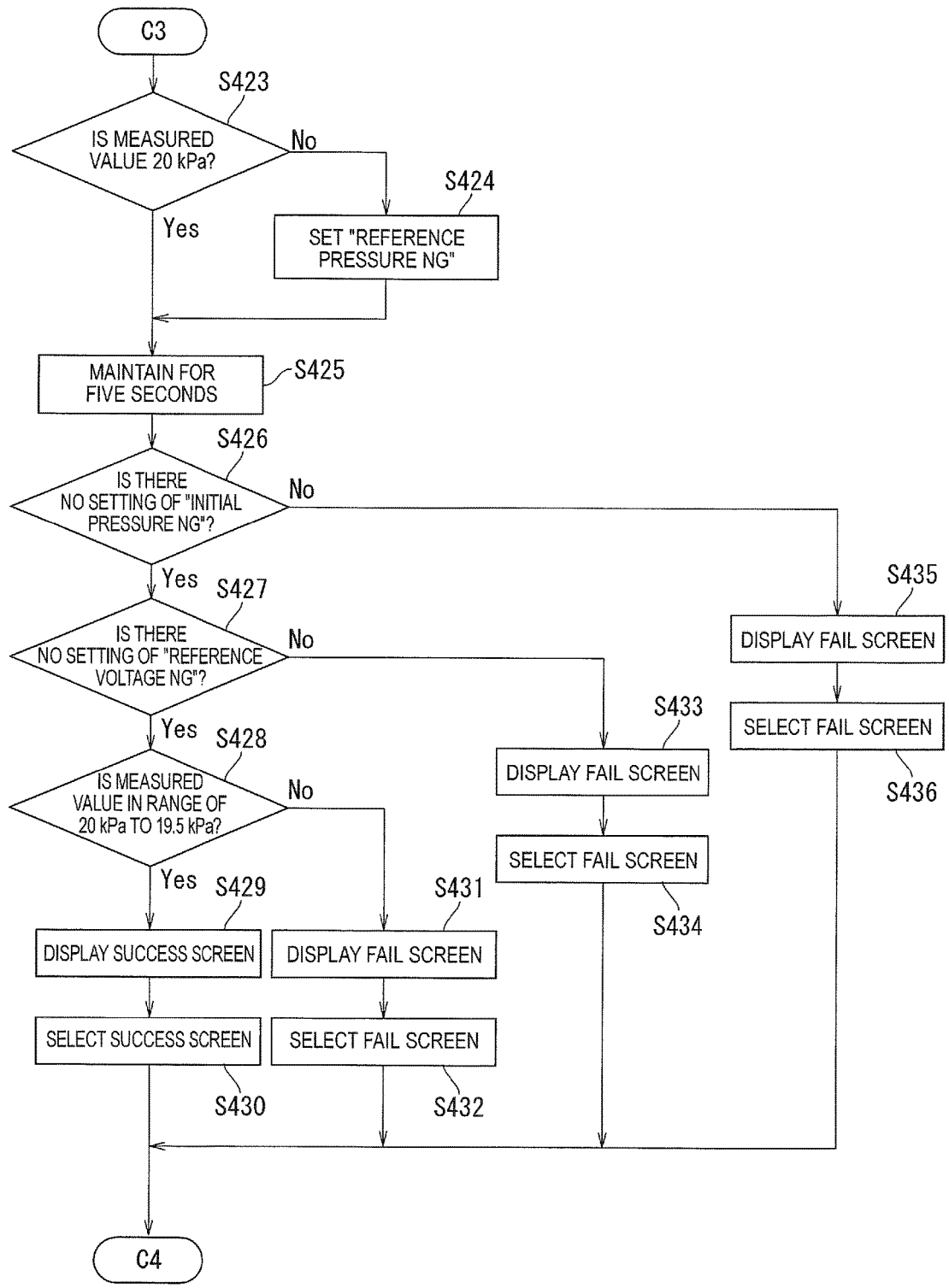
FIG. 32 is a flowchart (4) that illustrates an operation of the fluid-path tester according to the first embodiment in the case of leakage inspection.

(d) In step S423 illustrated in FIG. 32, when the measured value of the fluid pressure in the inspection tube $4_{xj}$ that is displayed by the pressure sensor S1 is 20 kPa, the flow proceeds to step S425, and the close state of the fluid-circuit implemented by the inspection tube $4_{xj}$ as a part of the fluid-circuit is maintained for five seconds. On the other hand, when the measured value of the fluid pressure in the inspection tube $4_{xj}$ that is displayed by the pressure sensor S1 is not 20 kPa, the flow proceeds to step S424, and, after "reference pressure NG" is set, the flow proceeds to step S425, and the closed state of the fluid-circuit implemented by the inspection tube $4_{xj}$ as a part of the fluid-circuit is maintained for five seconds. After the closed state of the fluid-circuit implemented by the inspection tube $4_{xj}$ as a part of the fluid-circuit is maintained for five seconds in step S425, the flow proceeds to step S426. In step S426, the setting of "initial pressure NG" is checked, and, when there is no setting of "initial pressure NG", the flow proceeds to step S427. In step S426, the setting of "initial pressure NG" is present, the flow proceeds to step S435, and the screen of a "fail" is displayed on the touch panel 37. When the "fail" screen is displayed in step S435, the flow proceeds to step S436, and, after "fail" is selected on the touch panel 37, the flow proceeds to step S437 illustrated in FIG. 33. Meanwhile, in step S427, it is checked whether the setting of "reference pressure NG" is set. When the setting of "reference pressure NG" is present, the flow proceeds to step S433, and the "fail" screen is displayed on the touch panel 37. When the "fail" screen is displayed in step S433, the flow proceeds to step S434, and, after the "fail" is selected on the touch panel 37, the flow proceeds to step S437 illustrated in FIG. 33. In step S427, it is checked whether the setting of "reference pressure NG" is present, and, when there is no setting of "reference pressure NG", the flow proceeds to step S428. In step S428, in the maintaining the state for five seconds, it is checked whether the measured value of the fluid pressure in the inspection tube $4_{xj}$ that is displayed by the pressure sensor S1 is a value in the range of 20 kPa to 19.5 kPa. When the measured value of the fluid pressure in the inspection tube $4_{xj}$ that is displayed by the pressure sensor S1 is a value in the range of 20 kPa to 19.5 kPa in the maintaining of the state for five seconds in step S428, the flow proceeds to step S429, and a "success" screen is displayed on the touch panel 37. When the "success" screen is displayed in step S429, the flow proceeds to step S430, and, after "success" is selected on the touch panel 37, the flow proceeds to step S437 illustrated in FIG. 33. On the other hand, in step S428, when the measured value of the fluid pressure in the inspection tube $4_{xj}$ that is displayed by the pressure sensor S1 is determined not to be a value in the range of 20 kPa to 19.5 kPa in the maintaining the state for five seconds at least once, the flow proceeds to step S431, and the "fail" screen is displayed on the touch panel 37. In a case where "fail" screen is displayed in step S431, the flow proceeds to step S432, and, after "fail" is selected, the flow proceeds to step S437 illustrated in FIG. 33.

Figure 33:
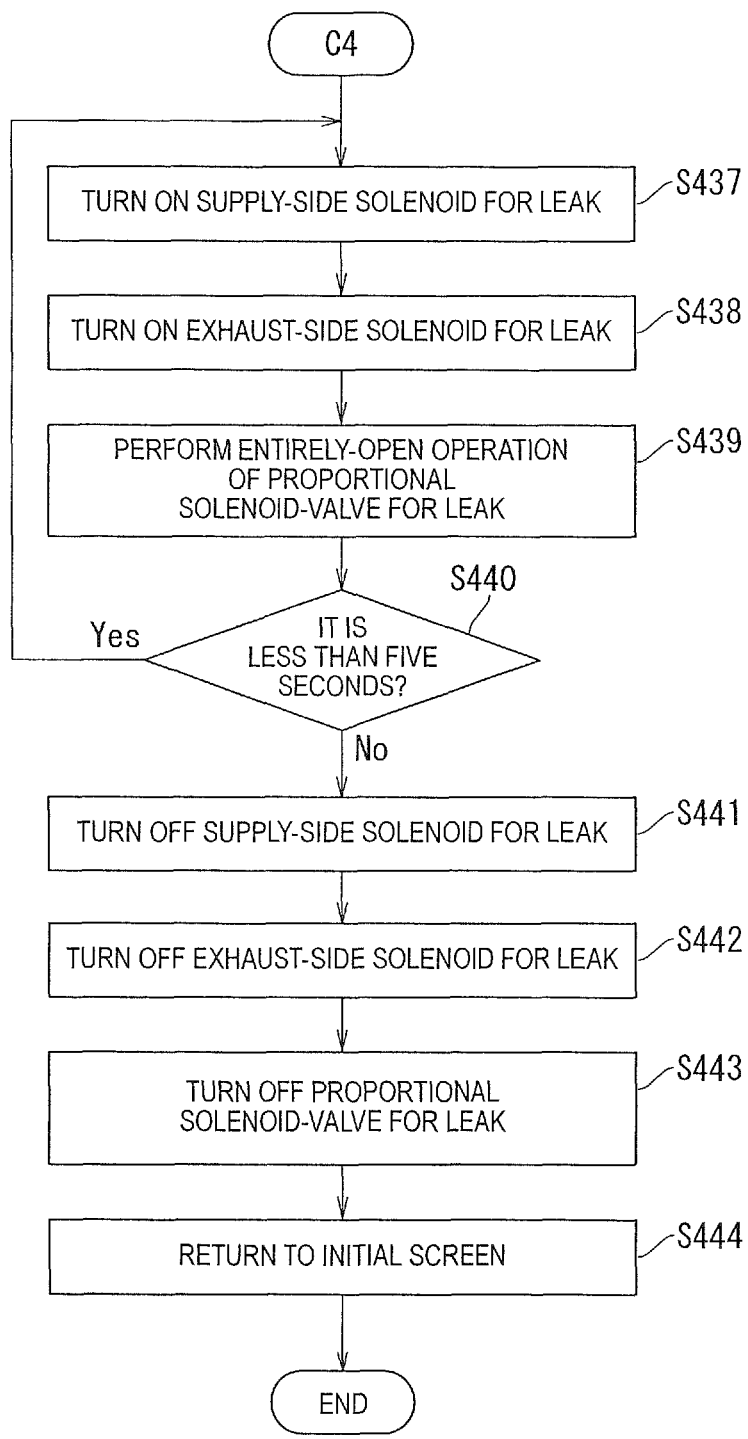
FIG. 33 is a flowchart (5) that illustrates an operation of the fluid-path tester according to the first embodiment in the case of leakage inspection.

(e) In step S437 illustrated in FIG. 33, the supply-side solenoid valve $V_{4a}$ is opened. When the supply-side solenoid valve $V_{4a}$ is opened in step S437, the flow proceeds to step S438. In step S438, the exhaust-side solenoid valve $V_{4b}$ is opened, and the fluid-circuit implemented by the inspection tube $4_{xj}$ as a part of the fluid-circuit is opened. Thereafter, the flow proceeds to step S439, and the proportional solenoid-valve $V_3$ for a leakage inspection is caused to be in the entirely-open state, and the air is exhausted for five seconds. In other words, when the air is determined to be exhausted in the entirely-open state for less than five seconds in step S440, the flow is returned to step S437. On the other hand, when the air is determined to be exhausted in the entirely-open state for five seconds or longer in step S440, the flow proceeds to step S441. In step S441, the supply-side solenoid valve $V_{4a}$ is closed, and the flow proceeds to step S442. Also in step S442, the exhaust-side solenoid valve $V_{4b}$ is closed, and the fluid-circuit implemented by the inspection tube $4_{xj}$ as a part of the fluid-circuit is closed. Thereafter, the flow proceeds to step S443, and the proportional solenoid-valve $V_3$ for a leakage inspection is also closed, and the flow proceeds to step S444. In step S444, when the screen of the touch panel 37 on which the "success" or "fail" is displayed is touched, the procedure proceeds to the initial screen, and a series of processes of a leakage inspection ends.

According to the fluid-path testing-method of the first embodiment, by the sequence represented in the flowchart of FIGS. 29 to 33, while constructing a closed fluid-circuit using dedicated tubes as the inspection tubes $4_{xj}$ and having the path of the inspection tubes $4_{xj}$ as a part of the fluid path and pressurizing and maintaining the pressure in the fluid-circuit for a predetermined time, a leakage of each inspection tube $4_{xj}$ can be sequentially inspected in a short time in a simplified manner. Here, each tube-unit can be sequentially inspected for testing each inspection tube $4_{xj}$, respectively, because the inspection tube $4_{xj}$ is one of the triple tubes, as the triple tubes implement one tube-unit.

As above, according to the fluid-path testing-method of the first embodiment, an analysis of the abnormal-modes (the error modes E1, E2, E3, and E4), and the like can be achieved in a simplified manner by using a single miniaturized device by performing a short-time operation, as a change of minute levels in the pressure can be detected in a system having a fluid path of a low-pressure regime of about 25 kPa or less, by classifying into a plurality of abnormal-modes (the error modes E1, E2, E3, and E4). The abnormal-modes are classified as:

a problem in the system including the compressor-under-test 303 implementing the DUT 3 or the like, a problem in the leakage of the inspection tube $4_{xj}$, and a problem in the suppression pressure for the "first portions" or the "second portions" of the sleeves 301a and 301b used in the DUT 3, and the like.

Other Embodiments

As described above, while the present invention has been described using the first embodiment, the description and the Drawing forming a part of this disclosure should not be understood to limit the present invention. Various alternative embodiments, examples, and operation technologies become clear to a person skilled in the art based on this disclosure. Particularly, in the description of the first embodiment, while a case where the "fluid" is the "air" has been illustrated as an example, the "fluid" of the present invention is not limited to the "air", but the "fluid" may be any other gas such as oxygen ($O_2$), nitrogen ($N_2$), or helium (He). In addition, the "fluid" may be a liquid such as water or oil or a liquid metal such as mercury. Thus, it is apparent that the present invention includes various embodiments and the like not disclosed here. Accordingly, the technical scope of the present invention is determined by invention-specific matters relating to the claims that are based on the description presented above.

REFERENCE SIGNS LIST

21 Casing
21a Leak tester
21b Abnormality emulator
22a, 22b, 22c, and 22d Post
23 Second pedestal board
24 First pedestal board
28 Opening portion
3 Device-under-test (DUT)

301a, 301b Sleeve
31 Manifold
33 Print board stack
34 Measurement-compressor,
35 Pressure sensor unit
36 Print board stack
37 Touch panel
38 Connector holder
$4_{xj}$ Inspection tube
$4_{a1}$, $4_{a2}$, $4_{a3}$, $4_{b1}$, $4_{b2}$, $4_{b3}$ Dedicated tube
51 External clock
52a, 52b, 52c, 54, 56a, 56b, 58a, 58b CPU
53 Numeric display circuit
55a, 57a First numeric display circuit
55b, 57b Second numeric display circuit
55c, 57c Third numeric display circuit
61 Leak-fluid feed-pressure (LFFP) measuring-circuit
611 Drive circuit for leakage inspection
1s Board for touch-panel drive-circuit
62 Liquid crystal display (LCD) controller
621 Operation display lighting (ODL) circuit
622 Operation state display lamp
62s Board for leak-test controller
63 Power supply
67 Total controller
671s Board for solenoid-valve drive-circuit
672s Board for compressor drive-circuit
673s Board for third proportional-solenoid-valve drive-circuit
674s Board for second proportional-solenoid-valve drive-circuit
675s Board for first proportional-solenoid-valve drive-circuit
676s Board for power supply circuit
677 Whole-signal amplifier
677s Board for sensor-signal amplification-circuit
68 B-port fluid-feed-pressure measuring-circuit
681a, 681b, 681c Abnormal-load generator for B-port inspection
68s Board for emulation control-circuit for B-port
69 A-port fluid-feed-pressure measuring-circuit
691a, 691b, 691c Abnormal-load generator for A-port inspection
69s Board for emulation control-circuit for A-port
70 Drive element
71a to 71c, $72_{1a}$, $72_{1b}$, $73_1$, $73_2$, $74_{1a}$, $74_{1b}$, $75_1$, $75_2$, 76a, 76b, 76c Drive element
86a Red light emitting element
86b Green light emitting element
86c Blue light emitting element
S1 to S7 Pressure sensor
$V_{1a1}$ Proportional solenoid-valve for buffer for first-tube
$V_{1a2}$ pressure-adjusting proportional-solenoid (PAPS) valve for first-tube
$V_{1a3}$ Proportional solenoid-valve for buffer for second-tube
$V_{1a4}$ PAPS valve for second-tube
$V_{1a5}$ Proportional solenoid-valve for buffer for third-tube
$V_{1a6}$ PAPS valve for third-tube
$V_{1b1}$ Proportional solenoid-valve for buffer for first-tube
$V_{1b2}$ PAPS valve for first-tube
$V_{1b3}$ Proportional solenoid-valve for buffer for second-tube
$V_{1b4}$ PAPS valve for second-tube
$V_{1b5}$ Proportional solenoid-valve for buffer for third-tube
$V_{1b6}$ PAPS valve for third-tube
$V_{2a1}$ to $V_{2a3}$, $V_{2b1}$ to $V_{2b3}$ First solenoid-valve
$V_3$ Proportional solenoid-valve for leakage inspection
$V_{4a}$ Supply-side solenoid valve
$V_{4b}$ Exhaust-side solenoid valve
$V_{5a1}$ to $V_{5a3}$, $V_{5b1}$ to $V_{5b3}$ First solenoid-valve
$f_{1a}$ First tube joint
$f_{2a}$ Second tube joint
$f_{1b}$ First attachment joint
$f_{2b}$ Second attachment joint
g1 to g6, $g7_{a1}$, $g7_{b1}$, $g8_{a1}$, $g8_{b1}$ Internal pipe

The invention claimed is:

1. A fluid-path tester configured to inspect abnormal-modes in a fluid path of a device-under-test, which includes a compressor-under-test and a dedicated tube to be pressurized by the compressor-under-test when the dedicated tube is connected to the compressor-under-test, the abnormal-modes including a failure in the compressor-under-test and a failure in the dedicated tube, the fluid-path tester comprising:
   a casing having a couple of leak-test tube-connecters for connecting both ends of an inspection tube, and a connector holder;
   a leak tester being housed inside the casing, including a measurement-compressor, implementing a closed fluid-circuit in a leak inspection stage, using a path of the dedicated tube as the inspection tube, which is connected through the couple of leak-test tube-connecters, configured to inspect a leakage in the dedicated tube by applying a pressure into the fluid-circuit using the measurement-compressor, maintaining the pressure in the fluid-circuit for a predetermined time; and
   an abnormality emulator being housed inside the casing, including a pressure-adjusting proportional-solenoid valve, configured to emulate a plurality of characteristics in a stage that abnormality emulator is connected to the device-under-test through the connector holder, each of the plurality of characteristics corresponds to one of a plurality of abnormal-modes represented by performance of the fluid-circuit, each of the plurality of abnormal-modes having possibilities of occurring in the fluid path of the device-under-test, by applying a fluid pressure using the compressor-under-test and by adjusting the fluid pressure using the pressure-adjusting proportional-solenoid valve, thereby inspecting an abnormal condition occurring in the fluid path of the device-under-test.

2. The fluid-path tester of claim 1, wherein compressor-under-test is a compressor capable of pressurizing a low pressure regime of 30 kPa or less.

3. The fluid-path tester of claim 2, wherein the device-under-test is a medical instrument attached to a human body used for an intermittent pneumatic compression method, and the fluid path tester detects one of the plurality of abnormal-modes as an abnormality of the fluid path of the medical instrument, the plurality of abnormal-modes comprising:
   a first abnormal-mode detecting that an internal pressure of the medical instrument is high;
   a second abnormal-mode detecting that an attached state of a first portion and a second portion of the medical instrument attached to the human body are an over-tightened state at a time of normal use of the medical instrument;
   a third abnormal-mode detecting that the attached state of the first portion and the second portion is over loosened state at the time of normal use; and
   a fourth abnormal-mode detecting that internal pressure is out of a defined pressure range.

4. The fluid-path tester of claim 3, wherein the medical instrument is a sleeve being wound around the human body, and a portion where the sleeve winds around a bottom of feet is defined as the first portion, and a portion where the sleeve winds around a lower limb is defined as the second portion.

5. The fluid-path tester of claim 1, wherein the couple of leak-test tube-connecters are a female leak-test tube-connecter and a male leak-test tube-connecter, respectively.

6. The fluid-path tester of claim 1, wherein the leak tester further includes:
    a first internal pipe connected to the measurement-compressor;
    a supply-side solenoid valve connected to the first internal pipe;
    a second internal pipe connected to the supply-side solenoid valve;
    a pressure sensor for a leakage inspection, being connected to the second internal pipe;
    a third internal pipe connected to the pressure sensor;
    an exhaust-side solenoid valve connected to the third internal pipe;
    a fourth internal pipe connected to the exhaust-side solenoid valve;
    a proportional solenoid-valve for a leakage inspection connected to the fourth internal pipe;
    a fifth internal pipe connected to the pressure sensor having a first-tube joint for connecting to an end of the inspection tube; and
    a sixth internal pipe connected to the pressure sensor for connecting to another end of the inspection tube.

7. The fluid-path tester of claim 1, wherein the abnormality emulator further includes:
    a pressure sensor for the dedicated tube, being connected to the connector holder;
    a vertical-direction internal pipe having one end portion connected to the pressure sensor, and another end portion connected to the pressure-adjusting proportional-solenoid valve;
    a first branching pipe branching in a horizontal direction from the vertical-direction internal pipe;
    a first solenoid-valve connected to the first branching pipe;
    a horizontal-direction internal pipe connected to the first solenoid-valve;
    a buffer proportional solenoid-valve connected to the horizontal-direction internal pipe;
    a second branching pipe branching in the horizontal direction from the vertical-direction internal pipe; and
    a second solenoid-valve connected to the second branching pipe.

8. A method for inspecting abnormal-modes in a fluid path of a device-under-test, which include a compressor-under-test and a dedicated tube to be pressurized by the compressor-under-test when the dedicated tube is connected to the compressor-under-test, using a fluid path tester comprising a casing having a couple of leak-test tube-connecters for connecting both ends of an inspection tube, and a connector holder, the abnormal-modes including a failure in the compressor-under-test and a failure in the dedicated tube, the fluid-path testing-method comprising:
    inspecting a leakage in the dedicated tube by constructing a closed fluid-circuit using a path of the dedicated tube as an inspection tube, both ends of the inspection tube are connected to a leak tester through the couple of leak-test tube-connecters, so as to implement the fluid path, by applying a pressure into the fluid-circuit, and by maintaining the pressure in the fluid-circuit for a predetermined time;
    emulating a plurality of characteristics, by connecting an abnormality emulator to the device-under-test through the connector holder, each of the plurality of characteristics corresponds to one of a plurality of abnormal-modes represented by performance of the fluid-circuit, each of the plurality of abnormal-modes having possibilities of occurring in the fluid path of the device-under-test, by using a fluid-path tester; and
    inspecting an abnormal condition in the fluid path of the device-under-test, by applying a pressure into an internal pipe of the fluid-path tester connected to the device-under-test using the compressor-under-test, and by comparing acquired characteristics with the emulated characteristics.

9. The method of claim 8, wherein compressor-under-test is capable of pressurizing a low pressure regime of 30 kPa or less.

10. The method of claim 9, wherein the device-under-test is a medical instrument attached to a human body used for an intermittent pneumatic compression method.

11. The method of claim 10, wherein the plurality of abnormal-modes comprises:
    a first abnormal-mode detecting that an internal pressure of the medical instrument is high;
    a second abnormal-mode detecting that an attached state of a first portion and a second portion of the medical instrument attached to the human body are an over-tightened state at a time of normal use of the medical instrument;
    a third abnormal-mode detecting that the attached state of the first portion and the second portion is over loosened state at the time of normal use; and
    a fourth abnormal-mode detecting that internal pressure is out of a defined pressure range.

12. The method of claim 11, wherein the medical instrument is a sleeve being wound around the human body, and a portion where the sleeve winds around a bottom of feet is defined as the first portion, and a portion where the sleeve winds around a lower limb is defined as the second portion.

* * * * *